(12) United States Patent
Benzing et al.

(10) Patent No.: US 12,330,919 B2
(45) Date of Patent: *Jun. 17, 2025

(54) SYSTEMS AND METHODS FOR CALCULATING A PATH

(71) Applicant: Structural Services, Inc., Bethlehem, PA (US)

(72) Inventors: James T Benzing, Bethlehem, PA (US); William R Haller, Bethlehem, PA (US); Seth T Slavin, Bethlehem, PA (US); Marta Kasica-Soltan, Stroudsburg, PA (US)

(73) Assignee: Structural Services, Inc., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,735

(22) Filed: Feb. 29, 2024

(65) Prior Publication Data
US 2024/0279033 A1 Aug. 22, 2024

Related U.S. Application Data

(63) Continuation of application No. 18/109,987, filed on Feb. 15, 2023, now Pat. No. 11,932,518, which is a
(Continued)

(51) Int. Cl.
*B66C 13/16* (2006.01)
*B66C 13/46* (2006.01)

(52) U.S. Cl.
CPC ............. *B66C 13/16* (2013.01); *B66C 13/46* (2013.01)

(58) Field of Classification Search
CPC ....... B66C 13/16; B66C 13/46; B66C 23/585; B66C 23/36
See application file for complete search history.

(56) References Cited

U.S. PATENT DOCUMENTS 5,848,485 A * 12/1998 Anderson ............... E02F 3/435
701/50
6,826,452 B1 * 11/2004 Holland .................. B66C 23/00
318/568.22
(Continued)

*Primary Examiner* — Hoi C Lau
(74) *Attorney, Agent, or Firm* — Kramer Levin Naftalis & Frankel LLP

(57) ABSTRACT

The present disclosure presents systems and methods for assisting a crane operator. An imaging system automatically images each building material object contained within a shakeout field on a construction site and processes the images to determine each object's identifying indicium and its geometric properties. These values are compared with a construction site database to ensure that all necessary building materials are present. A positioning device tracks, in real time, the location of the imaging system, the location of structural members within the shakeout field, and/or other important features of the job site, such as obstacles that the crane operator will need to avoid while lifting a structural member from its initial location to its destination location. Real-time images of the construction site, including indications of the next building material object to be hoisted and/or a path between the object's initial and final locations, can be generated to guarantee that the crane operator hoists the expected object to the expected location.

20 Claims, 27 Drawing Sheets

Related U.S. Application Data continuation of application No. 17/719,146, filed on Apr. 12, 2022, now Pat. No. 12,139,376.

(60) Provisional application No. 63/283,801, filed on Nov. 29, 2021, provisional application No. 63/173,584, filed on Apr. 12, 2021.

(56) References Cited

U.S. PATENT DOCUMENTS

| | | | | |
|---|---|---|---|---|
| 7,851,758 | B1* | 12/2010 | Scanlon | G01J 5/02 |
| | | | | 324/501 |
| 8,102,267 | B1* | 1/2012 | Arumugam | G01S 5/12 |
| | | | | 340/572.1 |
| 8,514,060 | B2 | 8/2013 | Kaga | B28B 23/0031 |
| | | | | 340/572.1 |
| 9,016,588 | B2* | 4/2015 | Kaga | G06K 19/07773 |
| | | | | 343/788 |
| 10,597,264 | B1 | 3/2020 | Muck | B25J 15/0213 |
| 10,921,771 | B2* | 2/2021 | Bramberger | G06Q 50/08 |
| 10,968,084 | B1* | 4/2021 | Cohen | B66C 1/40 |
| 11,119,467 | B2* | 9/2021 | Stanger | B66C 15/04 |
| 11,460,337 | B2* | 10/2022 | Oren | B66F 11/046 |
| 11,620,597 | B1* | 4/2023 | Sikora | G06V 10/774 |
| | | | | 382/103 |
| 11,897,734 | B2* | 2/2024 | Benzing | B66C 13/46 |
| 11,932,518 | B2* | 3/2024 | Benzing | B66C 13/16 |
| 11,939,194 | B2* | 3/2024 | Benzing | B66C 13/46 |
| 12,139,376 | B2* | 11/2024 | Benzing | B66C 13/46 |
| 2010/0044332 | A1* | 2/2010 | Cameron | B66C 23/905 |
| | | | | 212/278 |
| 2010/0070179 | A1* | 3/2010 | Cameron | G01S 5/0027 |
| | | | | 701/300 |
| 2011/0187548 | A1* | 8/2011 | Maynard | B66C 15/045 |
| | | | | 340/685 |
| 2013/0103271 | A1* | 4/2013 | Best | B66C 13/40 |
| | | | | 701/50 |
| 2013/0201002 | A1* | 8/2013 | Wollin | G08B 5/36 |
| | | | | 340/8.1 |
| 2016/0034730 | A1* | 2/2016 | Delplace | G06K 7/10366 |
| | | | | 340/8.1 |
| 2019/0345010 | A1* | 11/2019 | Shan | B66C 13/46 |
| 2020/0386605 | A1* | 12/2020 | Oren | G01G 3/14 |
| 2021/0094804 | A1* | 4/2021 | Cohen | B66C 13/16 |
| 2021/0233186 | A1* | 7/2021 | Cohen | G06Q 10/06316 |
| 2021/0292132 | A1* | 9/2021 | Cohen | B66C 13/16 |
| 2021/0347614 | A1* | 11/2021 | Bramberger | E04G 21/02 |
| 2022/0324679 | A1* | 10/2022 | Benzing | B66C 13/46 |
| 2023/0257237 | A1* | 8/2023 | Benzing | B66C 13/46 |
| | | | | 340/685 |
| 2023/0257238 | A1* | 8/2023 | Benzing | B66C 13/46 |
| | | | | 340/685 |
| 2023/0257239 | A1* | 8/2023 | Benzing | B66C 13/16 |
| | | | | 340/685 |
| 2023/0257241 | A1* | 8/2023 | Benzing | B66C 13/48 |
| | | | | 212/276 |
| 2023/0264928 | A1* | 8/2023 | Benzing | B66C 13/46 |
| | | | | 340/685 |
| 2024/0279033 | A1* | 8/2024 | Benzing | B66C 13/16 |
| 2024/0279034 | A1* | 8/2024 | Benzing | B66C 13/16 |
| 2024/0279035 | A1* | 8/2024 | Benzing | B66C 13/46 |
| 2024/0294363 | A1* | 9/2024 | Benzing | B66C 13/46 |

* cited by examiner

SYSTEMS AND METHODS FOR CALCULATING A PATH

I. CROSS-REFERENCE TO RELATED APPLICATIONS

This application is a continuation of U.S. application Ser. No. 18/109,987, filed Feb. 15, 2023, which is a continuation of U.S. application Ser. No. 17/719,146, filed Apr. 22, 2022, which claims priority to U.S. Provisional Patent Application No. 63/173,584, filed Apr. 12, 2021 and U.S. Provisional Patent Application No. 63/283,801, filed Nov. 29, 2021, the contents of which are hereby incorporated by reference in their entireties.

II. FIELD OF THE INVENTION

The present invention generally relates to cranes, and more particularly, to an apparatus for identifying building material objects, such as structural members, including girders, beams, and/or columns at the construction site prior to installation using artificial intelligence and computer vision technologies.

III. BACKGROUND OF THE INVENTION

The construction of buildings, bridges, and other large structures usually first involves the construction of a cement and/or concrete foundation subsequently upon which a steel structure is erected. Steel structures are usually composed of interconnected beams, girders, and columns (i.e. structural members), which transmit the load of the structure to the foundation. Common structural members include I-beams, H-beams, W-beams, universal beams, rolled steel joist (RSJ) beams, box beams, double-T beams, and the like. Other building materials often used in the construction of buildings and bridges, such as cement, reinforcement bars (rebar), embed plates, HVAC equipment, electrical systems, etc. All building materials used in the construction of structures and hoisted by a crane from a first location to a second location are referred to herein as building material object(s) and encompass any building materials, including structural members, cement, HVAC equipment, rebar, and glass plates, for example. The term structure refers to any man made apparatus, including buildings and bridges, for example.

During the steel erection process, building material objects are first transported to the construction site, usually by one or more trucks. For example, HVAC equipment may be transported to the construction site by a flatbed semi-trailer truck, and cement may be transported to the construction site by a cement truck. The building material objects are then lifted off the truck at the erection site and in near proximity to a crane. Structural members are usually longitudinally positioned next to one another on the ground in an area commonly referred to in the trade as the "shakeout field" where they are subsequently hoisted to their respective attachment location on the steel structure. Other building material objects, such as concrete (usually contained in a hopper), rebar stacks and bundles, corrugated sheets, plumbing, electrical and HVAC supplies and systems, embed plates and the like may also be located within the shakeout field (or at a separate on-site location near a crane) and are subsequently hoisted to their respective destination location by a crane.

Each building material object is usually identified by either a handwritten or paint sprayed indicium (the building material object's "identifying indicium"), which is placed on the outside surface of the member. The indicium usually consists of a set of alphanumeric characters and/or symbols and is placed on a visible location of the building material object by the steel fabricator. Other types of identifying indicium include radio frequency identification (RFID) tags, quick response (QR) codes, bar codes or other types of machine-readable labels used to identify the building material object in addition to, or in place of, the handwritten or paint sprayed indicium.

Each identifying indicium may be linked to a construction site database provided by a building information modeling (BIM) software package, or other types of database systems. The "Tekla" software package offered by Trimble Solutions, Inc. of Kennesaw, Georgia is an example of a BIM software package. Advanced structural BIM software, like Tekla, enables steel detailers, fabricators, structural engineers, and others to create, combine, manage, and share 3D models of multi-materials (e.g. structural members and/or reinforcement bars) and associated construction information. The database may also store information associated with the identifying indicium, including the hoisting order and the final construction site attachment location or placement location for building material object. For example, the construction site final placement location for a piece of HVAC equipment may be defined as a roof location of a nearly completed structure. The GNSS coordinates of the final construction site attachment or placement location may also be made available to assist in the placement of building material objects.

This data is usually consolidated and provided to the crane operator in a simplified ordered listing (commonly referred to as a "lifting list"), which includes the hoisting order, the identifying indicium, and the final attachment location or placement location for each building material object. The identifying indicium of each building material object can, therefore, provide access to detailed information for each identified building material object usually contained in the construction site database. For example, the identifying indicium of a structural member will enable access to the structural member's data, which may include the structural member's attachment location on the structure for; the width, length, height (commonly referred to as depth in the trade and represents the nominal height from the outer face of one flange to the outer face of the other flange), and weight of the structural member; the surface treatment of the metal; where and when the structural member was manufactured; the identity of the steel fabricator; identification of other structural members that will be connected to the identified member; the type of material; other structural features attributed to the structural member, such as attached brackets, hole patterns, connection locations; and/or any other pertinent information (data) associated with the structural member. As another example, the identifying indicium of a bundled rebar provides access to the rebar's data, which may include the destination location on the structure for the bundle, the size, length, number of pieces contained within the bundle, the type of steel used in the manufacture of the rebar, where and when the rebar was manufactured, the fabricator and any other data which may be associated with the rebar bundle.

The identifying indicium is therefore a key that unlocks data associated with the respective to the identified building material object. Of particular importance to the crane operator is the lifting order of the structural members and the final construction site attachment location data for a particular structural member. For example, once the structural members have been off-loaded from the truck and moved to the shakeout field, the crane operator is tasked with selecting the first and subsequent structural members in the proper lifting order before hoisting the load (i.e., the structural member) to the attachment location on the partially completed structure. The structural members are usually oriented in the shakeout field to ensure that the workers have an unobstructed view of the identifying indicium. Similarly, the data associated with the identifying indicium of other types of building material objects may include the hoisting order and the final construction site destination location. This data is usually provided to the crane operator in a simplified ordered listing (e.g. a building material object lifting list), which includes the hoisting ordering, the identifying indicium, and the destination location for each other type of building material object.

The lifting order is usually in the form of the lifting list, which identifies the first and subsequent structural members and their attachment location on the structure. For simple structures having a small number of structural members, the lifting list data may be in the form of a handwritten list. For larger structures, the lifting list data can be incorporated into the construction site database and accessed through a computer system resident in the cab of the crane or elsewhere. A combined lifting list may also be provided which includes structural members as well as other types of building material objects. For example, the lifting list may include an ordered list of three structural members and two cement buckets for hoisting to different locations on the structure.

To assist the crane operator in selecting the correct building material object for the lift, one or more shakeout field associates (the "shakeout associate") visually identifies the correct building material object by reading the building material object's identifying indicium and comparing the identifying indicium with the lifting list data. The layout associate then directs the crane operator to move the crane hook to the location of the correctly identified building material object and attaches the main hook block to the object. The crane operator then hoists the building material object to its destination location on the structure with the assistance of one or more iron worker associates located near the attachment location. Communication is maintained during the lifting movement of the building material object from the shakeout field to the destination location on the structure among the iron worker associates and the crane operator using hand signals and/or by radio communication. However, even using radio communication and/or hand signals there is still a possibility of having the building material object collide with the existing structure because of poor communication between the crane operator and the iron worker associates or having the crane operator's view of the job site obstructed during the hoisting of the load.

Steel fabricators typically mark identifying indicia on building material objects with alphanumeric characters and/or other symbols. Such indicia are usually handwritten using chalk, paint, indelible ink, or other type of material because this technique is quick, inexpensive, and usually sufficient for a worker to identify a particular building material object in the shakeout field. However, handwritten identifying indicia may be subject to interpretation by the worker reading the alphanumeric characters and other symbols. For example, a capital 'J' may be interpreted as a 'l' and a lowercase 'b' may be interpreted as a '6'. The handwritten indicium may also be written upside down or sideways, depending on the perspective of the reader, further complicating the correct recognition of the alphanumeric characters and/or symbols. Thus, there is a high possibility of misidentifying the building material objects by the shakeout field associate.

The improper identification of a building material object may result in the crane operator positioning a building material object at the wrong destination location. In this case, valuable construction time is lost by first bringing the improperly identified building material object to the destination location, then bringing the improperly identified building material object back down to the shakeout field, disconnecting the improperly identified building material object from the main hook block, re-identifying the correct building material object, moving the crane to the correct building material object, reconnecting the crane cable to the correct building material object, and then again hoisting the correct building material object to the desired destination location on the structure.

Current construction practice also assumes that the identifying indicium correctly identifies the building material object and its corresponding information contained in the construction site database or other database(s) for the steel structure. Sometimes, however, the steel fabricator or supplier of the building material object might assign the wrong identifying indicium to the building material object. Such errors also result in the operator hoisting the wrong building material object to the attachment location and then returning it back to the shakeout field, as was the case for the layout person misidentifying the building material object.

Similar problems arise when the steel fabricator properly identifies a building material object but fails to manufacture the building material object according to the construction site database specifications. For example, the structural member may not have been fabricated with the desired length, width and/or height. At this point a new structural member must be modified or remanufactured by the steel fabricator which usually takes many hours or even days depending upon the severity of the manufacturing error, the structural member size, availability of the steel, and other factors. Additionally, a structural member may be missing structural features required for proper attachment to the structure. For example, brackets and/or hole patterns may be missing, sized incorrectly, or have an incorrect location on the structural member. These errors are usually not revealed until the problematic structural member is hoisted to the attachment location and cannot be properly attached to the structure. Such errors can be very costly for the general contractor because of the down time involved and (because structural members must be lifted in a certain order) have the potential to shut down the entire construction site process until the remanufactured structural member is corrected or remanufactured and delivered back to the construction site.

Similar problems exist for other building material objects. Building material objects that have been properly identified but have not been manufactured by the building material supplier according to the construction site database specifications will cause the hoisted building material object to be returned to the shakeout field. For example, a building material object may be identified as having 20 pieces of 10 foot long #10 rebar and having a diameter of 10/8 inches, but because of an error in manufacturing the rebar may be a size #8 having a nominal diameter of ⅝ inches.

Thus, there is a need in the construction industry for an apparatus which can easily, accurately, and automatically identify each building material object at the shakeout field location without the need for human intervention. Additionally, there is a need in the construction industry for an apparatus to automatically determine the actual shakeout field building material object specifications and to compare these specifications against the respective construction site database or other design specification database to eliminate the hoisting of an incorrectly manufactured building material object. There is yet another need in the construction industry for an apparatus which prevents collisions among building material objects being hoisted to their destination locations and the other building material objects already placed at their destination locations. Another need in the construction industry is to provide a hoisting path to assist the crane operator in hoisting the building material object to its destination location.

IV. SUMMARY OF THE INVENTION

To address the foregoing and other deficiencies, some embodiments of the present invention include an imaging system that automatically images each building material object contained within a shakeout field and processes the images to determine each object's identifying indicium. For example, the imaging system may capture an image of an alphanumeric indicium and utilize a machine learning or artificial intelligence algorithm to decipher the identifying indicium. The imaging system may also scan a QR code, bar code, or the like to decipher the identifying indicium. The imaging system may be located in any suitable location, such attached to or near the main hook block of a crane boom. The imaging system may also be located within one or more drone vehicles or more mobile devices.

In some embodiments of the present invention, the imaging system measures geometric properties of the building material object (e.g., width (flange width), length, and height of a structural member) and compares the measured geometric properties with those stored in a construction site database (e.g., BIM data) or other database(s). For example, the imaging system may identify a building material object as a cement bucket and determine the geometric properties (for example, the diameter and height of a round shaped bucket) and then computes the volume of a filled bucket of cement or may determine the volume of cement of a partially filled bucket by determining the height of the cement contained within the bucket. As another example, a computing system may also determine the number of rebar pieces longitudinally bundled and strapped together for hoisting and determines the geometric attributes (length and diameter) of the rebar and compare the computed geometric properties with those stored in a construction site database. Those building material objects not matching the geometric properties of the design specifications can subsequently be visually identified within the visual representation of the shakeout field before the lifting process begins, further ensuring that the correct building material object will be hoisted to the construction site destination location.

In some embodiments of the present invention, the imaging system can identify, classify, and determine the actual dimensions, locations, and other geometric attributes of structural features, such as brackets or hole patterns associated with the building material object, compare those features' dimensions and locations with those stored in a construction site database (BIM or other database), and visually identify those members not meeting the dimensions, locations, and other geometric specifications for the structural features. In order to ensure that the measured geometric properties are accurate, the imaging system may combine image data with the output of a distance measuring device, such as LIDAR.

In some embodiments of the present invention, the imaging system executes image processing and convolutional neural network software, trained to recognize alphanumeric characters and/or symbols, to accurately recognize identifying indicia and measure the geometric properties of structural members within a shakeout field. Together, this software can identify structural members within a shakeout field, identify and recognize the identify indicium for each structural member, identify and recognize the structural features associated with each structural member, and provide geometric measurements of both the structural member and the structural features thereof.

In some embodiments, of the present invention, the imaging system is equipped with an inertial navigation system (INS) that tracks the location of the imaging system as well as the location of the hoisted structural member within the job site. Data from the imaging system's INS can be fed into the construction site database in order to track, in real time, the location of the imaging system itself, the location of structural members within the shakeout field, and/or other important features of the job site, such as obstacles that the crane operator will need to avoid while lifting a structural member from its initial location to its destination location.

In some embodiments of the present invention, the imaging system interacts with several other systems, including: an operator system, which may located within the cab of a crane, for example; a mobile system (the "mobile system"); and/or a server system (the "server"). These systems can be in bidirectional communication with one another and can transmit and receive data via radio frequency (RF) modems or the like. Additionally, each of these systems can be in bidirectional communication with a cloud service and can all transmit and receive data to the cloud via the internet or other suitable network.

In some embodiments of the present invention, the operator system is located within the cab of the crane and includes one or more computers, display devices (e.g. liquid crystal displays (LCDs)), input devices (e.g., keyboards, joysticks, touch sensitive displays), wireless communication modems, and power supply systems. The computer also includes a speaker for giving audio instructions and other information to the crane operator. Like the imaging system, the operator system can also be equipped with one or more INS that track the location of the operator system within the job site.

In some embodiments of the present invention, the imaging system is attached to and moves along with the crane's main hook block. In this circumstance, an imaging system and an operator system are dedicated to a specific crane and are referred to as a crane-specific system (i.e., they are associated with only a single specific crane). Any number of mobile systems may be associated with a crane-specific system. Therefore, for construction sites having more than one crane, there will be a multitude of crane-specific systems comprising the first and imaging systems for each crane and one or more mobile systems associated with each crane-specific system. In other embodiments, the imaging system may be attached to one or more drone vehicles. In these embodiments, the imaging system may be communicatively coupled with a single crane (maintaining a crane-specific system) or communicatively coupled to each of multiple cranes on a single construction site in which case, data gathered by the imaging system may be collected and associated with a specific crane on the basis of identified identifying indicia and/or by the building material object's location on the construction site (e.g., in a particular shakeout field).

In some embodiments of the present invention, additional software is provided for displaying instructions, graphics, and other information to the crane operator via the display. For example, a display device within the cab can show the operator a 3D representation of the job site. The 3D representation may illustrate any information captured by the imaging system, including the location of structural members within the shakeout field, details of the structure under construction, and/or boundaries of the job site. The 3D representation may also illustrate, for each identified structural member, a path from its initial location to its destination location and any potential obstructions along or in the vicinity of the path.

In some embodiments of the present invention, a computing system (which may be the imaging system, an operator system, a mobile system, a server system, or cloud service) generates a visual representation of the shakeout field along with the each identified building material object annotated with a computer-generated identifying indicium which may be presented to the crane operator on an display of the operator system and/or transmitted to other construction site workers via one or more mobile systems. For each queued building material object to be hoisted, a unique visual identifier highlights the building material object within the visual representation of the shakeout field for the crane operator. For example, the next structural member to be hoisted (as identified in the lifting list) may be visually identified to the crane operator (e.g., by coloring the building material object green and/or highlighting its perimeter). Other visual or audible identifiers may be used in order to ensure that the desired building material object will be hoisted in the correct order as noted in the lifting list. In some embodiments, building material objects which are not contained within the lifting list but are located within the shakeout field can be visually identified by a contrasting-colored symbol, such as a red "X" for example.

In some embodiments of the present invention, a computing system determines the center-of-gravity of the building material object and places a visual center-of-gravity locating symbol overlaid on top of the identified building material object. Additionally, as the crane operator prepares to hoist a building material object (such as a structural member) from the shakeout field location, a crosshair pattern can be overlaid onto the visual representation on the shakeout field for visually indicating the main hook block shakeout field location. As the hook and block is moved from one location to another, the crosshair pattern displayed to the crane operator can move in relation to the main hook block movement. The crane operator can then visually compare the LCD screen location of the building material object queued to be hoisted with the main hook block crosshair pattern and move the crane boom to align the crosshair pattern over the highlighted building material object, and specifically over the center-of-gravity location symbol of the selected building material object, in preparation for hoisting.

In some embodiments of the present invention, a computing device can generate a three-dimensional projected path from the shakeout field (beginning location) to the designated attachment or destination location on the steel structure is provided to further assist the crane operator to properly place the selected structural member or building material object respectively at the attachment location or destination location respectively. The initial location of the building material object is obtained from the imaging system, and the destination location may be determined from the construction site data (BIM data) previously stored in the server system. The projected path is calculated from the initial location to the destination location and is continuously updated in the construction site database as additional building material objects are added to the steel structure. The updated construction site database provides avoidance data for the projected path generation. The projected path can be visually communicated to the crane operator via the cab computer and the operator system's display and/or via audible hoisting instructions communicated to the crane operator via the operator system's speaker.

The projected path calculation depends upon the correct identification of the attachment or destination location on the steel structure, which is linked to every structural member or building material object with the identifying indicium and the data obtained from the BIM database. Misidentification of the structural member or building material object will result in an incorrect projected path calculation and therefore an incorrect attachment or destination location.

A misidentified structural member or building material object further results in the already hoisted structural member or building material object having to be returned to the shakeout field and the desired structural member or building material object re-identified, and then again hoisted to the desired attachment or destination location.

In some embodiments of the present invention, a computing device computes a virtual 3D "avoidance shroud" around each building material object. The avoidance shroud may be calculated based on the identifying indicium for building material object and the dimensions contained with the construction site database for the identified building material object. The 3D avoidance shroud may consist of expanded dimensions for enveloping the building material object. For example, a rectangular 3D avoidance shroud (an enveloping volume) for an I-beam structural member having a length of 10 feet, a width of 1 foot, and a height of 2 feet may have these dimensions increased to 12 feet for the length, 2 feet for the width and 3 feet for the height, or a percentage increase of the actual dimensions may be used. Each placed and hoisted building material object therefore has an associated collision avoidance shroud enveloping the actual object. As a building material object (the "load") is being hoisted, the operator system can provide an early collision warning collision alert that warns the crane operator that the projection of the current hoisting path to the destination location of the load may collide with the existing steel structure or other building material objects. The early warning collision warning system can use the collision avoidance shrouds of the already placed building material objects and the collision avoidance shroud of the hoisted building material object to determine whether the hoisted shroud will intersect the collision avoidance shrouds of the already placed building material objects along the projected destination path. This approach minimizes the risk of collisions between those building material objects previously placed at the construction site and the building material object being currently hoisted to their respective destination location.

In some embodiments of the present invention, a computing device computes an optimal 3D hoisting path from the shakeout field location to the destination location for each hoisted building material object. The computed optimum 3D path can take into consideration the already placed building material objects and their respective collision avoidance shrouds along with the location of the currently hoisted building material object and its respective collision avoidance shroud. In some embodiments, the 3D path for the first building material object to be hoisted by the crane operator is automatically recorded and stored in memory. A subsequent path for the second building material object is calculated based upon the first recorded path, the shakeout field location, and destination location of the second building material object and the collision avoidance shrouds of the already placed building material objects, and the hoisted object. The destination locations for every building material object may be derived from the construction site database using each building material object's identifying indicium. The 3D paths are displayed to the crane operator along with the collision avoidance shrouds to assist the crane operator in placing the building material objects at their desired destination locations, and movements (left, right, up, and down) may be suggested to assist the operator in avoiding collisions among the already in place building material objects. These suggested movements may be visually or verbally transmitted to the crane operator. Additionally, once the hoisted building material object has been hoisted to the correct destination location, the operator system can alert the operator that the correct building material object is in the correct destination location according to the construction site database.

Some embodiments of the present invention include one or more mobile systems in bidirectional communication with the imaging system, operator system, and/or the server system. A mobile system is preferably implemented as a hand-held computer system like a laptop computer, tablet, cellular telephone, or the like, and can therefore include one or more processors, display devices, and or input devices. The mobile system also includes an RF modem for communication with the other system elements and is also equipped (hardware and software) to access the internet. Additionally, the mobile system incorporates an INS which includes an RTK enabled GNSS receiver for determining the location of the mobile system both within and outside of the immediate construction site area. The mobile system may also have full or restricted access data about the job site, such the full construction site database, lifting lists, 3D path data, and the like. The mobile system may display this data to a contractor, foreman, crane operator, shakeout field associate, or any other suitable member of the crew. The mobile system(s) may be carried by the iron workers located on the steel structure, by the shakeout field associates, or by other construction site personnel. The mobile system(s) may include a conventional tablet or portable computer, cell phone or other types of communication devices. The mobile systems may not be specifically dedicated to any one crane and may access other crane-specific data associated with other cranes via the internet and server.

Some embodiments of the present invention include one or more server systems in bidirectional communication with the imaging system, operator system, and/or the server system. The server system may be conventional in design and operate on the basis of the common request-response paradigm. For example, the server system may store the construction site database, including the lifting list data and other construction site related data, and provide that data to the operator system, imagining system, and/or mobile system on request or as needed. The server system is further equipped to access the internet via Wi-Fi, cellular or by any other conventional means. The server also includes one or more wireless communication modems to communicate with the other systems.

Other objects and advantages of the present invention will become clearer following a review of the specification and drawings. It is to be understood that both the foregoing general description and the following detailed description are exemplary, but are not restrictive, of the invention.

V. BRIEF DESCRIPTION OF THE DRAWING

The above and other aspects and advantages of the invention will become more apparent upon consideration of the following detailed description, taken in conjunction with accompanying drawings, in which like reference characters refer to like parts throughout, and in which.

VI. DETAILED DESCRIPTION OF THE INVENTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1:
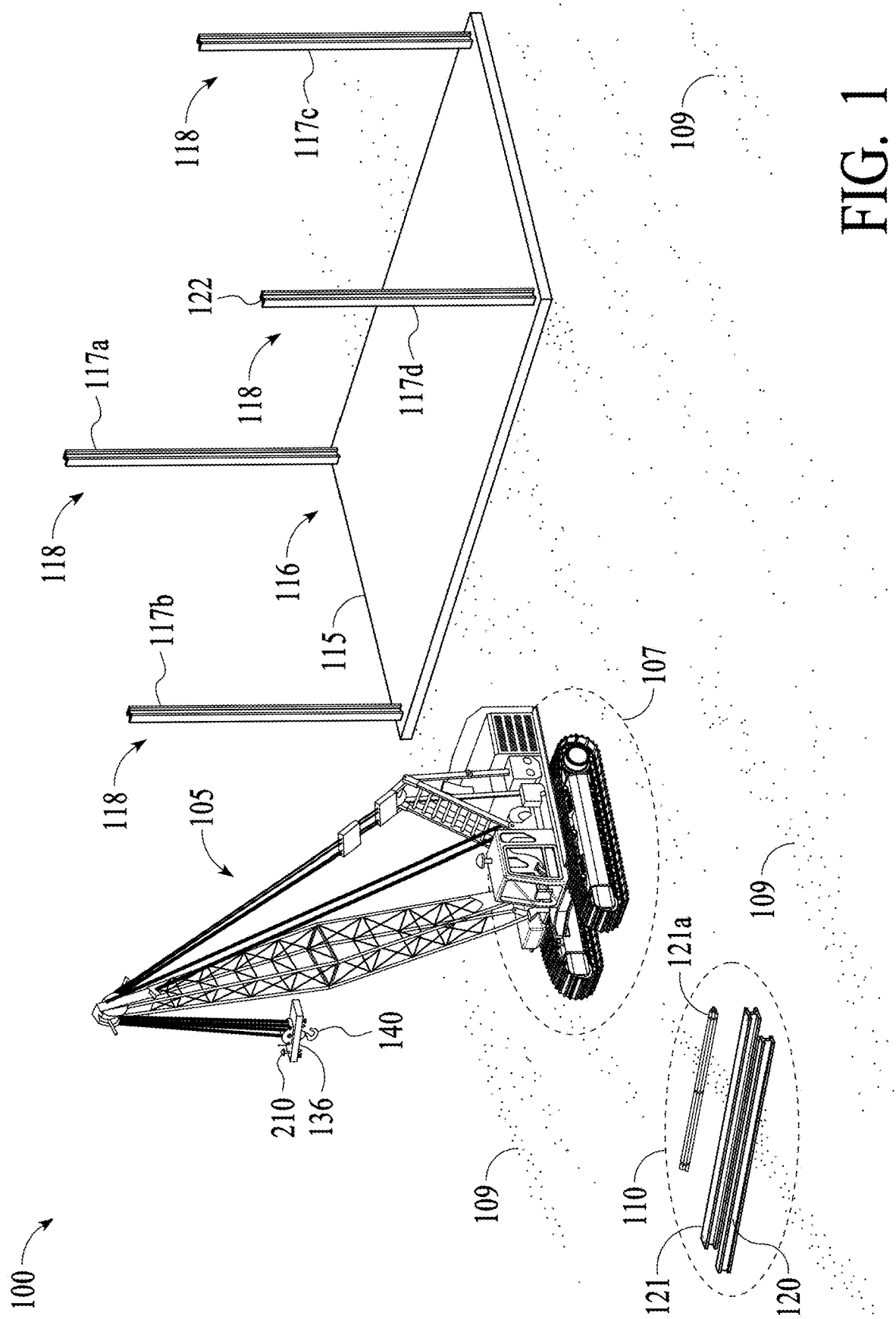
FIG. 1 is a perspective view of a typical crawler crane located at a construction site along with a shakeout field containing building material objects and a partially completed structure, in accordance with embodiments of the present invention.

Referring to FIG. 1, a representation of a typical construction site 100 is shown having crane 105, shakeout field 110, and structure 115, which is partially complete as illustrated. Although crane 105 is illustrated as a crawler crane, other types of cranes, such as tower cranes, harbor (floating) cranes, telescopic cranes, level-luffing cranes, rough-terrain cranes, and a gantry and jib type crane, for example, are explicitly contemplated. Other types of cranes and similar construction equipment not specifically listed here are explicitly contemplated to be within the scope of the invention. Crane 105 is positioned on ground 109 at crane hoisting location 107, which is typically located near shakeout field 110 and structure 115 to enable efficient hoisting of the building material objects from the shakeout field to the partially completed structure. Structure 115 includes foundation 116 and partially completed structure 118. Partially completed structure 118 includes vertical columns 117a, 117b, 117c, and 117d, which are conventionally attached to the foundation 116.

Shakeout field 110 is an area designated by construction personnel where building material objects, such as structural members arriving from the steel fabricator, are off-loaded, usually from flatbed trucks. For large construction projects having more than one crane, there may be many multiple shakeout fields, each of which is near a crane hoisting location of a respective crane. The shakeout field locations are, therefore, often not fixed within a construction site but placed in a location convenient for their associated crane hoisting locations. Similarly, crane 105 may hoist building material objects on one side of the structure 115 one day and move to another location on a different day to hoist building material objects on another side of the structure 115. In this case, there will be two (or more) shakeout fields 110 corresponding to the two different crane hoisting locations of the one or more cranes.

Shakeout field 110 contains the various building material objects, such as structural members to be hoisted from the shakeout field to an attachment location on partially completed structure 118, or other types of building material objects such as rebar or cement buckets. These structural members typically include beams, girders, columns, and the like, but a structural member may be any suitable building component. As shown in FIG. 1, shakeout field 110 contains I-beams 120 and 121 and bundled rebar 121a. The structural members are usually different sizes and may have holes, gussets, brackets, and other structural features dictated by the building specifications of the structure 115. Although only two I-beams 120 and 121 are shown for clarity, there are usually many more structural members contained within the shakeout field. Similarly, only one bundle of rebar 121a is shown for clarity but other types of building material objects may be placed within the shakeout field area including, but not limited to, cement buckets, HVAC equipment, glass plates, etc. Shakeout field 110 may contain any number of different building material objects necessary for the construction of the structure 115.

As crane 105 hoists building material objects into place from shakeout field 110, it is not unusual for additional deliveries of new building material objects arrive at the shakeout field to replenish the already hoisted building material objects. Depending upon the specifications of structure 115, different types of cranes may be used on construction site 100. For example, it is not unusual for a to have multiple different types of cranes on site, such as tower cranes, in addition to crawler cranes.

The major function of crane 105 in the construction of structure 115 is to hoist a structural member (e.g., I-beam 121), from shakeout field 110 to an attachment location on partially completed structure 118. For example, attachment location 122 on column 117d may be the destination location for I-beam 121. Once I-beam 121 is hoisted into place, one or more members of the crew (not shown) attach the I-beam to attachment location 122 of column 117d by conventional means (e.g., bolts, rivets, and the like). Besides hoisting structural members from the shakeout field 110 to partially erected structure 118, other building materials may be similarly hoisted from the shakeout field 110 to the partially erected structure 118, such as the bundle of rebar 121a.

Figure 2:
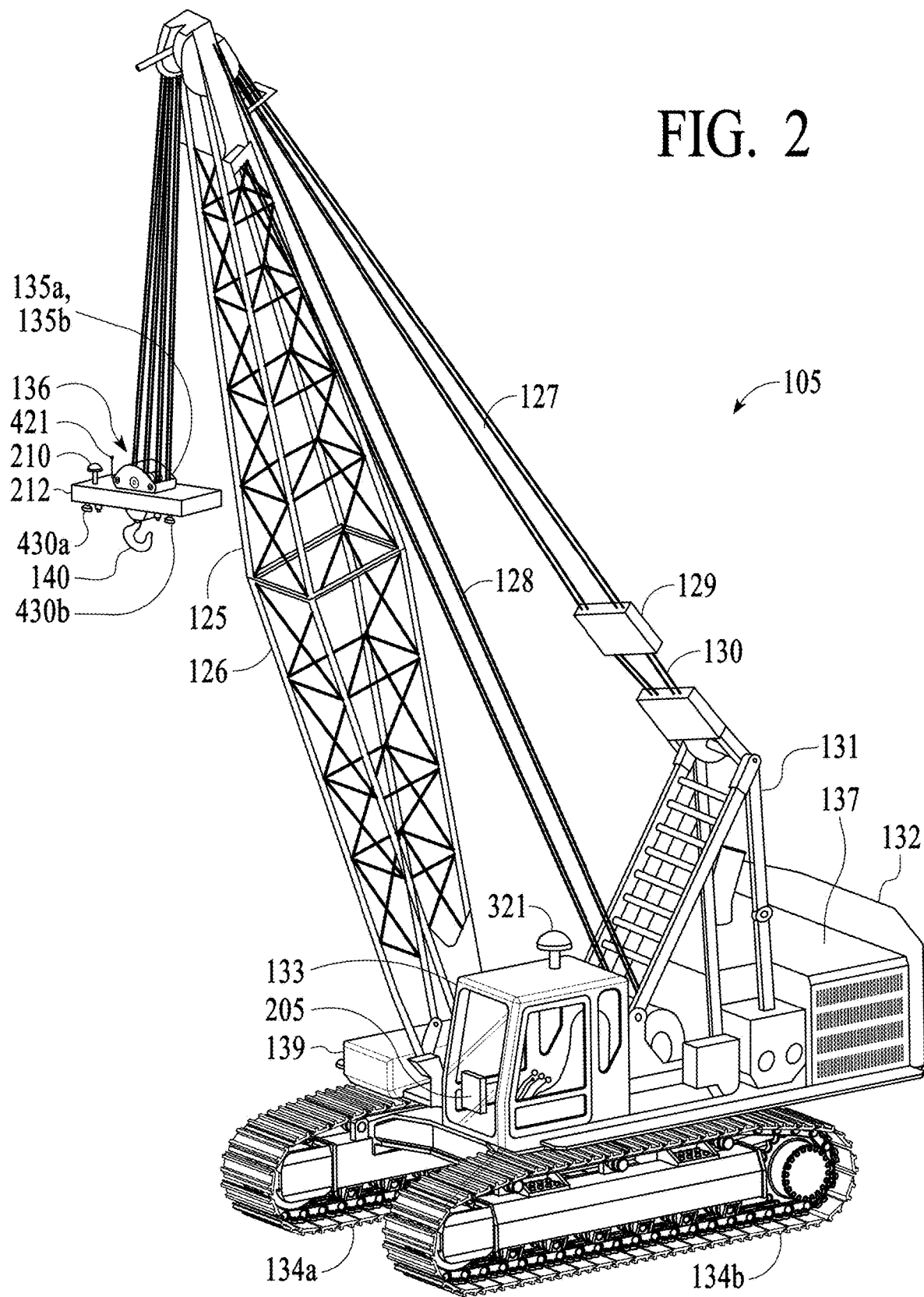
FIG. 2 is a perspective view of a crawler crane, including an operator system mounted in the cab of the crane and an imaging system mounted on the main hook block, in accordance with embodiments of the present invention.

Referring now to FIG. 2, crane 105 is shown having upper arm 125, lower arm 126, master strap 127, master wire rope 128, luffing pulley 129, luffing wire rope 130, mast bracket 131, counterweight 132, crane cab 133, right-side powered tread 134a, left-side powered tread 134b, main hook block sheaves 135a and 135b, and main hook block 136 with lifting hook 140. Crane 105 is powered by diesel engine 137, hydraulic system 138 (not shown), and/or electrical power source 139, which provides electrical power at least to the crane for raising and lowering the main hook block 136. The other parts and operation of the crane 105 are well known in the art and will not be reviewed in this specification.

Figure 9A:
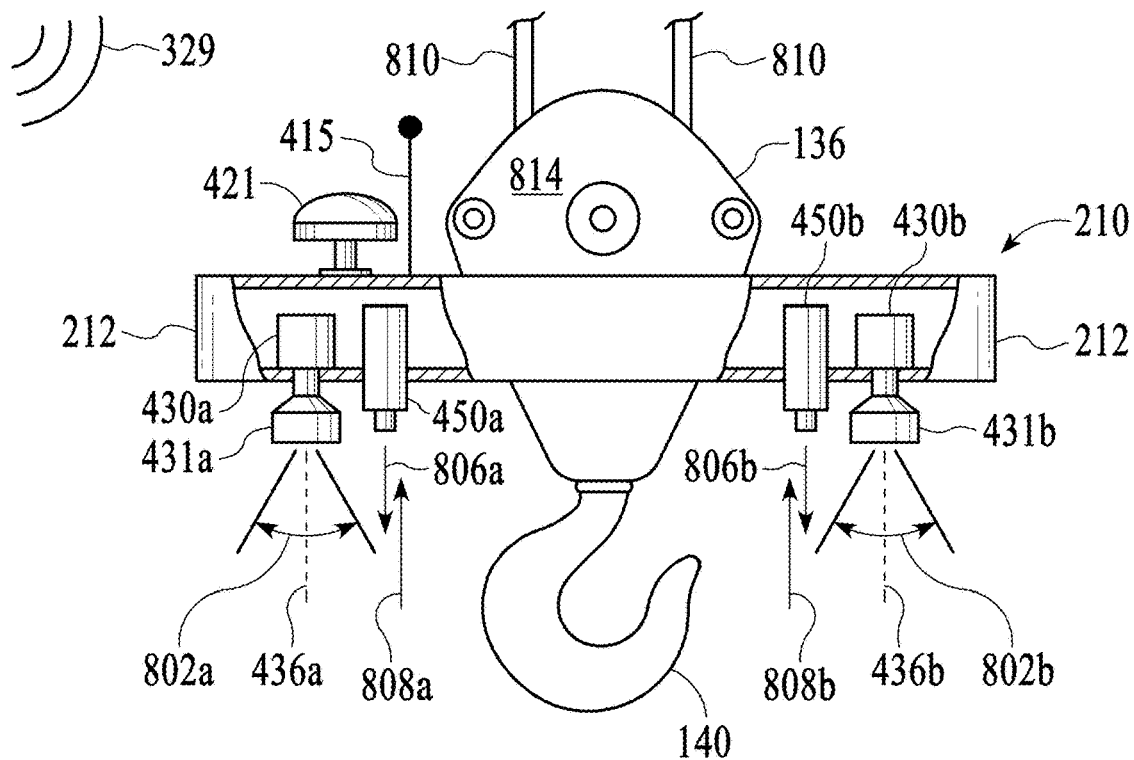
FIG. 9A is a front view of a main hook block having the imaging system mounted above the lifting hook, in accordance with embodiments of the present invention.
Figure 9B:
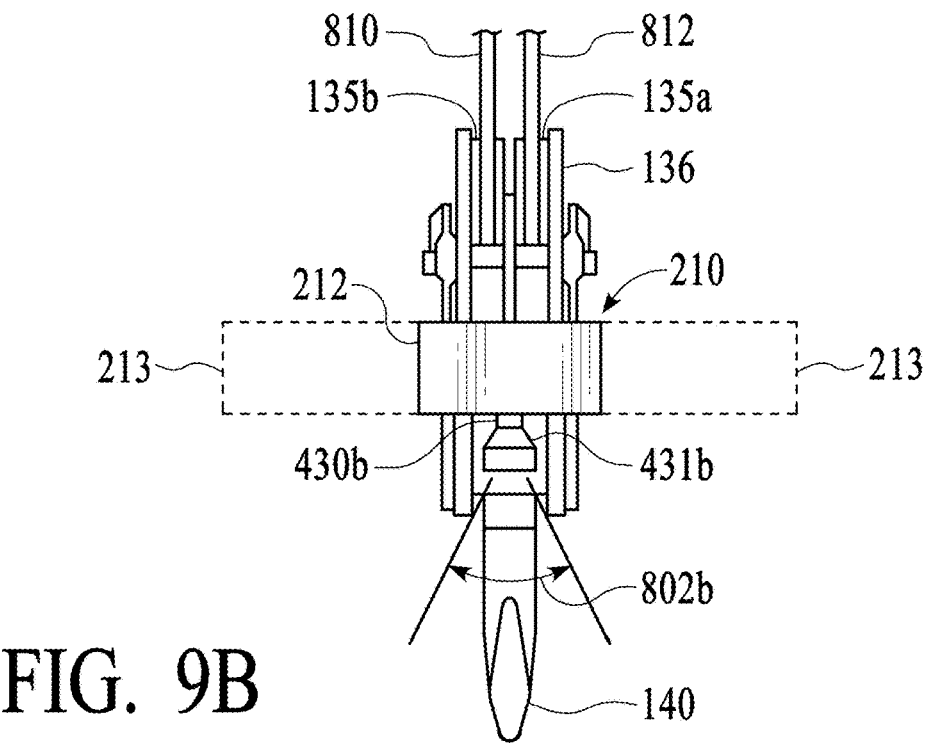
FIG. 9B is a side view of the main hook block of FIG. 9A, in accordance with embodiments of the present invention.

Imaging system 210 is shown attached to main hook block 136 and is contained within an optional weatherproof housing 212. Imaging system 210 includes downwardly focused imagers 430a and 430b. Although two imagers are depicted in FIG. 2, imaging system 210 may include any number of imagers. An alternative mounting position 213 for the imaging system 210 is shown in FIG. 9B.

Imaging system 210 also includes an INS. The INS may include a real time kinematic (RTK) enabled global navigation satellite system (GNSS) receiver and an inertial measurement unit (IMU). The GNSS receiver may receive United States GPS, Russian Federation Glonass system, People's Republic of China's BeiDou system, European Galileo system, and other navigation signals for determining accurate latitude, longitude, and altitude data. The IMU provides linear acceleration, angular velocity (and/or angular acceleration), and orientation data referenced to the INS coordinate system and enables dead reckoning calculations for the operator system location when GNSS signals become unavailable. GNSS antenna 421 is mounted atop waterproof housing 212. However, the antenna may be located at any suitable portion of imaging system 210. Operator system 205 and imaging system 210 are discussed more fully with reference to FIGS. 3-5.

Figure 3A:
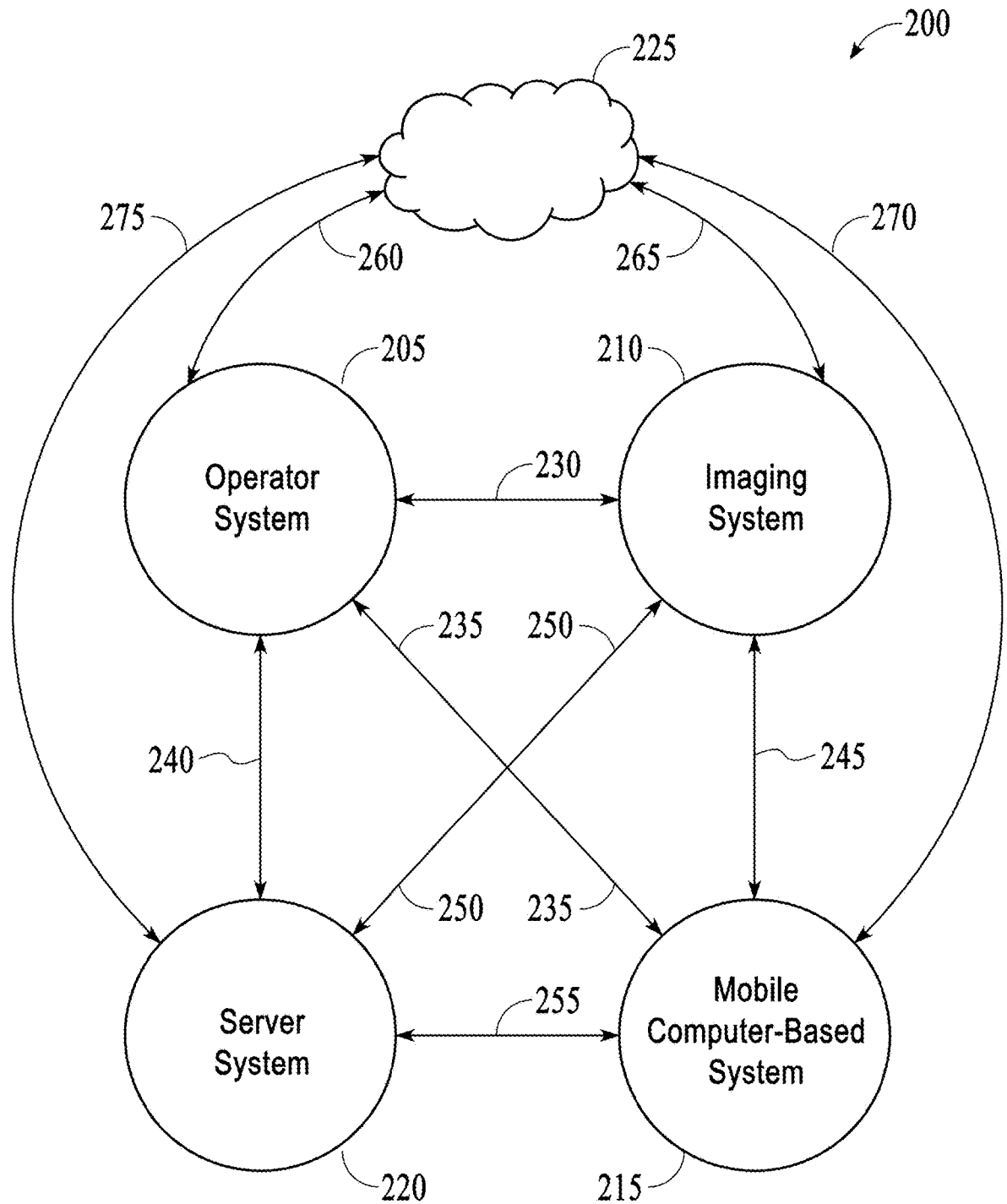
FIGS. 3A and 3B are schematic diagrams illustrating bidirectional communications between an imaging system, an operator system, a mobile system, a server system, and a cloud service, in accordance with embodiments of the present invention.

Referring now to FIG. 3A, crane-assistance system 200 includes operator system 205, imaging system 210, mobile system 215, and server system 220. Each of these systems may also communicate with cloud service 225 via the internet or other suitable network. Operator system 205 is in bidirectional communication with (a) imaging system 210 via communication channel 230, (b) mobile system 215 via communication channel 235, (c) server system 220 via communication channel 240, and (d) the cloud 225 via communication channel 260. Imaging system 210 is also in bidirectional communication with the (a) mobile system 215 via communication channel 245, (b) server system 220 via communication channel 250, and (c) cloud service 225 via communication channel 265. Mobile system 215 is also in bidirectional communication with (a) the server system 220 via communication channel 255, and (b) cloud service 225 via communication channel 270. Finally, server system 220 is also in bidirectional communication with cloud service 225 via communication channel 275. Thus, all system elements of system 200 are in bidirectional communication with each other and the cloud.

Figure 3B:
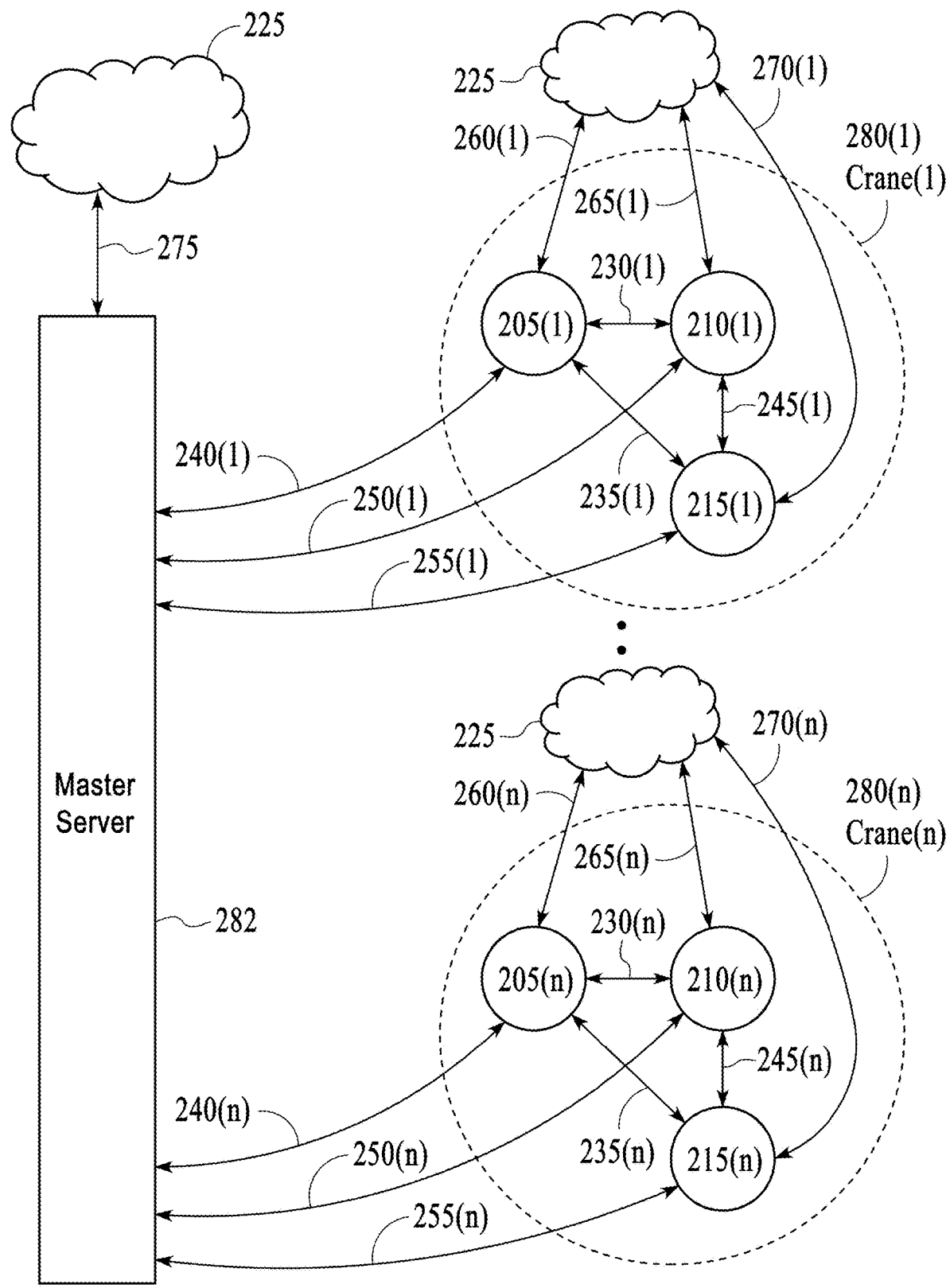

Referring to FIG. 3B, crane-assistance system 200 may be expanded to include more than one crane. Each individual crane can have a crane-specific system 280(n) comprising operator system 205(n) and imaging system 210(n). One or more mobile computer-based systems 215(n) (n index and indicates the crane number) may also be associated with the crane-specific system 280(n). Each crane-specific system 280(n) maintains the same communication channels among operator system 205(n), the second computer-based system 210(n), cloud service 225, and one or more of the mobile systems 215(n) for a specific crane. Each crane-specific system 280(n) still communicates with a single master server system 282. Master server system 282 communicates with cloud service 225 via communication channel 275. Therefore, each crane-specific system 280(n) may communicate with any other crane specific system 280(m) (m indicates the crane number). For example, mobile system 215(3) of crane-specific system 280(3) may communicate with mobile system 215(4) of crane-specific system 280(4). All data collected and processed by all the crane-specific systems may then be accessed via the master server 282. Master server 282 is therefore a data repository for all data collected by the crane-specific systems including the associated mobile systems. Data for the entire construction site process is recorded and is available to others via cloud service 225 from master server 282 and can be analyzed to determine construction site efficiencies and other construction site metrics.

Figure 4:
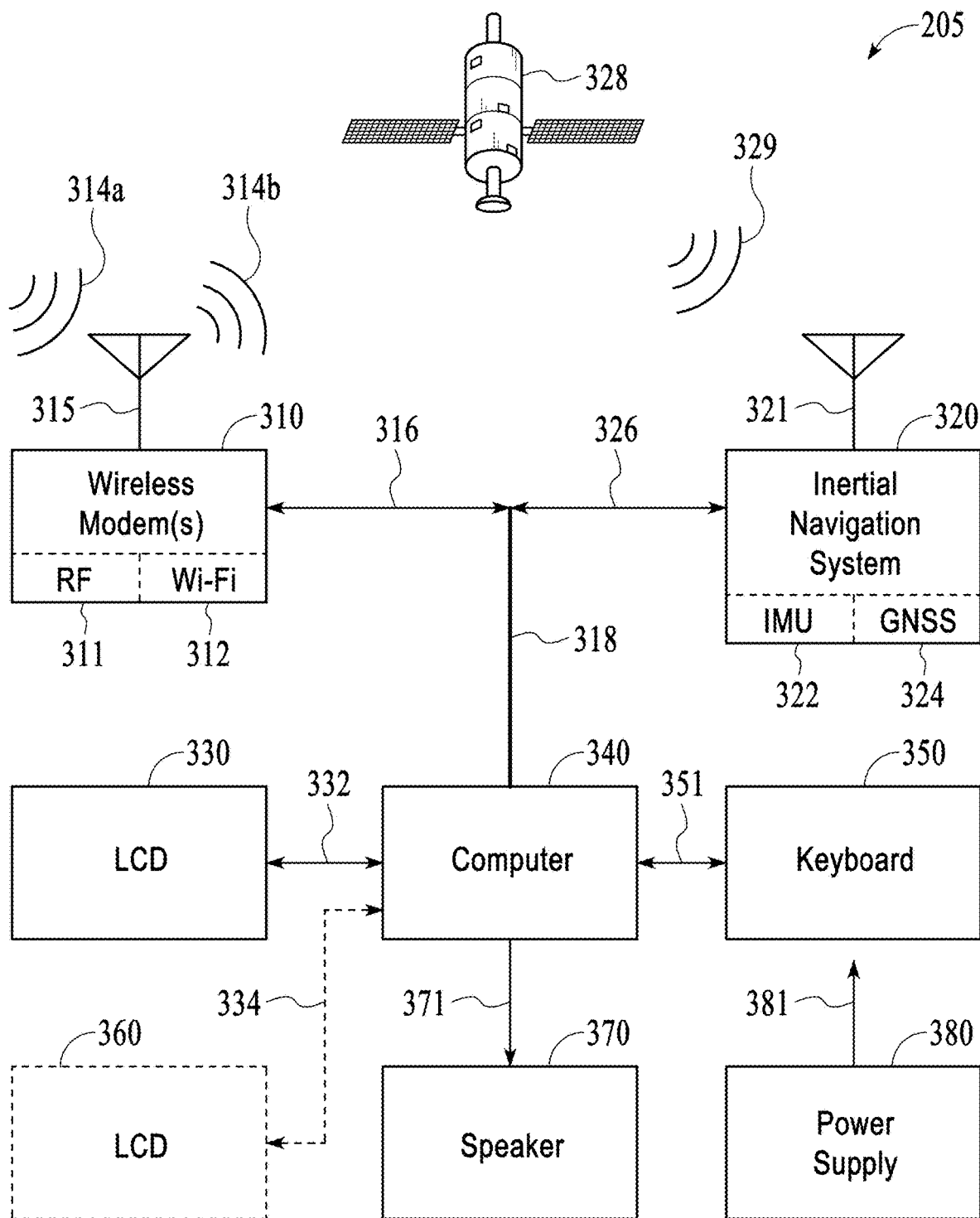
FIG. 4 is a block diagram of an exemplary operator system, in accordance with embodiments of the present invention.

Referring to FIG. 4, a block diagram of operator system 205 is shown. Operator system includes operator wireless modem(s) 310, operator INS 320, operator display 330, operator computer 340, operator input device 350, operator speaker 370, and operator power supply 380. Operator system 205 also optionally includes second operator display 360.

Operator wireless modem(s) 310 may include RF wireless modem 311 for communicating with wireless modems of the other system elements (e.g., imaging system 210, mobile system(s) 215, and server system 220) and wireless modem 312 and/or cellular modem 313 (not shown) for communicating with cloud service 225 via a Wi-Fi or cellular network, respectively. Additional modems may be further incorporated into the operator system's wireless modems 310 as needed. In other embodiments, all of the system elements communicate directly with cloud service 225 and communicate with each other via the communications channels of cloud service 225. In this case the operator system 205 only requires modem 312. Operator wireless modem(s) 310 receive incoming signals 314a and transmit outgoing signals 314b via respective antennas 315 (although only one antenna is shown in FIG. 4). Operator wireless modem(s) 310 communicate with the other components of operator system 205, including INS system 320 and computer 340, via local bus 316 and/or master bus 318.

INS system 320 receives the GNSS signals 329 from the satellite constellation 328 (the constellation 328 is shown with only one satellite for clarity) via the GNSS antenna 321 and GNSS receiver 324. It also computes, along with data from the inertial measurement unit 322, the LLA and/or ECEF location fix for the operator system. Thus, the GNSS location of crane 105 is known. The LLA and/or ECEF location fix may be used to determine the location of the crane 105 in other coordinate systems such as the Universal Transverse Mercator (UTM) coordinate system. Conversion among the various conventional coordinate systems is well known in the art. INS system 320 (specifically GNSS receiver 324) also receives RTK correction data via modems 310. IMU 322 provides the translational (X, Y, and Z) acceleration, the angular rate, and orientation information with respect to the INS's coordinate system. INS 320 communicates with the other system components of the operator system 205 via bus 326 and/or master bus 318. An example of INS 320 is the Certus model by Advanced Navigation of Sydney, Australia. There are many manufacturers of INS systems and include Trimble Navigation of Sunnyvale California and SBG Systems S.A.S of Santa Ana, California (U.S. office).

Operator computer 340 is a conventional computer constructively configured in both hardware and software to perform those tasks necessary to fulfill all the above listed objects of the invention. Computer 340 may include serial and parallel communication ports. For example, computer 340 may include universal serial ports (USB), Centronics parallel communication ports, ethernet ports, RS-232 ports, RS-485 ports, and other communication ports necessary to communicate with the other components of operator system 205.

Display 330 is a conventional computer monitor, such as a Dell Computer model number E1920H, and communicates with computer 340 via data bus 332. An optional second display 360 may be provided for displaying additional information without having the crane operator switch between multiple windows on the first display. For example, first display 330 may display a representation of the lifting list and second display 360 may display a 3D representation of the construction site and projected hoisting path from a structural member's initial location within the shakeout field to the destination location (e.g. attachment location 122) and the return path from the destination location to shakeout field 110. Second display 360 communicates with computer 340 via data bus 334.

Operator system 205 also includes one or more input devices 350 (e.g., a conventional keyboard or touch-sensitive display) connected to computer 340 via data bus 351, which permits the crane operator to interact with computer 340. Other input devices may be provided and include the conventional joystick 341 and the mouse 342 (both the conventional joystick 341 and mouse 342 are not shown). Speaker 370 may be a conventional speaker, connected to computer 340 via cable 371, that transmits audible instructions, such as potential collision warnings, and other audible communication from the computer 340 to the crane operator. In some embodiments cable 371 may be replaced by a wireless connection, such as a Bluetooth® connection. Power supply 380 is connected to electrical power source 139 of crane 105 (the connection is not shown for clarity) and provides the necessary electrical power to operator system 205 via power bus 381.

Figure 5:
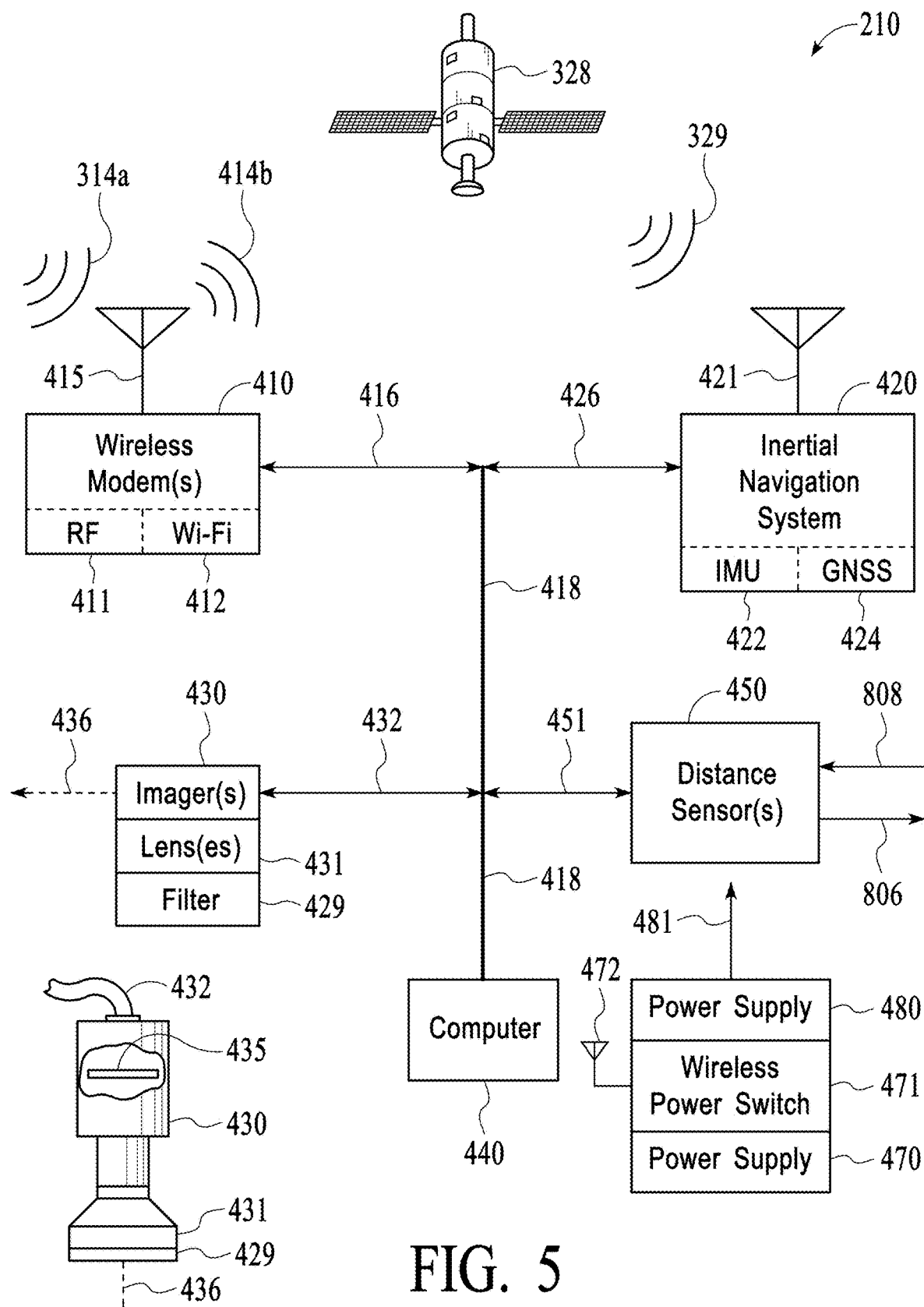
FIG. 5 is a block diagram of an exemplary imaging system, in accordance with embodiments of the present invention.

Referring now to FIG. 5, a block diagram of imaging system 210 is shown and comprises the components including the imager wireless modem(s) 410, imager INS 420, imager computer 440, and imager power supply 480. These components may be similar or identical to the corresponding components of operator system 205 and will not be discussed in detail again. Imaging system 210 also includes imager(s) 430 and distance sensor(s) 450. In some embodiments, imaging system 210 is enclosed in a weatherproof housing 212 and is attached to the main hook block of a crane (e.g., main hook block 136 of FIG. 2). The mounting particulars of the imaging system 210 to the main hook block 136 are further discussed in reference to FIGS. 9A and 9B. Imaging system 210 may also be mounted to one or more drone vehicles that can traverse the construction site automatically or under remote control.

In embodiments in which imaging system 210 is mounted on the main hook block of a crane, INS system 420 can determine the GNSS location of main hook block 136 and the GNSS location of the hoisted building material object. The GNSS location of the main hook block 136 may be converted to other coordinate systems such as UTM using conventional coordinate systems transformations. IMU 422 data may be used to provide the GNSS location of main hook block 136 during dead reckoning for those times that the GNSS satellite 329 signals are weakened or eliminated by structure 115 or by other construction site or other obstructions. In embodiments in which imaging system is located elsewhere (e.g. on one or more drone vehicles), an INS system may still be mounted on main hook block 136 to ensure that GNSS location data for the main hook block and hoisted objects remains available to the other system components.

Imaging Computer 440 can control when images are acquired by providing a hardware trigger signal for the single imager 430 (or imagers 430a and 430b if more than one imager is used as shown in FIG. 2). Imaging computer 440 can also control when target distances are acquired by providing a hardware trigger signal for the distance sensor 450 (or the distance sensors 450a and 450b if more than one distance sensor is used). Imaging computer 440 may also include a conventional analog to digital (A/D) and digital to analog (D/A) systems (not shown). For example, the A/D may be used to sample the voltage of battery 470.

Preferably, imager 430 is downwardly focused onto the ground surface (e.g., ground surface 109). Lens 431 of imager 430 can maintain focus on the ground surface 109 and/or any other objects (e.g., structural members 120 and 121 of FIG. 1) within the field of view of the imager 430 and lens 431. In some embodiments, multiple imagers (e.g. imagers 430a and 430b of FIGS. 2 and 9A) may be used to increase the field of view of shakeout field 110 and/or to provide stereoscopic images of any structural members within the shakeout field. It is noted that the following specification will refer to a single imager 430 and a single lens 431 for clarity, but multiple imagers, each having its own lens and other accessories, are explicitly contemplated. In some embodiments, imager 430 also includes optical filter 429. In some embodiments, imaging system 210 includes additional side-view imagers for viewing the sides of the building material objects within the shakeout field 110 area.

Imager 430 is preferably a wavelength (color)-responsive conventional progressive scan CMOS imager for acquiring images of objects within the field of view of the camera determined by lens 431. Such imagers include CMOS planar sensor 435 having a rectangular-shaped pixel array arranged for converting light into electrical signals, although other sensors may be used to convert other types of electromagnetic radiation (such as infrared or ultraviolet radiation) into electrical signals. An example of this type of CMOS imager is model number acA1440-73gc manufactured by Basler AG of Ahrensburg, Germany. This sensor has a planar senor array of 1440×1080 active pixels and conforms to the GigE communication specification. Imager 430 communicates with the computer 440 via the local bus 432 and/or master bus 418. For the model number Aca1440-73gc camera, local bus 432 is a high bandwidth Ethernet cable, although other communication protocols may be used depending upon the specifications of imager 430.

Imager 430 can be calibrated to accurately map object space to image space distances at different imager-to-object target distances. For example, at a particular imager to object target distance an object space distance will correspond to an image space distance and vice versa. The imager is also calibrated for lens and perspective distortion and is additionally calibrated to determine the GPS position of each image pixel.

Imager 430 includes lens 431, which includes optical bandpass filter 429, and a manually or electronically adjustable aperture (not shown). Imager 430 also has a programmable electronic shutter (not shown), which controllably determines the amount of light received by CMOS sensor 435. Imager 430 along with lens 431 has a conventionally defined optical axis 436. Imager 430 also includes electronic circuitry (not shown) which communicates status, control, and image data using a conventional Ethernet bus interface, via local bus 432 and master bus 418, to computer 440.

Imager 430 may be triggered to acquire an image upon receiving a trigger signal. The trigger signal can be generated in a number of ways, including via a hardware trigger (e.g. a manually operated button located within imaging system 210), a time-deterministic trigger source (i.e., time of occurrence of the trigger signal is known), software command triggering (e.g. upon receiving a command from a user of operator system 205 or mobile system 215), or free run (i.e., acquire images asynchronously, in which case the images are time stamped using the internal clock of the computer 440, INS-provided timing signals, or an external timing source). Imager 430 may also include an internal time stamp appended to each acquired image that indicates when the acquisition of the current image started. This information may be useful for ordering the sequence of images. Other information may be appended to the image data, such as target brightness status and frame ID. The frame ID indicates the frame number of the image that has been exposed and begins at 0 and increments by 1 for each exposed image until the camera stops imaging or is powered off. Still further information (e.g. metadata) may be appended to the image data depending upon the camera manufacturer and model number.

Like imager 430, distance sensor 450 is downwardly focused. It measures the vertical distance from distance senor 450 to a target location by transmitting laser beam 806 and receiving laser beam reflection 808 from the target location's surface. For example, if the target location is on the ground (e.g. ground surface 109 of FIG. 1), distance sensor 450 will provide the vertical distance from the location of the sensor to the ground. Likewise, if the target location is the top surface of a structural member (e.g. structural member 121 of FIG. 1), distance sensor 450 will provide the vertical distance from the sensor to the top surface of the structural member. Taking the difference between these two vertical measurements yields the height of the structural member 121, as further discussed in reference to FIG. 16. Two or more distance sensors 450 (labelled as distance sensors 450*a* and 450*b*) may be incorporated into the imaging system 210, as shown in FIG. 9A.

The distance from distance sensor 450 to the target can also be used to assist in choosing the correct image to object space transformation. For example, at ten meters distance each pixel may represent 0.25 inches and at 20 meters distance each pixel may represent 0.5 inches. Thus, the LIDAR distance measurements can be used to determine the correct image to object space transformation and vice versa. The image and distance data can be synchronized with the GNSS position so that each imaged structural member has associated distance data and GNSS location. The distance data from the distance sensor 450 is transmitted to the computer 440 via bidirectional local bus 451 and/or master bus 418. The distance sensor 450 is preferably a light distance and ranging (LIDAR) sensor having a laser beam being projected outwards from the front of the distance sensor 450. An example of a LIDAR distance sensor is model number optoNCDT ILR2250 manufactured by Micro-Epsilon of Raleigh, North Carolina. Other distance sensor technologies may be incorporated into the imaging system 210, such as ultrasonic distance sensors and RADAR based distance sensors. Additionally, a scanning LIDAR sensor may be used which produces a point cloud of distance data.

Figure 6:
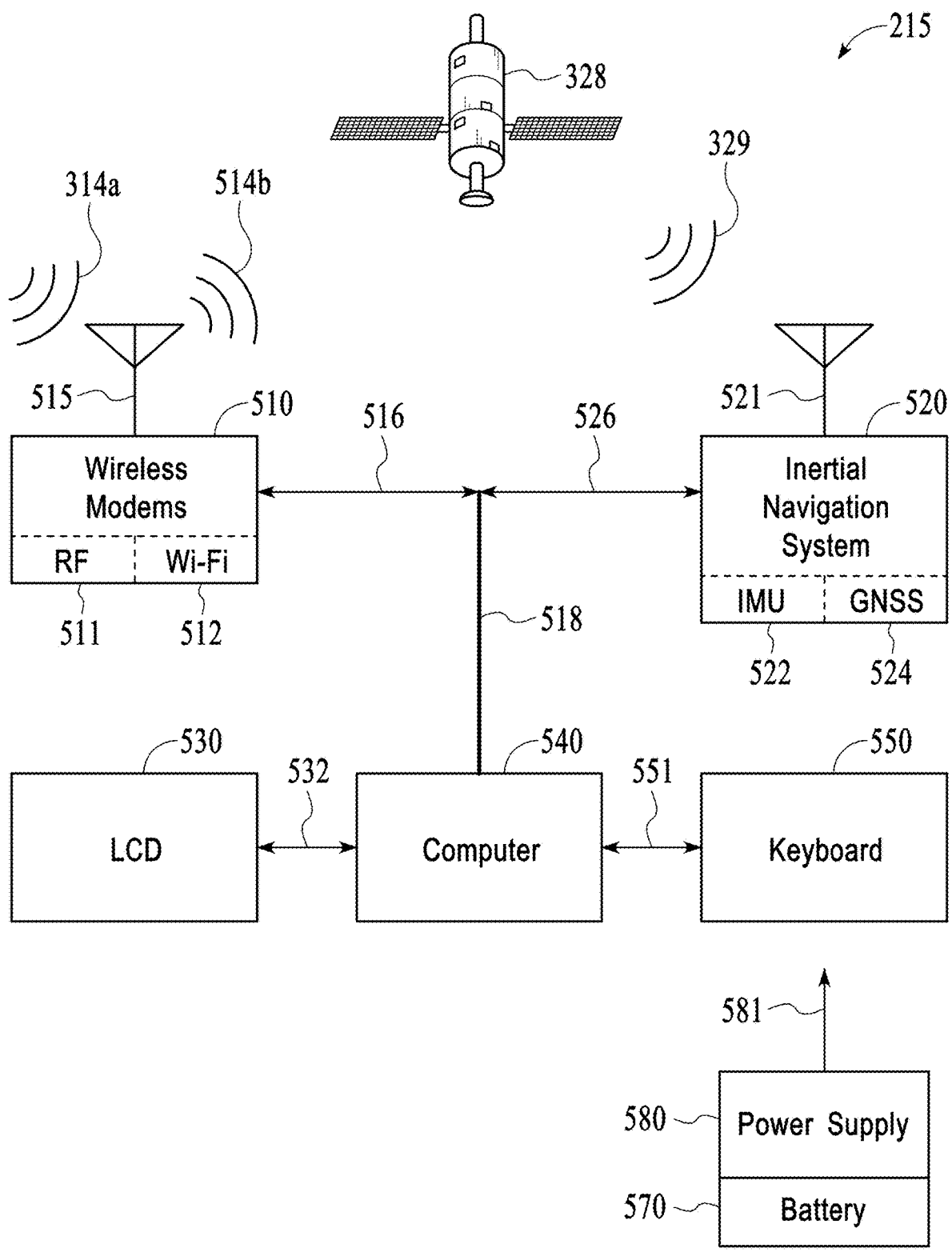
FIG. 6 is a block diagram of an exemplary mobile system, in accordance with embodiments of the present invention.

Referring to FIG. 6, a block diagram of the mobile system 215 is shown. Mobile system 215 includes wireless modem (s) 510, INS 520, display 530, computer 540, input device 550, and power supply 580. These components may be similar or identical to the corresponding components of operator system 205 and imaging system 210 and will not be discussed in detail again. Preferably, the components of mobile system 215 are combined into one physical unit, such as a laptop computer, tablet, or cellular phone.

Figure 7:
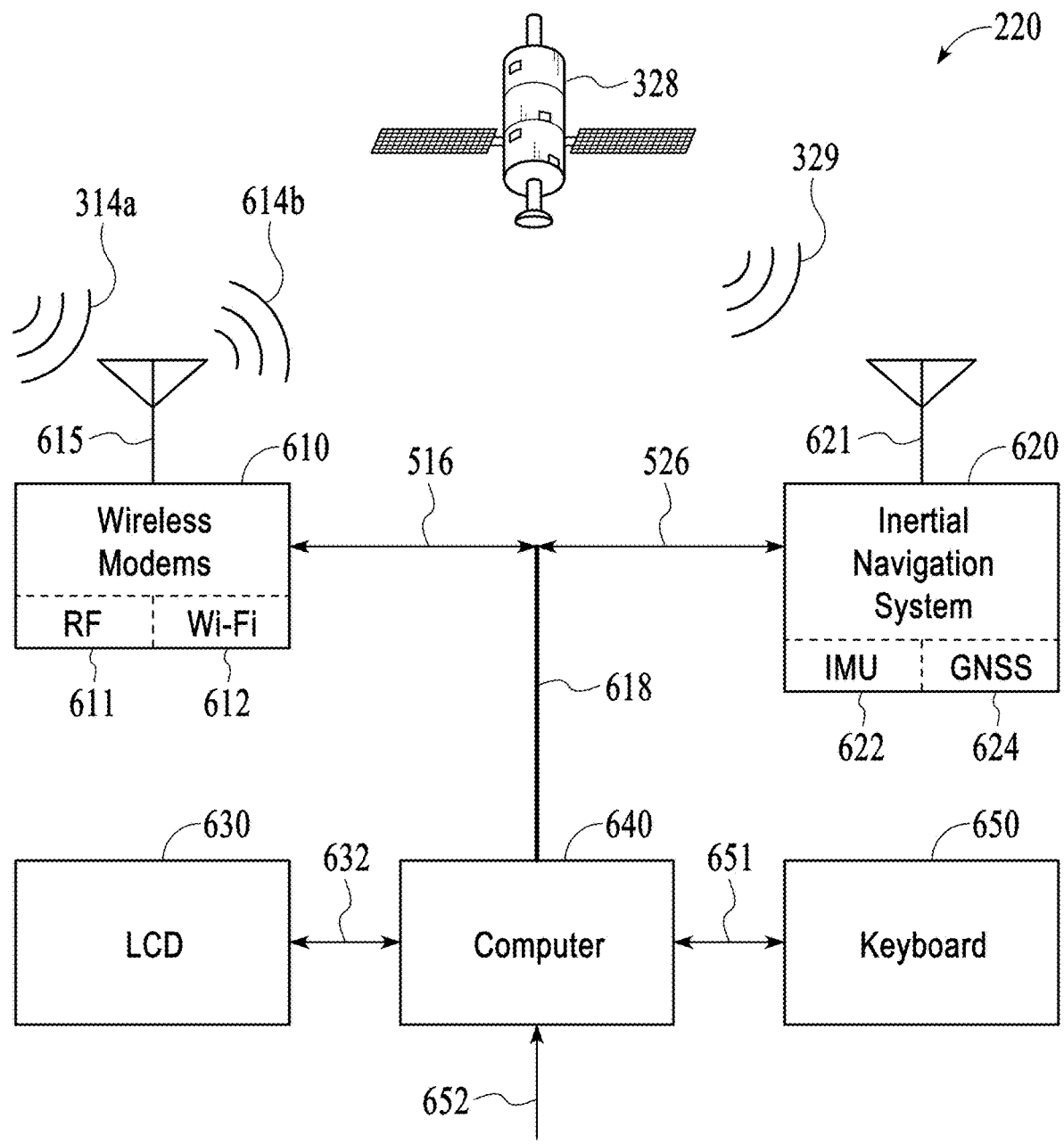
FIG. 7 is a block diagram of an exemplary server system, in accordance with embodiments of the present invention.

Referring to FIG. 7, a block diagram of server system 220 is shown. Server system 220 includes wireless modem(s) 610, INS 620, display 630, computer 640, and input device 650. These components may be similar or identical to the corresponding components of operator system 205, imaging system 210, and mobile system 215 and will not be discussed in detail again. Power to the server is normally provided by the AC power mains and a power supply. For a portable server, the power would be supplied by a battery power source. Server system 220 may be located at construction site 100 (e.g. inside of an on-site construction office) or at an off-site location. The conventional RJ-45 hardwire Ethernet connection 652 provides for connection to the internet (in addition to the modem 612 internet connectivity).

The following disclosure refers to structural members such as I-beams, but this disclosure is also applicable to other building material objects which need to be hoisted from an initial location (the shakeout field) to a destination location on the construction site (usually somewhere on structure 115), and is not limited to just structural members but comprises all building material objects.

Figure 8A:
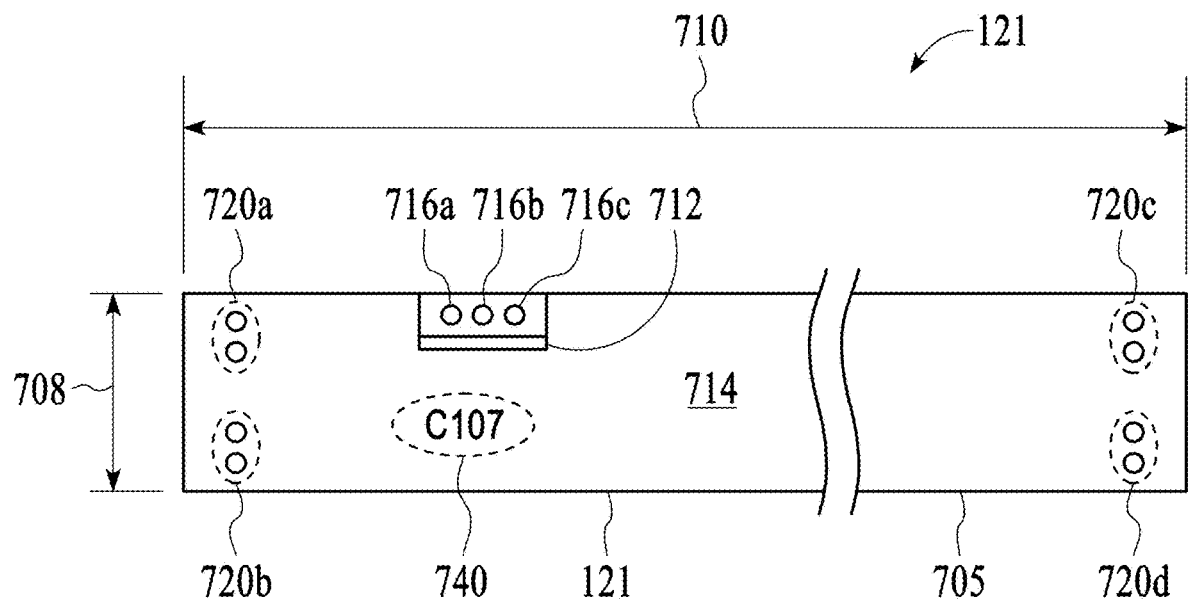
FIG. 8A is a partial top view of a structural member marked with a visible handwritten identifying indicium, in accordance with embodiments of the present invention.
Figure 8B:
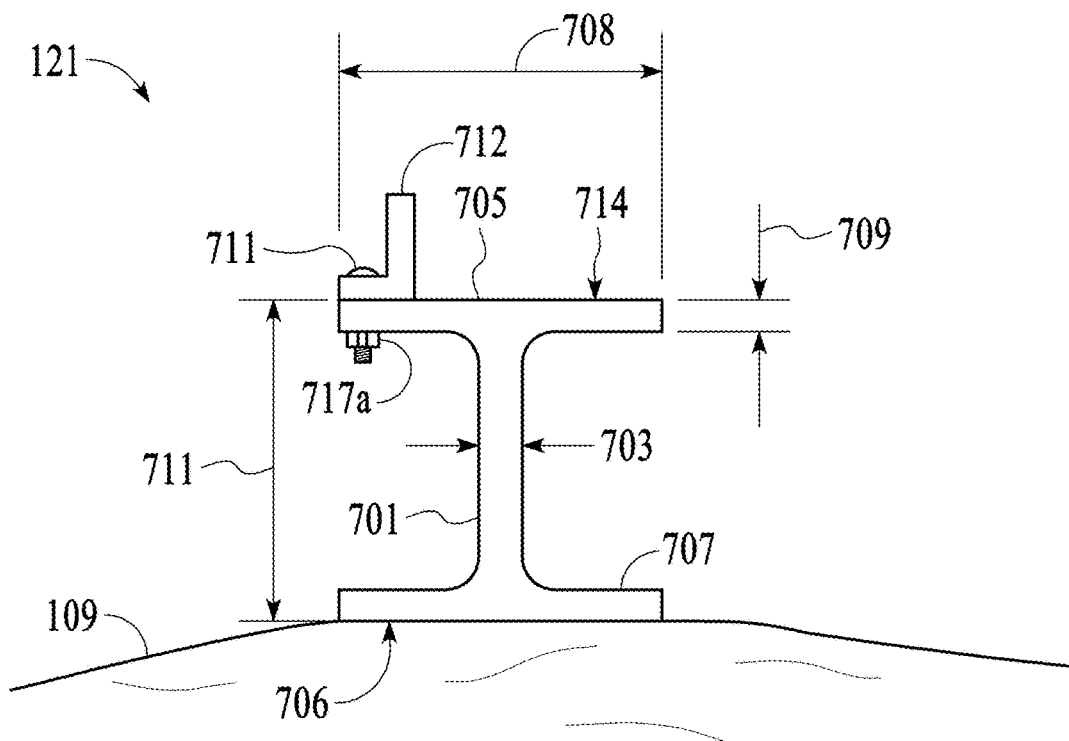
FIG. 8B is a side elevation view of the structural member of FIG. 8A, in accordance with embodiments of the present invention.

Referring now to FIGS. 8A and 8B, structural member 121 (illustrated as a conventional I-beam) is illustrated resting on the ground surface 109 within the shakeout field 110. Structural member 121 includes web 701, having web thickness 703; upper flange 705; upper flange top surface 714; lower flange 707; lower flange bottom surface 706. Also marked win FIGS. 8A and 8B are flange width 708, flange thickness 709, beam length 710, and beam height 711. The depth of the I-beam is defined as the nominal height from the upper flange top surface 714 to lower flange bottom surface 706 (marked as beam height 711).

Additionally, shown in FIGS. 8A and 8B are a number of structural features, including bracket 712 and attachment hole pairs 720*a*, 720*b*, 720*c*, and 720*d*. Bracket 712 is typically attached to upper flange top surface 714 with conventional steel bolts and nuts, although any suitable hardware may be used. Bracket 712 may be provided to hold additional structural members to the structural member 121. The attachment hole pairs are formed on both ends of the structural member 121 and through the upper flange 705. Hole pairs 720*a*, 720*b*, 720*c*, and 720*d* are used for attaching structural member 121 to the partially completed structure 118.

Also located on the upper flange top surface 714 is handwritten or stenciled identifying indicium 740. Identifying indicium 740 identifies structural member 121 and is used to determine, along with the lifting list data, the order for hoisting the member onto the structure 115. Identifying indicium 740 is typically handwritten with chalk or other material (such as spray paint) in a color that provides a high visual contrast between the indicium and upper flange top surface 714 so that. Usually white chalk or white paint is used since structural members are coated with a contrasting color material such as gray paint or other dark colored rust inhibiting material. The color of the identifying indicium 740 may be incorporated into the structural member 121 specification delivered to the steel fabricator to ensure a high contrast between the indicium color and the surface color upon which the indicium is placed. Identifying indicium 740 may also be stenciled onto upper flange top surface 714 and may consist of alphanumeric characters and/or symbols.

In some embodiments, one or more linear barcodes or QR codes (2D) may supplement with alphanumeric indicium. For example, each structural member may be marked with a conventional QR code and/or the above-described handwritten alphanumeric identifying indicium. In these embodiments, the QR code is imaged along with the alphanumeric identifying indicium. The QR code and the alphanumeric indicium may be painted on the building material object or can be printed together or separately on a suitable piece of material (such as cardboard or paper) and which is then placed onto the surface of the building material object using conventional attachment means.

Identifying indicium 740 (or an electronic representation thereof) may be used to access more specific information associated with structural member 121 contained within the construction site database. This information may include, for example, the structural member's length, height, width, weight, date of manufacture, any additional structural features (such as bracket 712 and attachment hole pairs 720*a*, 720*b*, 720*c*, and 720*d*) integral with the structural member 121, and the location of the structural features with respect to the structural member 121 and the dimensions thereof. Other information which may be accessed from the construction site database using identifying indicium 740 may include the other surrounding and/or mating structural members, attachment location coordinates, the identity of the steel fabricator, and any other pertinent information.

In the United States, I-beams are usually specified by their depth 711 and weight in pounds per foot. For example, a W12×22 I-beam has a depth of approximately 12 inches and weighs approximately 22 pounds per foot. Knowing the length of a type W12×22 I-beam structural member allows the weight of the structural member to be determined. The length and type of the structural member is usually contained with the construction site database and may be accessed using the identifying indicium for that particular structural member. The identifying indicium for a particular structural member is used to link together all associated data for that particular structural member. It is important to know the weight of a structural member so that the operator can determine the hoisting load of the respective structural member and ensure that the load does not exceed the lifting capacity of crane 105.

Additionally, the center of gravity (CG) is an important consideration when attaching the rigging necessary to hoist the structural member to the partially completed steel structure. The center-of-gravity may be determined for a given structural member using the data contained within the construction site database and accessed using the identifying indicium for that particular structural member. The cross-sectional profile and other geometric dimensions for a given structural member may be determined from the construction site database. The center-of-gravity of a particular structural member is determined from the dimensions and material density for that particular structural member. Determining the center-of-gravity of an object is well-known in the art.

Referring to FIGS. 9A and 9B, imaging system 210 is illustrated attached to main hook block 136 and enclosed in the waterproof housing 212. Contained within waterproof housing 212 are imagers 430*a* and 430*b*, which are downwardly focused toward the ground. Each imager has a respective field of view 802*a*/802*b* and optical axis 436*a*/436*b*. Imagers 430*a* and 430*b* are horizontally in-line with one another but are located on opposite sides of housing 212. Also illustrated in FIG. 9A are modem antenna(s) 415 and INS antenna 421.

Although imaging system 210 is shown attached to the main hook block 136 for illustration purposes, imaging system 210 may also be attached to conventional spreader beams and lifting beams, or at any other position to give an unobstructed view of the shakeout field 110. Imaging system 210 may also be mounted on one or more drone vehicles capable of traversing the construction site automatically or under remote control. Field of views 802*a* and 802*b* of imagers 430*a* and 430*b*, respectively, can capture images of the shakeout field, including partial or full images of the structural members (e.g. beams, girders, and/or columns) and other building material objects located therein. Also enclosed within housing 212 are distance sensors 450*a* and 450*b* (e.g. LIDAR sensors), both downwardly pointed toward the ground or the other targets, such as the upper flange top surface of a structural member. Distance sensors 450*a* and 450*b* respectively transmit laser light 806*a* and 806*b* and receive respective reflections 808*a* and 808*b*. The LIDAR distance measuring sensors 450*a* and 450*b* are horizontally in-line with one another but are located on opposite sides of the housing 212. In some embodiments, imaging system 210 may be equipped with scanning LIDAR technology. A scanning LIDAR may be used instead of or in addition to imager 430 and/or distance sensor 450. Using a scanning LIDAR, the imaging system can generate a full 3D representation of the shakeout field (including all structural members located therein) and/or a full 3D representation of the partially completed structure.

Other mounting configurations are possible for both the imagers 430*a* and 430*b* as well as LIDAR distance measuring sensors 450*a* and 450*b*, and their placement may depend upon the configuration of the main hook block 136. For example, in some applications, it may be beneficial for housing 212 to be mounted perpendicular main hook block 136, in the alternative mounting position shown by the dotted lines 213 in FIG. 9B. Alternatively, a combination of mounting configurations may be used depending upon the rigging used to attach the structural member 121 to the lifting hook 140. It is important, however, that the mounting configuration and the location of the housing 212 provide imagers 430*a*/430*b* and distance sensors 450*a*/450*b* an unobstructed view of the shakeout field.

Housing 212 may be attached to main hook block 136 with conventional fasteners (not shown), or it may be magnetically affixed to the main hook block 136 using one or more conventional magnetic switchable holding devices (not shown) having permanent magnets. The magnetic switchable holding device allows the external magnetic flux produced by the permanent magnets to be turned on or off. Operators can then easily remove imaging system 210 from main hook block 136 for storage, repair, servicing, battery charging or replacement, or for any other reason by turning off the magnetic switchable device.

Main hook block 136 is conventionally raised or lowered by cables 810 and 812. Thus, raising or lowering the main hook block 136 also raises or lowers the imaging system 210 along with the imagers 430*a* and 430*b* and the distance sensors 450*a* and 450*b*. Additionally, a single imager 430 and/or a single LIDAR distance sensor may be used if the field of view of the imager is sufficient to acquire images of the shakeout field. Other types of sensors may be used to acquire to determine the identifying indicium of the building material objects. For example, bar code readers and RFID readers may also be mounted within the housing 212. The sensors are not limited to those previously disclosed.

Figure 10:
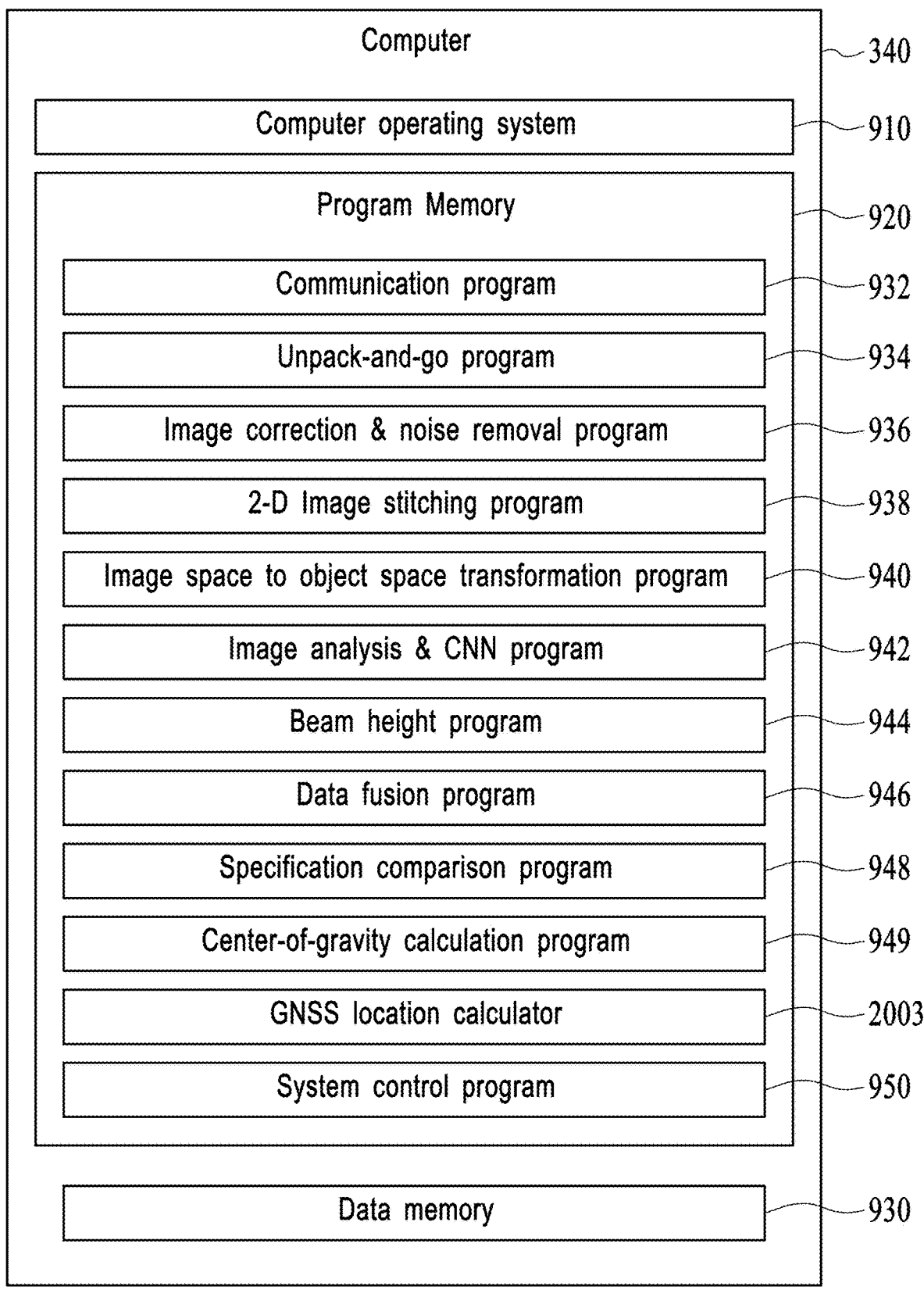
FIG. 10 is a block diagram of the computer of an exemplary operator system, in accordance with embodiments of the present invention.

Referring now to FIG. 10, a block diagram of memory 900 of computer 340 of operator system 205 is shown. Memory 900 includes conventional computer operating system (OS) software 910 for managing the hardware, the software, and other resources of the computer 340; program memory 920, which includes several software programs for performing the tasks according to the preferred embodiment of the invention; and data memory 930 for storing data. Note that although the various programs discussed with respect to FIG. 10 are executed within operator system 205, these programs may be executed on any other suitable system, including imaging system 210, mobile system 215, server system 220, or cloud service 225.

Computer operating system software 910 may include conventional operating system software such as a real time operating system (RTOS), UNIX OS software, LINUX OS software (e.g., Linux distributions Ubuntu and Debian are examples of LINUX based operating systems), Windows OS software (offered by Microsoft Corporation), or other compatible operating system software. The operating software performs conventional operating system software functions and can execute the various programs stored in program memory 920 of computer 340.

Program memory 920 stores communication program 932, unpack-and-go program 934, image correction and noise removal program 936, two-dimensional (2-D) image stitching program 938, image space to object space transformation program 940, image analysis and convolutional neural network (CNN) program 942, beam height program 944, data fusion program 946, specification comparison program 948, center of gravity calculation program 949, GNSS location calculator 2003, and system control program 950.

Data memory 930 may be composed of both volatile and non-volatile memory and is not restricted to any memory technology. For example, conventional random-access memory (RAM), solid state drive memory, electrically programmable memory, flash memory, and hard disk memory may comprise the data memory 930 implementation. For example, data stored in data memory 930 includes image data, INS data including GNSS location and IMU data, time stamp data, distance sensor data, diagnostic data, image correction data, image space to object space transformation parameters, lifting list data, and all the above listed data.

Communication program 932 controls all bidirectional communication (i.e., controls the reception and transmission of data) from operator system 205 to imaging system 210, mobile system 215, server system 220, and cloud service 225 via the communication channels 230, 235, 240, and 260 respectively. Communication program 932 also configures and manages modems 310. For example, the communication program 932 sets the baud rate and parity for communication channels 230, 235, 240, and 260 for each of the modems.

Communication program 932 further receives and stores into memory 930 all data received by the modems 310, including (a) the data packet 1050 transmitted by system 210 (discussed in detail below with respect to FIG. 20), including index data 1052, serialized compressed image data 1054, time stamp data 1056, distance data 1058, INS data (including GNSS location data 1060, IMU data 1062, and parity data 1064); (b) the data transmitted by the server system 220, including the construction site database data and lifting list data; (c) any data transmitted by the cloud 225; (d) any data transmitted by the mobile system 215; and (e) any other data appropriate to meet the objects of the invention.

Unpack-and-go program 934 accesses and unpacks (parses) the data stored in memory 930. This data may include for example the data transmitted by the imaging system 210. Data which is parsed by the unpack-and-go program 934 is written back to data memory 930 (in parsed form) in a different memory location. Other packed data previously stored in memory 930 may also be parsed by the unpack-and-go program 934. Preferably, the original unparsed data is not overwritten.

Figure 11:
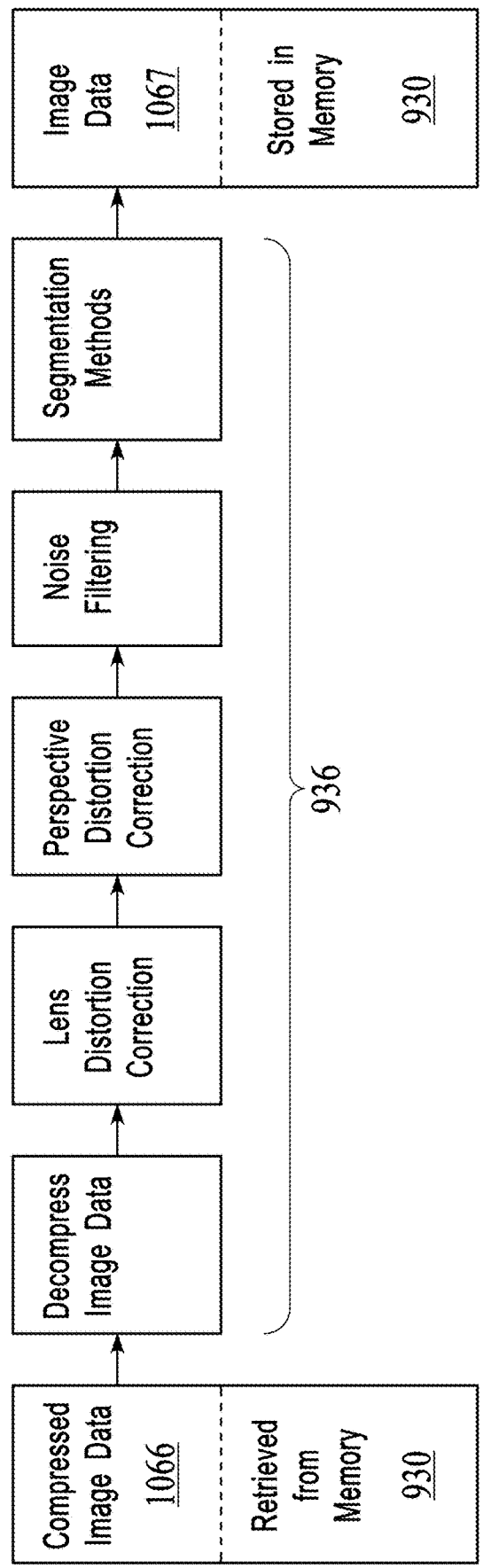
FIG. 11 is a block diagram of an image correction and noise removal program, in accordance with embodiments of the present invention.
Figure 12A:
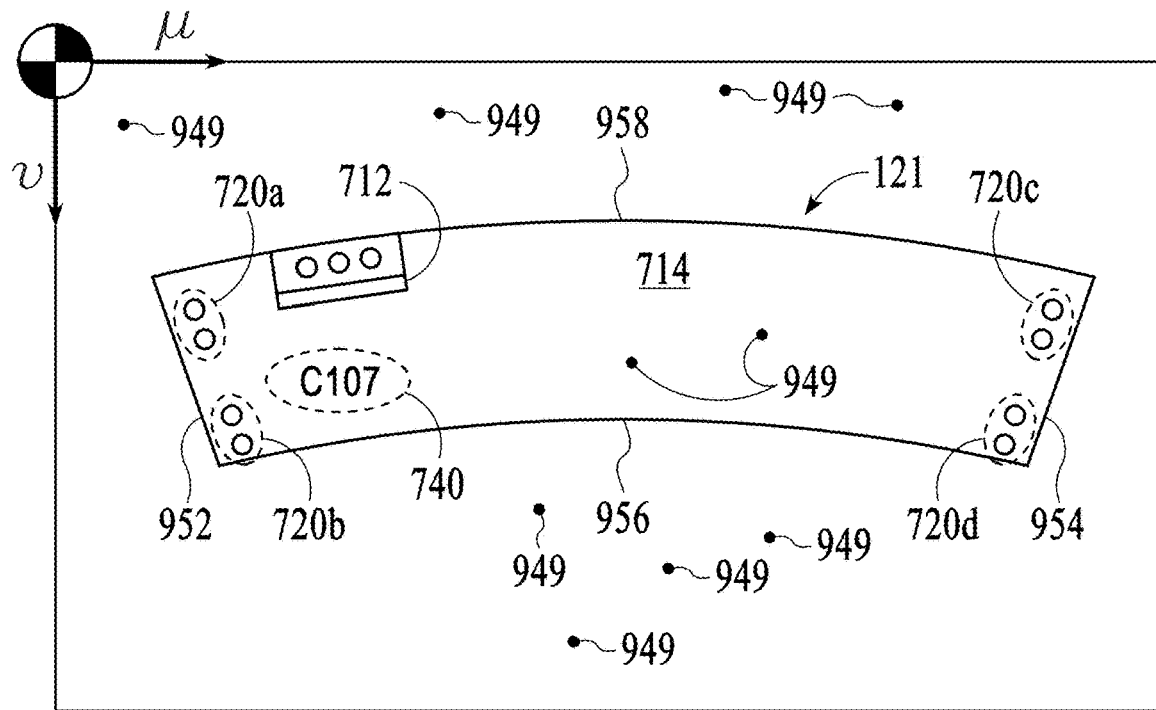
FIG. 12A is a distorted image of the top surface of a structural member having a bracket and four pairs of attachment holes, in accordance with embodiments of the present invention.
Figure 12B:
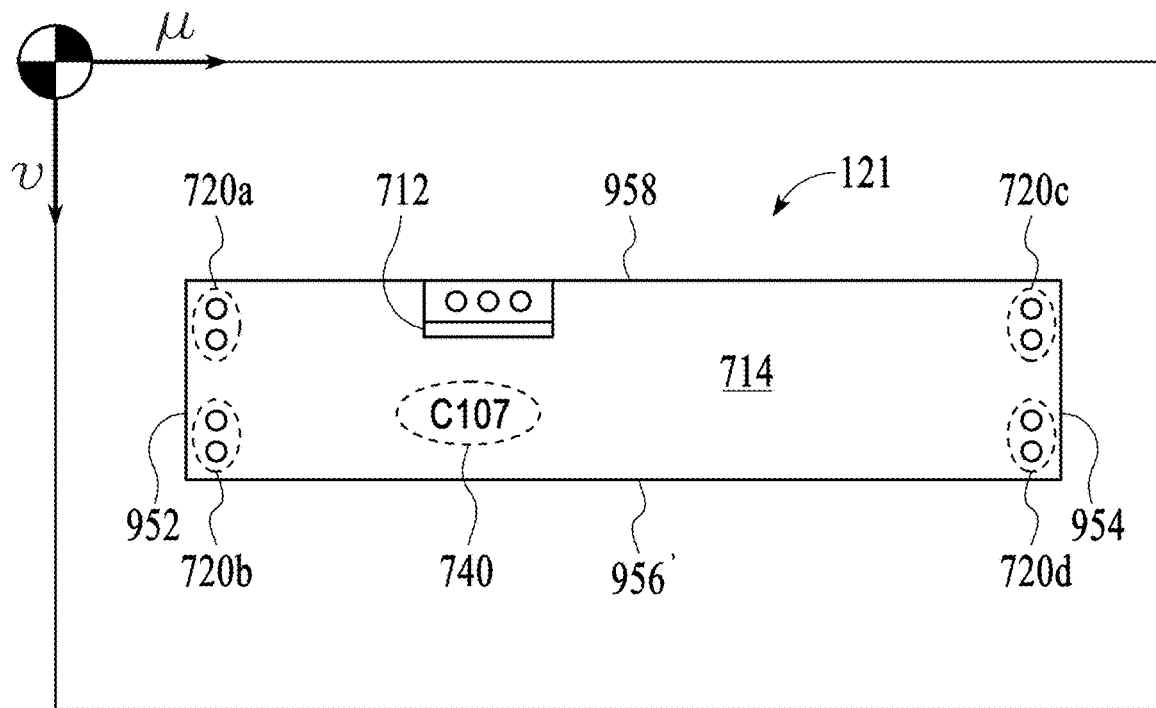
FIG. 12B is a distortion-corrected and noise-filtered segmented image of the top surface of a structural member having a bracket and four pairs of attachment holes, in accordance with embodiments of the present invention.

Referring to FIG. 11, a block diagram is shown that illustrates the operation of image correction and noise removal program 936 of FIG. 10. Image correction and noise removal program 936 takes single raw compressed image data 1066 previously stored in memory 930 as an input and produces a single uncompressed raw image data 1067 as an output. The compressed image data is produced by compression algorithms resident in imaging system 210 and subsequently transmitted to operator system 205 via communication channel 230 and is further discussed below. Compressed raw image data 1066 related to structural member 121 of FIG. 1 is shown in FIG. 12A, and an uncompressed distortion-corrected, noise-filtered, and segmented image data 1067 is shown in FIG. 12B. It is noted that image 951 shown in FIG. 12A is one specific example of the image data 1066, and that image data 959 shown in FIG. 12B is one specific example of the image data 1067. It is also noted that for each image 1066 there is a corresponding image 1067.

Image correction and noise removal program 936 inputs each compressed raw image 1066 previously stored in memory 930 by the unpack-and-go program 934 and decompresses the compressed raw image, corrects the decompressed raw image data for lens distortion (including pin cushion and barrel distortion) and perspective distortion, noise filters the image and then processes the image using segmentation methods and creates a new, decompressed distortion-corrected, noise-filtered, and segmented image data 1067. Preferably, the original raw image data is not overwritten. Images 1066 and 1067 are available to all system elements including imaging system 210, the mobile system(s) 215 and the server system 220 (and therefore available to cloud service 225). The respective distortion parameters required by the image correction and noise removal program 936 to correct for optical distortion are determined by a conventional optical distortion correction program, such as offered by the MathWorks, Inc. of Natick, Massachusetts, and which is known in the camera calibration art. The distortion parameters are stored in the non-volatile part of memory 930.

After correcting for lens distortion, image correction and noise removal program 936 corrects the perspective distortion using a homographic transformation (this approach assumes that the top surface 714 of the structural member 121 has in a plane parallel to the plane of CMOS sensor array 435 of the camera 430. Image correction and noise removal program 936 uses image data of dimensionally defined 2D checkerboard patterns to determine the correction parameters necessary to minimize the optical and perspective distortions, along with the appropriate software. Moreover, the image space coordinates may extend beyond the actual undistorted image boundaries, again assuming the top surface 714 of structural member 121 is planar with the CMOS sensor array 435 of camera 430.

Image correction and noise removal program 936 further removes the image noise 949 from each distortion-corrected image. Image noise 949 typically appears as salt and pepper noise (shown in FIG. 12A is the pepper noise only) and largely occurs during image acquisition by imager 430 of imaging system 210 and during electronic transmission of the images from imaging system 210 to operator system 205. Image noise may also include Gaussian noise. Noise removal in images is well-known in the machine and computer vision art. For example, the distortion-corrected images may be processed by a Wiener linear filter or by spatial domain filtering techniques to remove the image noise 949.

The image correction and noise removal program 936 further applies segmentation methods to each individual image data 1066. The segmentation methods include classical methods, artificial intelligence methods, or a combination of the two, and are well known in the art of machine and computer vision. Segmentation methods may include thresholding, clustering, histogram-based methods, edge detection algorithms (Sobel and Laplace edge detectors, for example), dual clustering methods, region-growing methods, and AI techniques including convolutional neural network (CNN) methods. Applying segmentation methods on each individual distortion-corrected and noise-filtered image defines distinct image features (such as corners) which may be used by the conventional two-dimensional (2D) image registration algorithm used in the image stitching program 938 to register (i.e., align) overlapping images.

As a practical example, and referring to FIG. 12A, a raw, compressed, distorted and noisy image 951 of structural member 121 is shown. Noisy image 951 could correspond, for example to image 1066 noted in FIG. 11. The lens distortion is clearly visible with left lateral edge line 952, right lateral edge line 954, longitudinal bottom edge line 956 and top longitudinal edge line 958 are shown as curved segments and not straight lines. Bracket 712 and hole pairs structural features 720*a*, 720*b*, 720*c*, and 720*d*, which are structural features of structural member 121, are also distorted. Consequently, any location information and dimensions of the bracket 712 and hole locations and dimensions of hole pairs 720*a*, 720*b*, 720*c*, and 720*d* derived from image 951 would have considerable error.

Referring to FIG. 12B, image correction and noise removal program 936 then produces an uncompressed, distortion-corrected, noise-filtered, and segmented image 959. For example, the curved line segment 956 in FIG. 12A is now correctly displayed as straight line 956' in FIG. 12B. The same process may be performed for a sequence of images 1066, preserved in memory 930, to create a sequence of distortion-corrected, noise filtered, and segmented images, stored in memory 930. For example, two-dimensional image stitching program 938 stitches the individual overlapping distortion-corrected noise-filtered, and segmented multiple images 1067 previously stored in memory 930 (by image correction and noise removal program 936) and forms a new composite image of the entire shakeout field 110.

Figure 13A:
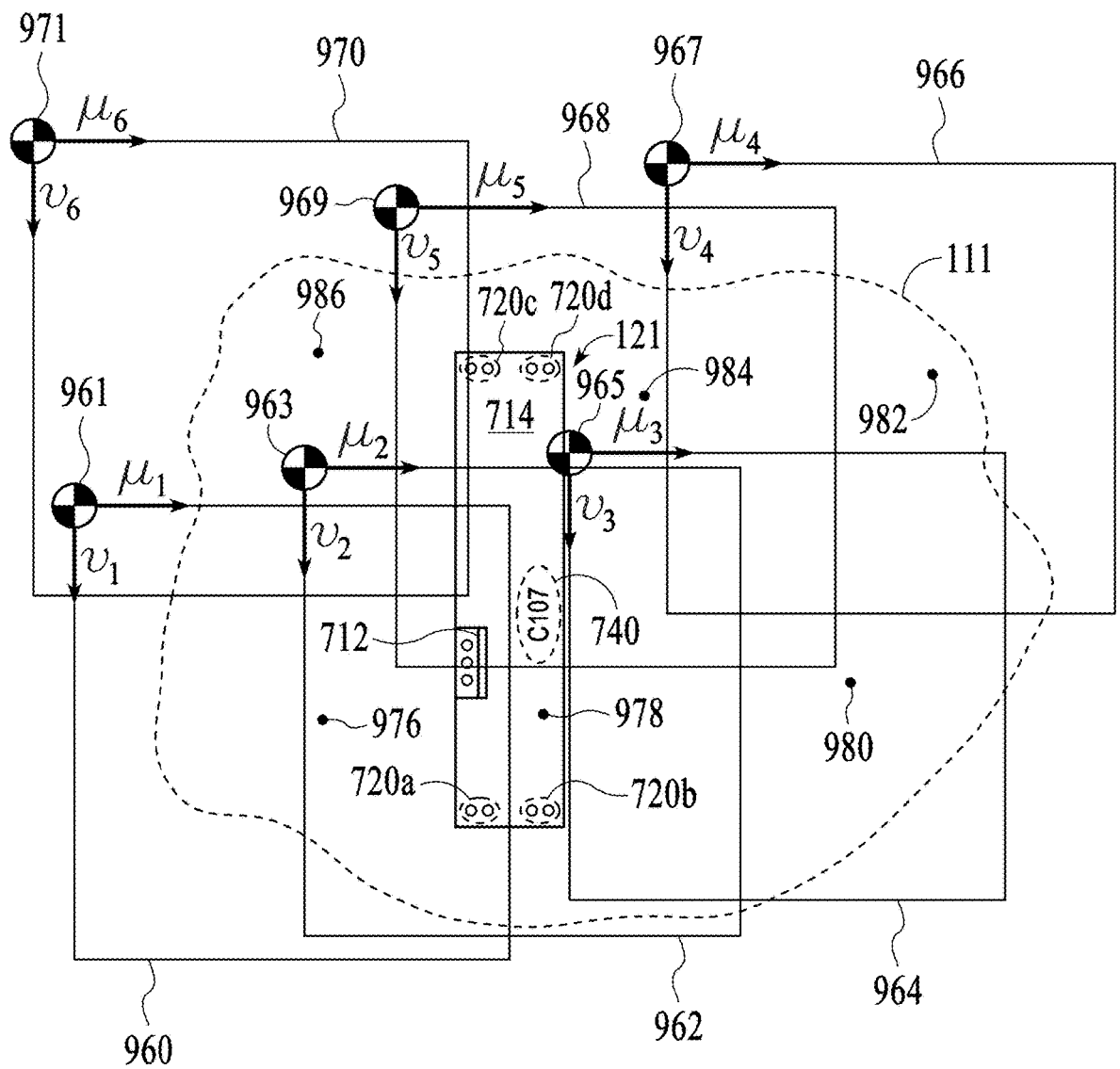
FIG. 13A illustrates six overlapping images of an exemplary shakeout field having a single structural member, in accordance with embodiments of the present invention.

Referring to FIG. 13A, a sequence of six indexed and overlapping individual uncompressed, distortion-corrected, noise filtered, and segmented image data 960, 962, 964, 966, 968 and 970 is shown, having individual image origin and coordinate systems 961 (u1, v1), 963 (u2, v2), 965 (u3, v3), 967 (u4, v4), 969 (u5, v5), and 971 (u6, v6), respectively. The image data 960, 962, 964, 966, 968 and 970 is further shown overlaid over the layout representation image 111 (the dotted line) of the shakeout field 110. It is noted that the sequence of images 1067 (and therefore the sequence of images 1066) may consist only of a single image for those instances where the field of view of the imager 430 encompasses the entire shakeout field 110. In this case, the stitching function of combining multiple images into a single composite image is not required since there is only one image of shakeout field 110.

The process of stitching images together is well known in the art and there are several software programs available to accomplish this task. For example, Microsoft Research has a software tool (the Image Composite Editor) for stitching images together. Another software tool for two-dimensional stitching is AutoStitch developed by Matthew Brown and David G. Lowe of the University of British Columbia. A general tutorial on image stitching is "Image Alignment and Stitching: A Tutorial" by Richard Szeliski, Foundations and Trends in Computer Graphics and Vision, Vol. 2, No 1 (2006) 1-104. References for multiple image analysis include "Multiple View Geometry In Computer Vision" by Richard Hartley and Andrew Zisserman (Cambridge University Press, 2003), "The Geometry of Multiple Images" by Oliver Faugeras and Quang-Tuan Luong (The MIT Press, 2001) and "An Invitation to 3-D Vision From Images to Geometric Models" by Yi Ma, Stefano Soatto, and et al. (Springer-Verlag, 2004).

Two-dimensional stitching program 938 of FIG. 10 performs feature extraction, registration, stitching, and blending on image data 960, 962, 964, 966, 968 and 970. Feature extraction involves transforming each corrected image into a dimensionality reduced form and describes the relevant shape information contained in the image. Image registration creates the geometric correspondence among the image data 960, 962, 964, 966, 968 and 970 and may use the pixel value of the image directly, frequency domain-based registration methods, algorithms which use edges and corners and algorithms which consider objects and their relationship between matching features. The images are further corrected for image-to-image rotation produced by the rotation of imager 430 (or imagers 430*a* and 430*b*) with respect to shakeout field 110.

Figure 13B:
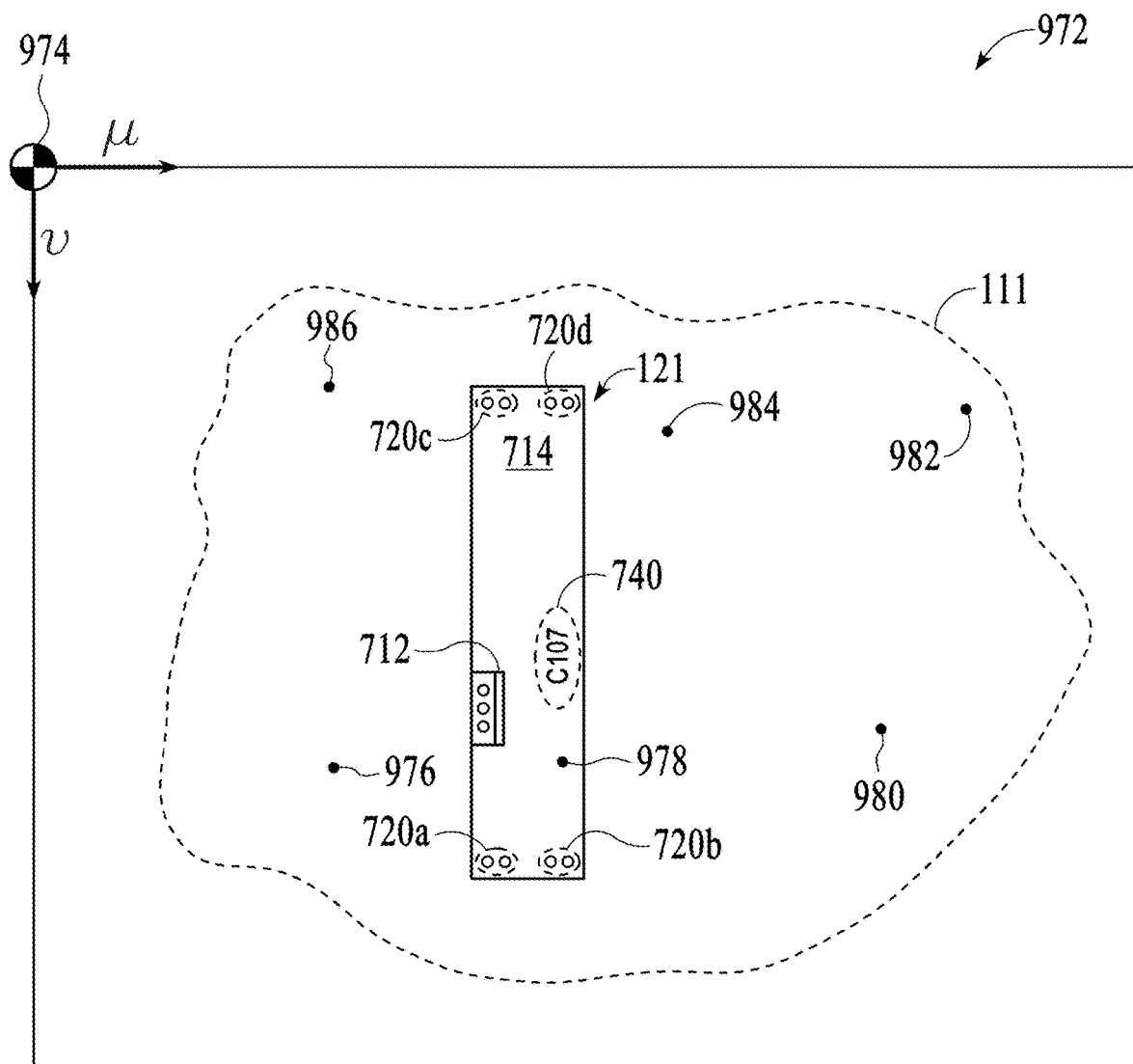
FIG. 13B illustrates a stitched image of the shakeout field of FIG. 13A, in accordance with embodiments of the present invention.

Referring to FIG. 13B, a single all-inclusive full view stitched image 972 of the entire shakeout field 110 is shown. Stitched image 972 is formed from the six corrected and segmented image data 960, 962, 964, 966 968 and 970 and is shown having the single image origin and (u, v) coordinate system 974 (u, v). Two-dimensional stitching program 938 combines the geometric correspondences among the uncompressed, distortion-corrected, noise-filtered, and segmented individual images to form the composite image 972 and uses blending to remove seams created during the stitching process. Two popular methods for blending images are alpha blending and Gaussian pyramid blending. It is noted that the pixel resolution of each of the six corrected image data 960, 962, 964, 966 968 and 970 is substantially preserved in stitched image 972 (for example, a pixel having image space dimensions and a corresponding object space dimensions in image 960 will be substantially preserved in composite image 972). Thus, stitched image 972 (or other images derived therefrom) may be used to determine image space geometric feature attributes, dimensions and measurements having substantially the resolution of a single image.

Also shown in FIGS. 13A and 13B are target reflection points 976, 978, 980, 982, 984, and 986 for images 960, 962, 964, 966, 968 and 970. These target reflection points are points at which a distance measurement was taken (e.g. by distance sensor 450 of FIG. 4). When the two distance sensors (e.g. distance sensors 450*a* and 450*b* of FIG. 9A) are employed, each sensor would be associated with its own set of target reflection points. It is therefore understood that stitched image 972 data includes the uncompressed, distortion-corrected, noise-filtered, and segmented image of structural member 121 (along with any additional building material objects, such as structural member 120 and rebar bundle 121*a* imaged within the shakeout field 110) and further includes images of the structural feature objects associated for each structural member (e.g. images of the bracket 712 and hole pairs 720*a*, 720*b*, 720*c*, and 720*d* associated with structural member 121), and may also include other building material object features. The image of the identifying indicium 740 is also included, as well as data regarding the target reflection points (e.g. distance from the ground and location within the u-v coordinate system) in the stitched image 972.

Image space to object space transformation program 940 of FIG. 10 transforms each pixel of the image 972 into an equivalent object space distance. For example, one pixel in image space in the u-axis direction of the corrected image may correspond to 0.25 inches (or about 6.4 mm) in object space in the x-axis direction. Alternatively, image space to object space transformation program 940 transforms an object space distance into a corresponding undistorted image space coordinate. The image space to object space transformation program 940 further accounts for the fact that the image space to object space transformation is dependent upon the distance from the lens to the imaged object.

Figure 14:
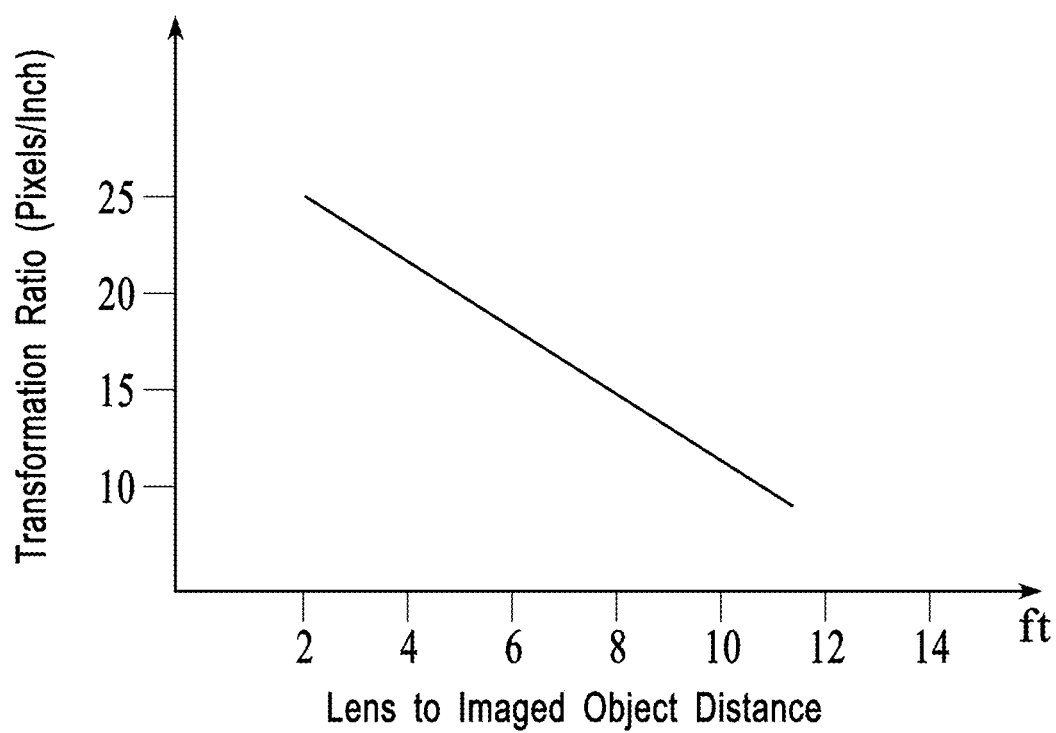
FIG. 14 is a graph of image space to object space transformation ratios as a function of the lens to imaged object distance, in accordance with embodiments of the present invention.

Referring to FIG. 14, an example of the functional dependency 973 between the pixels per inch value (y-axis) and the lens to imaged object distance (x-axis) is shown. It is well known that the image space to object space transformation ratio is a function of the distance between the lens and the imaged object and is not a constant for conventional lenses. The imager/lens combination has been previously calibrated and provides a functional relationship between the distance from the lens to the imaged object and the image space to object space transformation value.

The distance between the lens and imaged object (e.g. structural member 121) is determined by the distance sensor 450. In some embodiments, the distance must be corrected to account for the vertical offset between imager 430 and distance sensor 450, which may result from positional mounting differences, for example. The image space to object space transformation program 940 is useful in determining object space dimensions from image space dimensions and is particularly useful in determining the width, the length, the height, and areas of objects such as the length 710 from an image of the top surface 714 of the structure member 121, or for determining the relative location and dimensions of a structural feature of a particular structural member (for example, the location and dimensions of an imaged bracket 712 with respect to the structural member 121), or for determining object space dimensions for other building material objects, such as the length of the reinforcement bars 121*a*.

Figure 15:
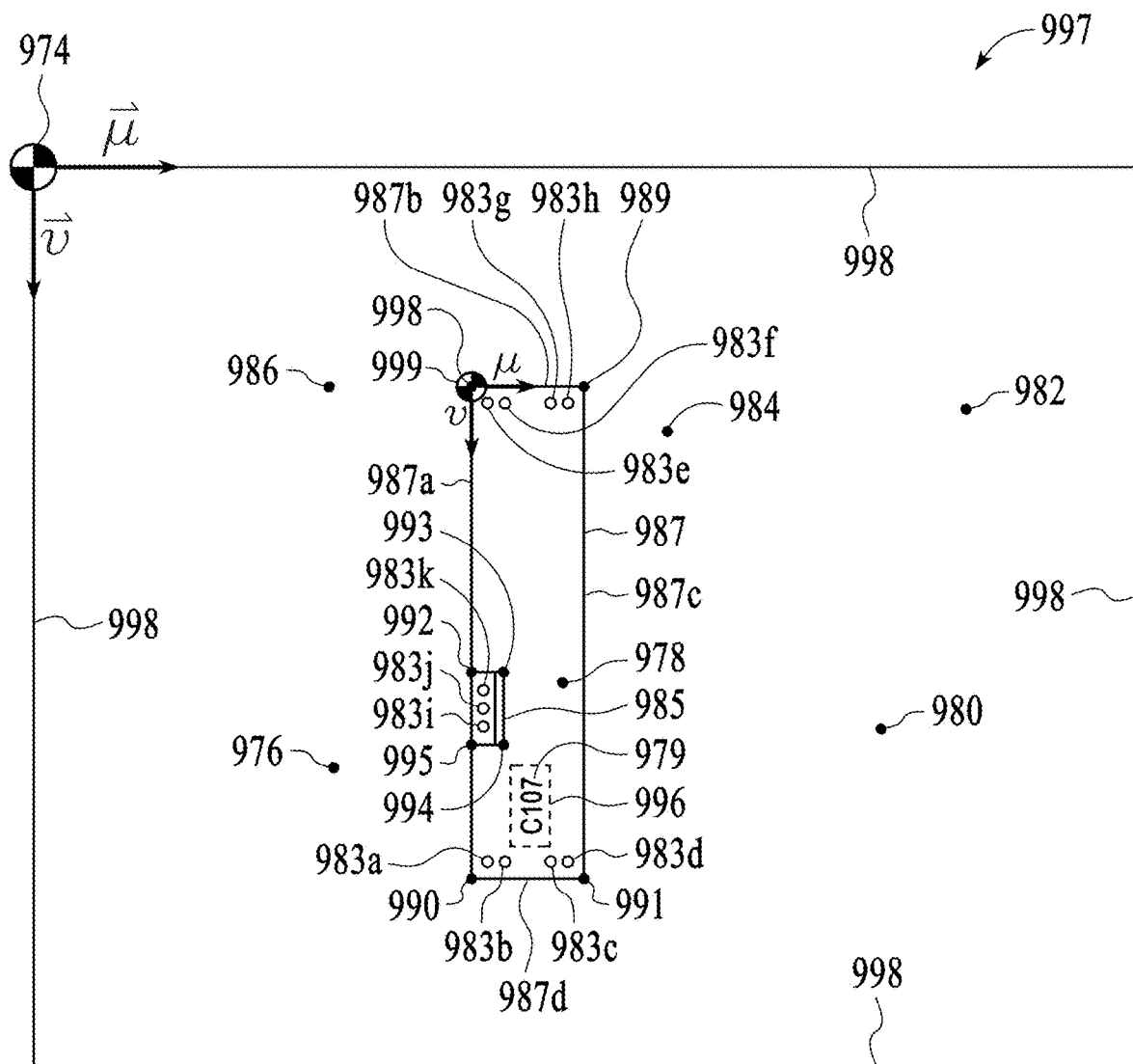
FIG. 15 is another stitched image of a shakeout field, in accordance with embodiments of the present invention.

Referring to FIG. 15, image analysis and convolutional neural network program 942 of FIG. 10 analyzes stitched image 972 of shakeout field 110 and uses well-known computer-vision image segmentation, including convolutional neural network techniques, for (a) detecting each building material object (e.g. structural member 121), (b) detecting structural feature objects associated with each structural member such as attached bracket 712, or other building material object features, (c) detecting the identifying indicium object associated each structural member such as identifying indicium 740 (or the identifying indicium of other building material objects), (d) detecting the distance sensor target reflections off of targets objects, such as target reflection 976, 980, and/or 986, and (e) detecting other objects within the stitched image 972 and then creating image 997. References which describe image segmentation methods include "Digital Image Processing" by Rafael C. Gonzalez and Richard E. Woods, (Addison-Wesley Publishing Company, 1992) and "Digital Image Processing Using MATLAB" by Rafael C. Gonzalez and Richard E. Woods and Steven L. Eddins, (Pearson Prentice Hall Publishing Company, 1992), and the MATLAB programming language numeric computing environment developed by MathWorks of Natick, Massachusetts. MATLAB and a general internet search on image segmentation offer many articles and program examples for performing image segmentation. Convolutional neural network technology may also be used for image segmentation. An example of a convolution neural network for image segmentation is U-Net.

Image analysis program 942 classifies the objects using computer vision methods (such as the scale-invariant feature transform) and/or convolutional neural network (CNN) methods. Image analysis program 942 then analyzes the objects identified by the segmentation methods and calculates the perimeter corner u-v location coordinates of the detected objects (referenced to coordinate origin 974) including (a) the structural member objects such as structural member 121, (b) the structural feature objects such as bracket 712 associated with each structural member, (c) the identifying indicium object for each structural member such as the identifying indicium 740 of the structural member 121, (d) the distance sensor target reflections objects such as the reflection target 978, and (e) any other desired objects. For example, image analysis program 942 analyzes the image data related to structural member 121 and then determines the u-v coordinates of the top left corner 988, top right corner 989, bottom left corner 990 and bottom right corner 991 of the structural member 121, each having u-v coordinates referenced with respect to u-v origin 974. Perimeter 987 of the structural member 121 is determined from the u-y coordinates of the top left corner 988, top right corner 989, bottom left corner 990 and bottom right corner 991.

Image analysis program 942 then uses the corner u-v coordinates to determine the u-v coordinates of the perimeter line segments of the detected objects. The perimeter line segments define the perimeter of the object, and the perimeter u-v coordinates define the location of the object within the image 997. For example, image analysis program 942 then uses the corner u-v coordinates (e.g. (u1, v1), (u2, v2), (u3, v3), and (u4, v4) referenced to coordinate origin 974) to determine the u-v coordinates of perimeter line segments 987*a*, 987*b*, 987*c*, and 987*d* of structural member 121. Image analysis program 942 may also calculate an image space area from the image space perimeter data. The corner u-v coordinates and line segments 987*a*, 987*b*, 987*c*, and 987*d* define the perimeter 987 of the structural member 121 in image space and, therefore, represent the location in image space of the top surface 174 of the structural member 121 (and any other structural members contained within the image such as structural member 120 or other types of building material objects).

Image analysis program 942 then determines other geometric dimensions associated with the imaged structural member 121 object. For example, image analysis program 942 determines width 708 of the structural member 121 (and all other structural members contained within the shakeout field 110) in image space using the distance in image space of the line segment 987*b*. Image analysis program 942 similarly determines length 710 of the structural member 121 (and all other structural members contained within the shakeout field 110) in image space using the distance in image space of the line segment 987*a*.

Image analysis program 942 then determines the w-v locations of the structural feature objects associated with each structural member. For example, the program can determine the location in image space for structural feature objects associated with structural member 121, including bracket object 712 and the hole pairs objects 720*a*, 720*b*, 720*c*, and 720*d*. Image analysis program 942 further determines the u-v coordinates of bracket object corners 992, 993, 994, and 995 (referenced with respect to u-v origin 974), and may reference the u-v coordinates of the structural feature to the local u-v coordinate system origin 999 of the structural member 121.

From this u-y coordinate corner data, the program determines the width and length in image space of the bracket 712 object (the imaged bracket) using a similar procedure that was used to determine the width and length of the structural member 121 object. For example, image analysis program 942 uses conventional analytical geometry methods using u-v coordinates to determine the perimeter and location of the bracket 712 object in image space with respect to the u-v coordinate system 974 and/or to an origin drawn on structural member 121. The width of the bracket 712 (in image space) may be determined in like fashion. The location of bracket 712 in image space with respect to the structural member 121 and with respect to the coordinate system 974 may also be represented using the u-v coordinates 992, 993, 994, and 995. Similarly, the u-v coordinates of each individual hole objects contained in hole pairs 720a, 720b, 720c and 720d and the individual hole diameters (hole perimeters) are determined (referenced again with respect to u-v origin 974) in image space by the image analysis program 942 or may be referenced to an image coordinate system referenced to the top surface 714 of the structural member 121.

Image analysis program 942 further analyzes the image of the top surface 714 of image 972 and uses conventional computer vision technology, including convolutional neural network techniques, to (a) detect the identifying indicium object and then (b) construct a rectangular bounding box 996 encapsulating the identifying indicium object and determine the u-v coordinates (referenced with respect to u-v origin 974 or to the structural member 121) of the bounding box corners. Thus, the image of the identifying indicium 740 is detected and a boundary box is created.

With the identifying indicium object detected and defined in image space, a trained convolutional neural network (CNN) is applied to the alphanumeric characters and/or symbols image data contained within the boundary box to transform the image of the identifying indicium 740 into a digital data representation. For example, the CNN may recognize a character as an 'A' and assign the digital data ASCII code 065 in decimal (the binary representation is: 01000001). Note that the machine-generated identifying indicium image representation 979 shown in FIG. 15 is larger and has a machine-generated font different from the image of the original handwritten indicium 740 and has been overlaid onto the image 997 (the original image of the handwritten indicium has been removed) having a boundary box 996.

image analysis program 942 further determines the u-v coordinates (referenced with respect to u-v origin 974) for each of target reflection points 976, 978, 980, 982, 984, and 986 by using conventional computer vision technology. For example, color space thresholding techniques may be applied to stitched image 972 in order to determine the u-v coordinates (referenced with respect to u-v origin 974) of the red target reflection points (if the LIDAR laser is red wavelength emitting) in the individual images 960, 962, 964, 966, 968, and 970, as well as in the stitched image 972. Other color lasers may be used (such as green lasers). In that case, green color thresholding would be used. Image analysis program 942 also appends to the u-v coordinates of each imaged target reflection point the distance data obtained from the distance sensor. For example, imaged target reflection point 978 has an associated distance 975 and imaged target reflection point 908 has an associated distance 977.

The image analysis program 942 may also use the object distance from the optical axis 436 of imager 430 (the center point of the image) to the object distance sensor 430 transmitted beam 806. This object distance can be measured or obtained from data sheet and mounting separation distance specifications. The object distance is then transformed into image space coordinates using the image space to object space transformation program 940. Therefore, since the u-v coordinates of the center of each image is known, and therefore the u-v coordinates of the target reflection point are also known relative to the image center point. For example, the image of target reflection points 978 and 980 have u-v coordinates (u10, v10) and (u11, v11) (referenced with respect to u-v origin 974). These image space u-v coordinates may be used by the data fusion program 946.

Image analysis program 942 further appends to the u-v coordinates of each imaged target reflection point the GNSS location data obtained from the second INS 420. The imagers may also be GNSS calibrated such that each pixel in the image is assigned a GNSS location (offset corrected to account for the distance between the imager 430 and the INS 420) and further calibrated for distance from the imager to the imaged object. Thus, every imaged target reflection point 976, 978, 980, 982, 984, and 986 has an associated distance data and GNSS location, and every pixel in the image has a GNSS location.

Image analysis program 942 then combines the image analysis data stored in memory 930 and produces an image 997 which displays, within the perimeter 998 of the stitched image 997 and with respect to the origin 974, (a) perimeter 987 of structural member 121 (and all other building material objects contained within shakeout field 110, if any), (b) the perimeters of the structural features associated with the structural member 121 (e.g. perimeter 985 of bracket 712 and the perimeters for each hole {983a, 983b}, {983c, 983d}, {983e, 983f}, {983g, 983h} of the hole pairs 720a, 720b, 720c, and 720d respectively, and the perimeters 983i, 983j, and 983k of bolts 716a, 716b, 716c, respectively), (c) machine-generated identifying indicium 979 (which is analyzed from the image of the identifying indicium 740 using the CNN) and which is placed on the image of surface 714 of structural member 121, and the images of the LIDAR reflections 976, 978, 980, 982, 984 and 986.

The resulting image 997, along with the u-v coordinates of the structural member perimeter 987, the structural feature bracket perimeter 985, the structural feature hole perimeters 983a, 983b, 983c, 983d, 983e, 983f, 983g, and 983h, the identifying indicium 979 and the LIDAR reflections 976, 978, 980, 982, 984 and 986 are stored in memory 930. Additionally, all image space distance and location calculations are also stored in memory 930. The locations of the structural features may be referenced to a structural member local u-v coordinate system 999 which is located at the intersection of the perimeter line 987a and 987b (the upper left-hand corner of the perimeter 987). Other structural member u-v coordinate system locations are possible.

Image space to object space transformation program 940 transforms each dimension in image space into an equivalent object space dimension. For example, the length in pixels of structural member 121 may be transformed into an equivalent length in inches. The transformation from image space to object space dimensions is disclosed in data fusion program 946 and in reference to FIG. 18.

Figure 16:
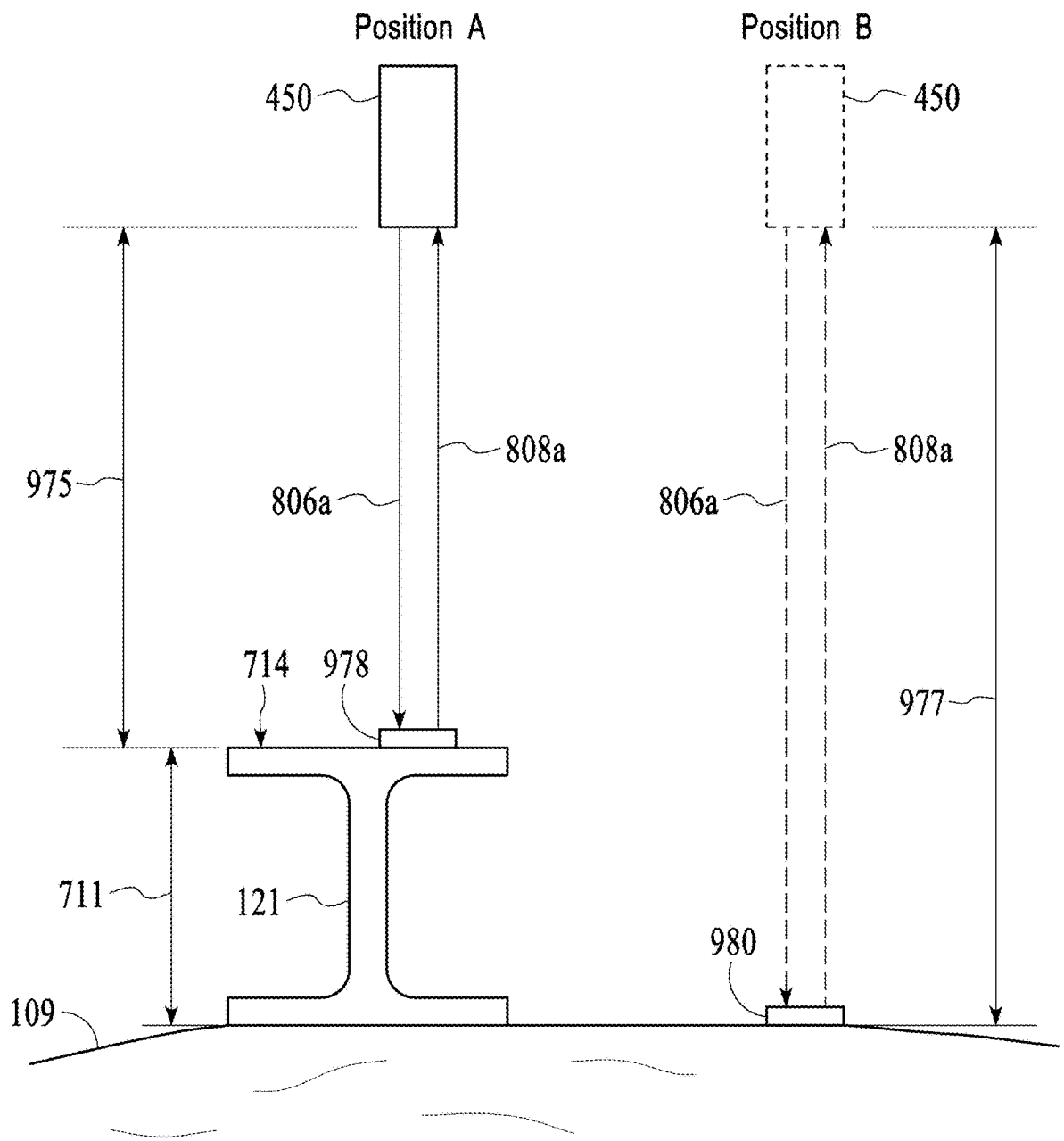
FIG. 16 is a side elevation view of an I-beam resting on the ground surface and a movable distance sensor located above the I-beam, in accordance with embodiments of the present invention.

Referring to FIG. 16, beam height program 944 of FIG. 10 calculates height 711 of the structural member 121 (and all building material objects contained within the shakeout field 110) by determining the vertical distance 975 from distance sensor 450 at position A to the target location 978 on the top surface 714 of the structural member 121 and then (after the distance sensor 450 has been moved by the crane operator) determining the vertical distance 977 from distance sensor 450 at position B to the ground surface 109 having a target location 980. Beam height program 944 then calculates the difference between the distances 977 and 975 giving height 711 of structural member 121. The distance data 977 and 975 from the distance sensor 450 to the imaged object is recorded and stored in memory 930.

As an example, target reflection point 978 is located on the upper flange top surface 714 of I-beam 121, and target reflection point 980 is located on the ground surface 109. The difference in the vertical distance 975 from distance sensor 450 to the upper flange top surface 714 (at point 978) and the vertical distance 977 from distance sensor 450 to the ground surface 109 at point 980 yields the height 711 of the I-beam 121. The height data is stored in memory 930 and is associated with structural member 121. The height of the other structural members and building material objects in shakeout field 110 is determined in a similar manner, as well as the height of structural features associated with a structural member. Additionally, the distance from the sensor 450 to the target is saved in memory 930.

Figure 17:
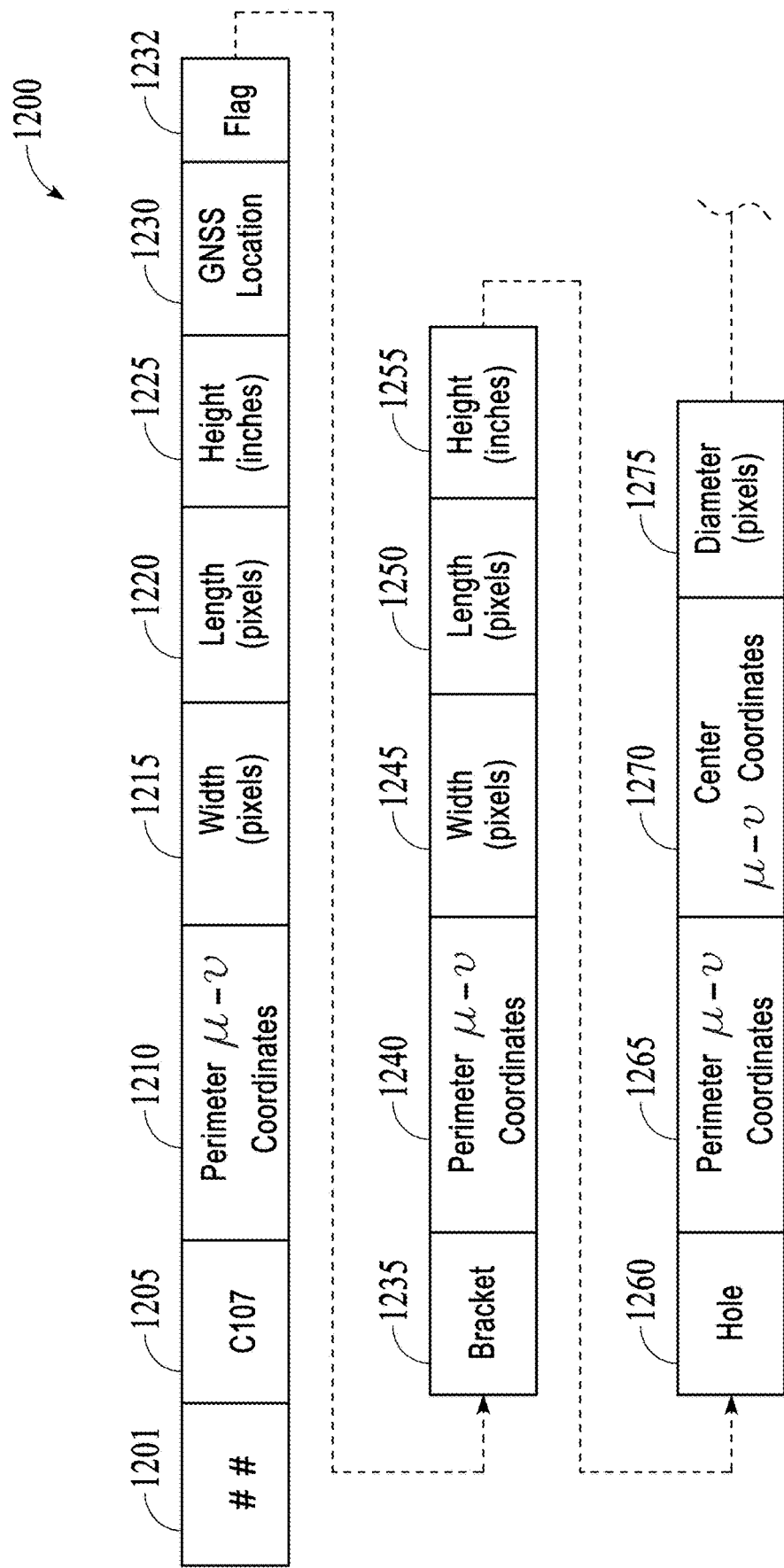
FIGS. 17 and 18 illustrate data structures representing data associated with an exemplary structural member, in accordance with embodiments of the present invention.

Referring to FIG. 17, data fusion program 946 inputs the data stored in memory 930 by the image analysis program 942 and creates an image space data structure 1200 for structural member 121. Data structure 1200 includes the following non-exclusive fields: delimiter data field 1201; identifying indicium data field 1205; perimeter u-v coordinates data field 1210; width data field 1215; length data field 1220; height data field 1225; GNSS location data field 1230; flag data field 1332; bracket structural feature data field 1235; bracket perimeter u-v coordinate data field 1240; bracket width data field 1245; bracket length data field 1250; bracket height data field 1255; hole structural feature data field 1260; hole perimeter data field 1265; hole structural feature center object space coordinates data field 1270; and structural feature diameter 1275. Note that the u-v dimensions are in pixels. Other structural features may be added or deleted depending upon the application and available data.

Height data field 1225 contains height data, and GNSS location data field 1230 contains the GNSS position of the associated detected structural member (e.g. structural member 121). The values of data fields 1210, 1215, 1220, 1240, 1245, 1250, 1265, 1270, and 1275 are in image space coordinates (e.g. pixels). The GNSS location coordinates of the structural member 121 is given in LLA coordinates but may be in ECEF coordinates or any other appropriate coordinate system.

It is understood that the number of data fields of the data structure 1200 may be expanded or contracted depending upon the desired level of detail for structural member 121 and the other building material objects in the shakeout field. For example, in some instances only the data fields concerning the structural member 121 may be deemed important and not any of the structural features associated with the structural member 121 such as the bracket and hole structural features. In this case, only the data fields 1201, 1205, 1210, 1215, 1220, 1225, 1230, and 1232 will be included in the data structure 1200. In other embodiments, measurement data for any and all structural features of structural member 121 may be added.

Figure 18:
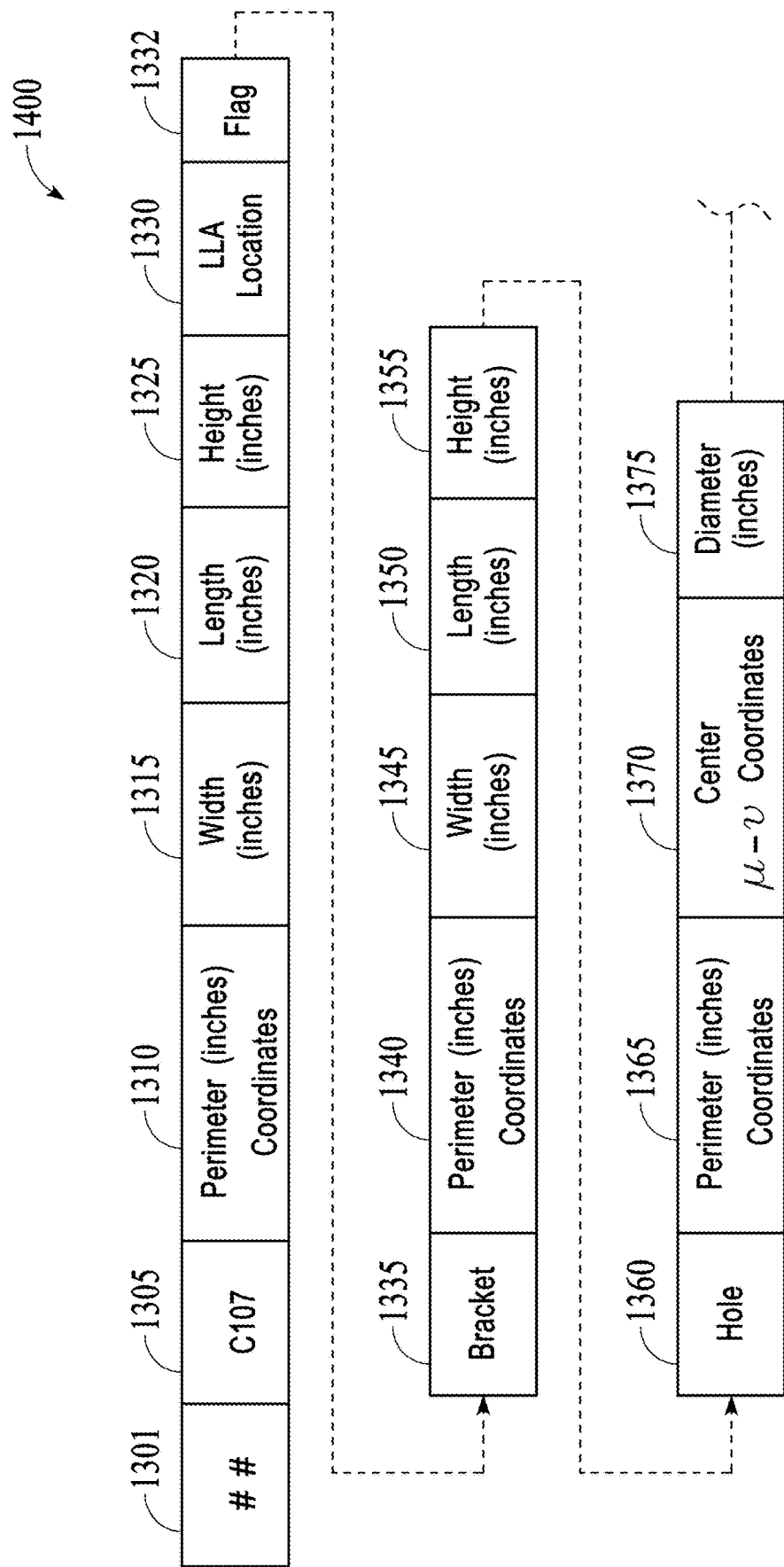

Referring to FIG. 18, data fusion program 946 of FIG. 10 creates a new object space data structure 1400 for each detected structural member using image space to object space transformation program 940. Object space data structure 1400 includes the following non-exclusive fields: delimiter data field 1301; identifying indicium data field 1305; object space perimeter coordinates data field 1310; width data field 1315; length data field 1320; height data field 1325; GNSS location data field 1330; flag data field 1332; bracket structural feature data field 1335; bracket object space perimeter coordinate data field 1340; bracket width data field 1345; bracket length data field 1350; bracket height data field 1355; hole structural feature data field 1360; hole structural feature center u-v coordinates data field 1370; and diameter structural feature diameter 1375. Data fusion program 946 copies delimiter data field 1201, identifying data field 1205, height data field 1225, GNSS location data field 1230, bracket structural feature 1235, and hole structural feature 1260 of data structure 1200 into the data fields 1301, 1305, 1325, 1330, 1335, and 1360 of data structure 1400, respectively. At this point the other data fields 1310, 1315, 1320, 1340, 1345, 1350, 1355, 1365, 1370, and 1375 are empty.

Data fusion program 946 then passes the distance data from the distance sensor to each structural member object and the distance data for each structural feature object to image space to object space transformation program 940. Image space to object space transformation program 940 then returns the correct transformation ratio as a function of distance from the distance sensor to the imaged object as illustrated in FIG. 14. Data fusion program 946 then transforms the image space dimensions contained in data fields 1210, 1215, 1220, 1240, 1245, 1250, 1265, 1270, and 1275 of data structure 1200 to the object space dimensions (e.g. inches) contained in data fields 1310, 1315, 1320, 1340, 1345, 1350, 1365, 1370, and 1375 of data structure 1400, respectively. Data fusion program 946 therefore produces a final object space data structure 1400 which consists of all the image space u-v coordinates and measurements of data structure 1200 converted to object space coordinates and dimensions (e.g. inches or cm) of the objects identified in image 997 and further includes the identifying indicium and the GNSS location for structural member 121 (and any other imaged structural member). Other attributes of structural member 121 may be added to object space data structure 1400 by adding additional data fields. The data for these additional data fields may be calculated by the data fusion program or directly accessed from the construction site database.

Object space data structure 1400 is then stored in memory 930 and accessed in memory by the identifying indicium data field 1305. The final object space data structure may also be transmitted to server 220, imaging system 210, the mobile system 215, and the cloud 225 and saved in their respective memories. The data fields of image space data structure 1200 and object space data structure 1400 may be expanded to include the time stamp data 1056 (reference with respect to FIG. 20).

Specification comparison program 948 of FIG. 10 compares object space data structure 1400 of structural member 121 (or other building material object) computed from the data fusion program 946 with the similarly formatted data structure for the structural member 121 obtained from the construction site database. The construction site database may be resident in operator system 205, imaging system 210, mobile system 215, server system 220, cloud service 225, or any combination of these. Any discrepancies between the data structure 1400 and the similarly formatted data structure from the construction site database are noted and the crane operator is notified via a message displayed on the display 330 or by some other means, such as speaker 370. The notification message may also be sent to mobile system 215, server system 220, and/or cloud service 225 in order to log the discrepancy and/or to notify other workers on site Center-of-gravity program 949 calculates the center-of-gravity for the structural member (or other building material object) to assist the crane operator in positioning the main hook block 136 over the desired member or other building material object queued to be hoisted. For example, knowing the relative structural member coordinates (location) for the center-of-gravity is important data for defining the attachment location for the hoisting rigging. This location may be provided by the construction site database, or may be calculated using the width, length, height, sectional profile and additional structural member data necessary to calculate the center-of-gravity. The additional structural member data necessary which may be used to calculate the center-of-gravity may include the material characteristics (such as material density) and the cross-sectional area obtained from the construction site database. Center-of-gravity calculation for objects is well known in the art. Additionally, the weight of the building material object may be obtained from the construction site database or calculated knowing the density and geometric properties of the building material object being hoisted. The weight data is used to ensure that the crane maximum lift capacity is not exceeded.

Figure 22:
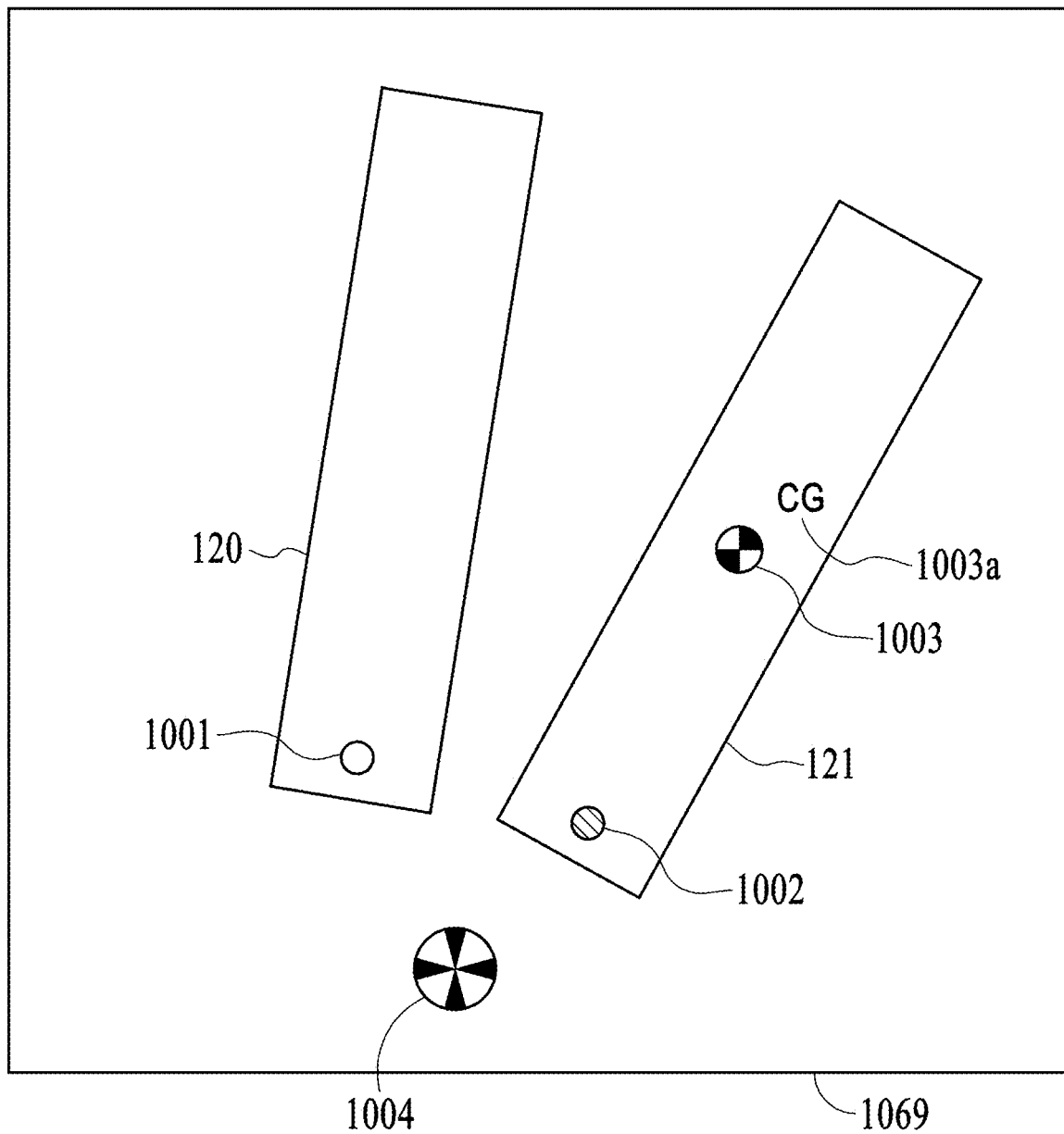
FIG. 22 illustrates an image of the shakeout field having the center-of-gravity location symbol displayed on the top surface image of a structural member queued for hoisting.

The location of the center-of-gravity for each structural member within the shakeout field may be further displayed by overlaying a distinct symbol (such as a colored target symbol, such as a red cross with a "CG" label) overlaid on the surface image of each structural member and is more fully discussed in reference to FIG. 22.

Figure 23:
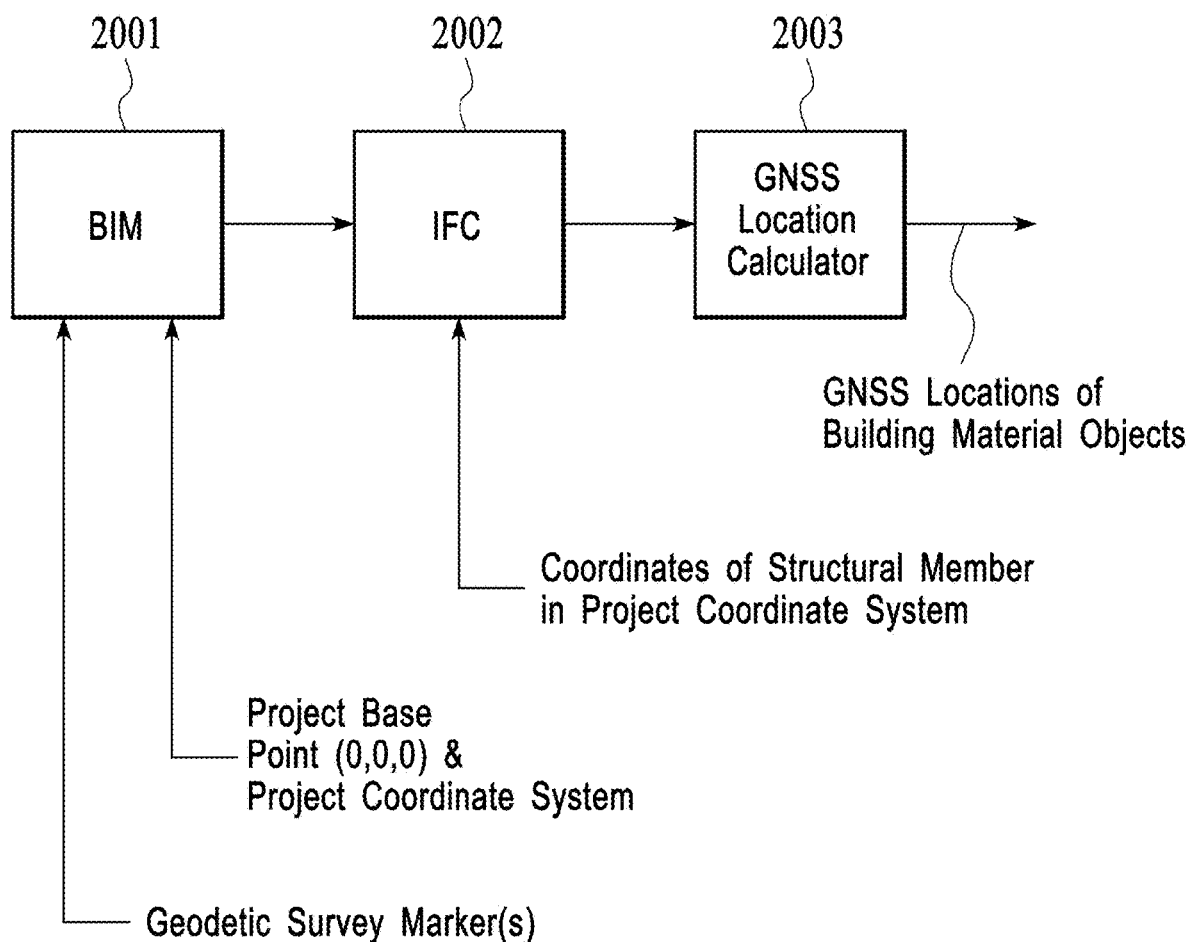
FIG. 23 depicts the relationship between a BIM construction site data base, an IFC file and a GNSS location calculator.

GNSS location calculator 2003 determines the GNSS coordinates of the attachment or destination location of a structural member or a building material object respectively given the attachment or destination location coordinates in the project base coordinate system and is discussed in reference to FIG. 23.

System control program 950 controls the interaction among the other programs of memory 920 and provides other programming functions to achieve the objectives of the invention, and further performs a diagnostic self-evaluation of system 205.

Figure 19:
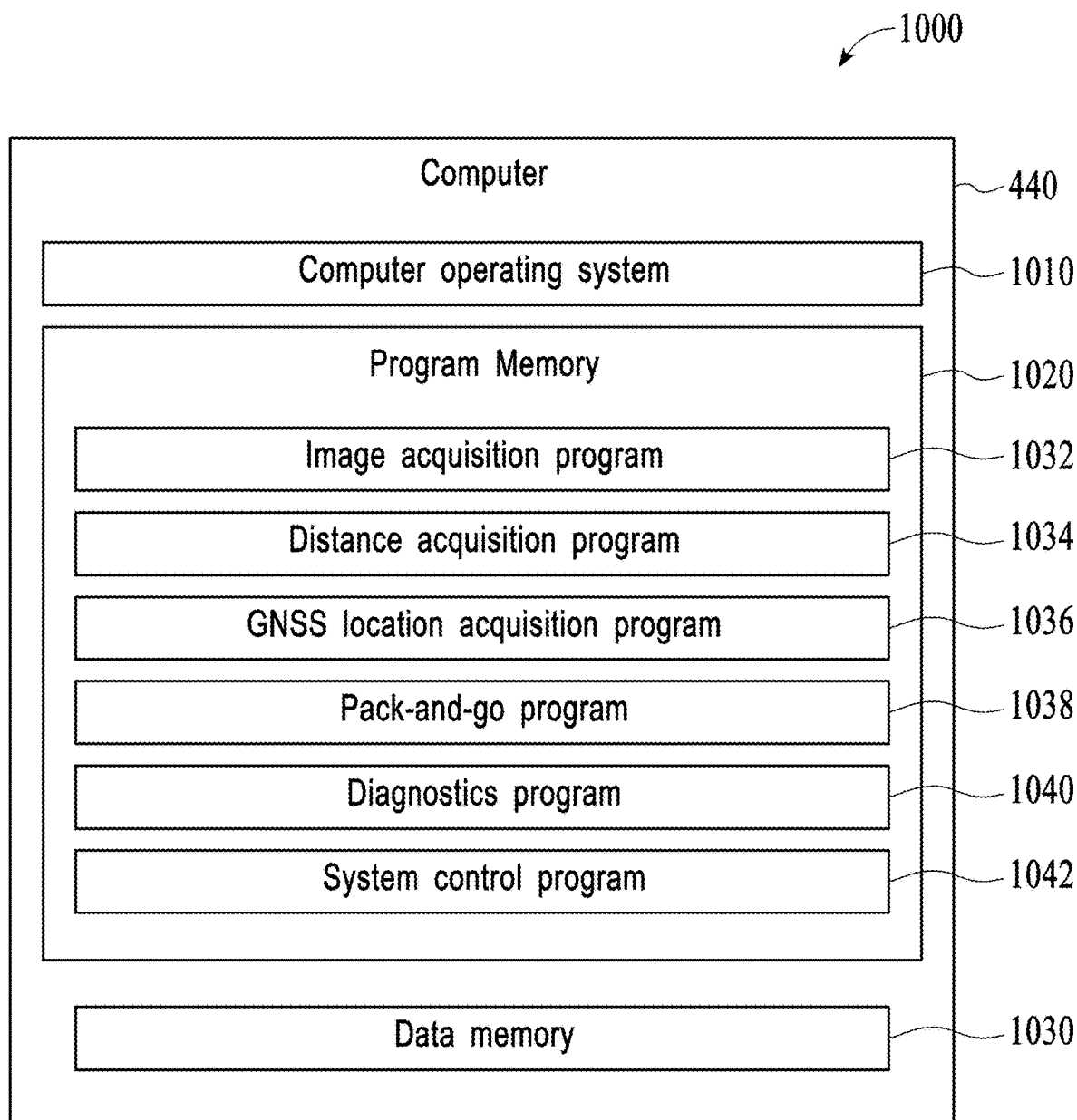
FIG. 19 is a block diagram of the computer of an exemplary imaging system, in accordance with embodiments of the present invention.

Referring to FIG. 19, a block diagram of the memory 1000 of the computer 440 of imaging system 210 is shown. Memory 1000 comprises the conventional computer operating system software 1010 for managing hardware and other resources of computer 440, program memory 1020 comprising several software programs for performing the tasks according to the preferred embodiment of the invention, and data memory 1030 for storing system data and other data including image data, the INS data including the GNSS location data, and the IMU data, the time stamp data, the distance sensor data, and other data.

Computer operating system (OS) software 1010 may include conventional operating system software such as a real time operating system (RTOS), UNIX OS software, LINUX OS software (e.g., Linux distributions Ubuntu and Debian), Windows OS software (offered by Microsoft Corporation), or other compatible operating system software. The operating software performs conventional operating system software functions and can execute the various programs stored in the program memory 1020 of the computer 440. Program memory 1020 comprises the image acquisition program 1032, the distance acquisition program 1034, the location acquisition program 1036, the pack and go program 1038, the diagnostic program 1040, and the system control program 1042.

Image acquisition program 1032 controls the acquisition of images from the imager 430 (or from imager 430a and 430b or more imagers if used) and stores the acquired raw image (and any other appended camera metadata) to data memory 1030. The image acquisition program 1032 may use the application programming interface (API) and related software libraries provided by the imager 430 manufacturer. Image acquisition program 1032 also compresses the raw image data and stores the compressed image data also to data memory 1030. Thus, it is understood that both the raw and compressed image data are stored in data memory 1030.

At the start of image acquisition, image acquisition program 1032 sends a start image acquisition command to the imager 430 to begin acquiring images. Images may be synchronously acquired with a hardware trigger, a software command, or asynchronously acquired, i.e., free run image acquisition. If imager 430 does not automatically append a time stamp or frame ID, the image acquisition program 1032 appends this information to both the raw image and compressed image data. Time stamp data may be received from computer 440 via the INS 420 if not provided by the imager 430, or other sources of time data. Each acquired raw and compressed image, along with any additional data appended to the image data (such as the time stamp and/or frame ID) by the imager 430 (or imagers 430a and 430b if two imagers are used) or computer 440, is then sequentially stored in data memory 1030.

Distance acquisition program 1034 controls the acquisition of target distance data from distance sensor 450 (or from multiple distance sensors such as 450a and 450b if more than one distance sensor is used). Distance sensor data is acquired in response to a trigger signal sent from program 1034 and can be synchronized with the image data acquired from the imager 430. For example, the same trigger signal sent to the distance sensor 450 may also be used to trigger the imager 430. Distance sensor 450 may also acquire distance information asynchronously. The asynchronous distance data will then be synchronized with the image data using interpolation or by other means. It is therefore understood that each acquired raw image from imager 430 and the compressed image of the raw image has an associated target distance measurement from distance sensor 450.

GNSS location acquisition program 1036 controls the acquisition of the GNSS location data from the GNSS receiver 424 and IMU data from IMU 422 of the INS 420. GNSS 424 location data and IMU 422 data are output to computer 440 from INS 420 via local bus 426 and/or master bus 418 and subsequently stored in data memory 1030 and tagged to (i.e., associated with) the raw image data from imager 430, the compressed raw image data, and distance sensor 450 data.

Figure 20:
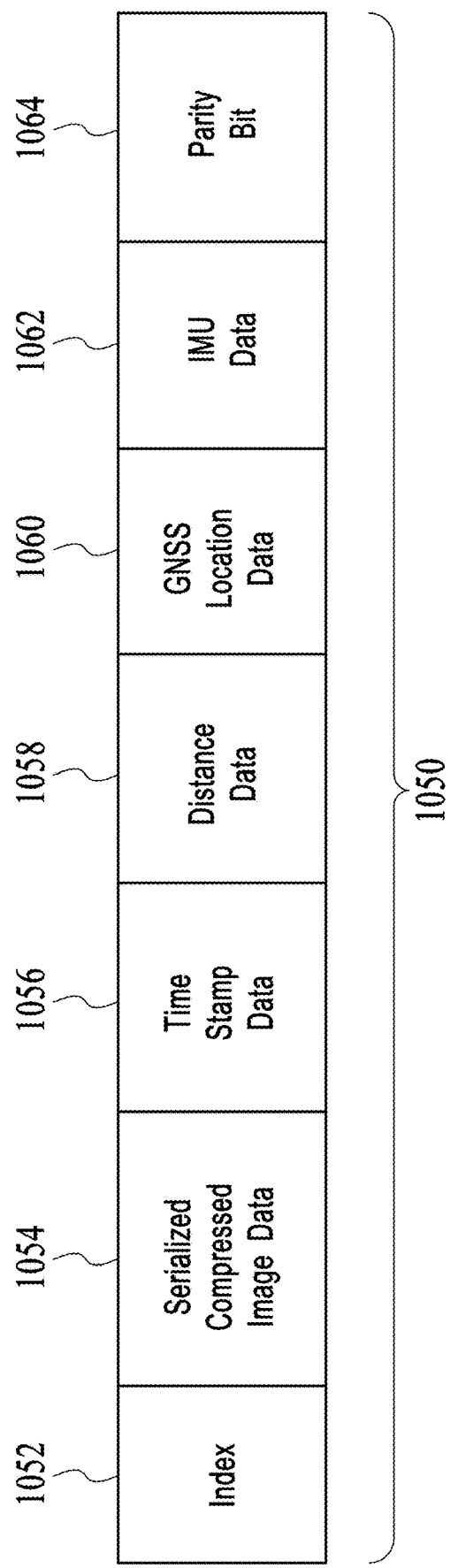
FIG. 20 is a block diagram of a data packet transmitted from an imaging system to an operator system, in accordance with embodiments of the present invention.

Referring to FIG. 20, pack-and-go program 1038 combines index number data 1052, compressed image data 1054 stored in memory 1030, time stamp data 1056, distance data 1058 from distance sensor 450, GNSS location data 1060, and IMU data 1062 from INS 420. Pack-and-go program 1038 then calculates and appends parity check bit 1064 to form serialized payload data packet 1050. Other more sophisticated error detecting techniques may be used such as a cyclic redundancy check (CRC). Other formats for the data packet are also possible.

Pack-and-go program 1038 also inputs the compressed image pixel data from memory 1030 and forms a one-dimensional array of compressed image data by concatenating each succeeding image row data to the previous image row data. Pack-and-go program 1038 then transmits payload data packet 1050 to modems 410 for transmission to the operator system 205, mobile system 215, server system 220, and cloud service 225.

Diagnostic program 1040 performs a self-diagnostic evaluation on all the components of the imaging system 210 and creates a diagnostic report which gives the operational state of the imaging system 210 and is saved into memory 1030.

System control program 1042 controls the interaction among wireless modem(s) 410, INS 420, imager 430 (or imagers 430a and 430b if two imagers are used), and distance sensor 450 (or distance sensors 450a and 450b if two distance sensors are used), and other components of imaging system 210, such as wireless power switch 471, and performs other functions necessary to achieve the objects of the invention. System control program 1042 can also send diagnostic reports to operator system 205 in response to a request from the operator.

Figure 21A:
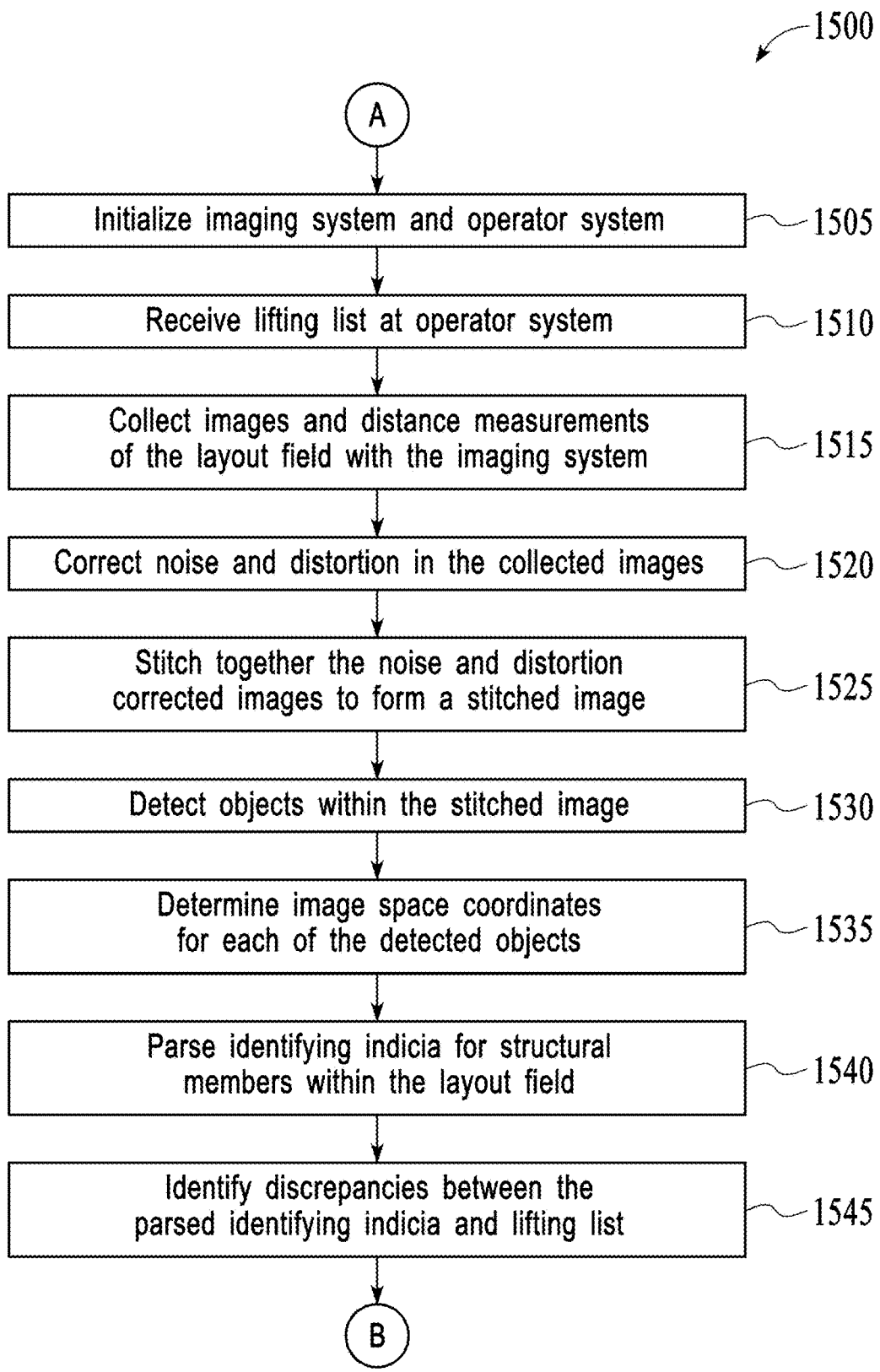
FIGS. 21A-21C are flow charts of exemplary methods for practicing the present invention, in accordance with some embodiments.
Figure 21B:
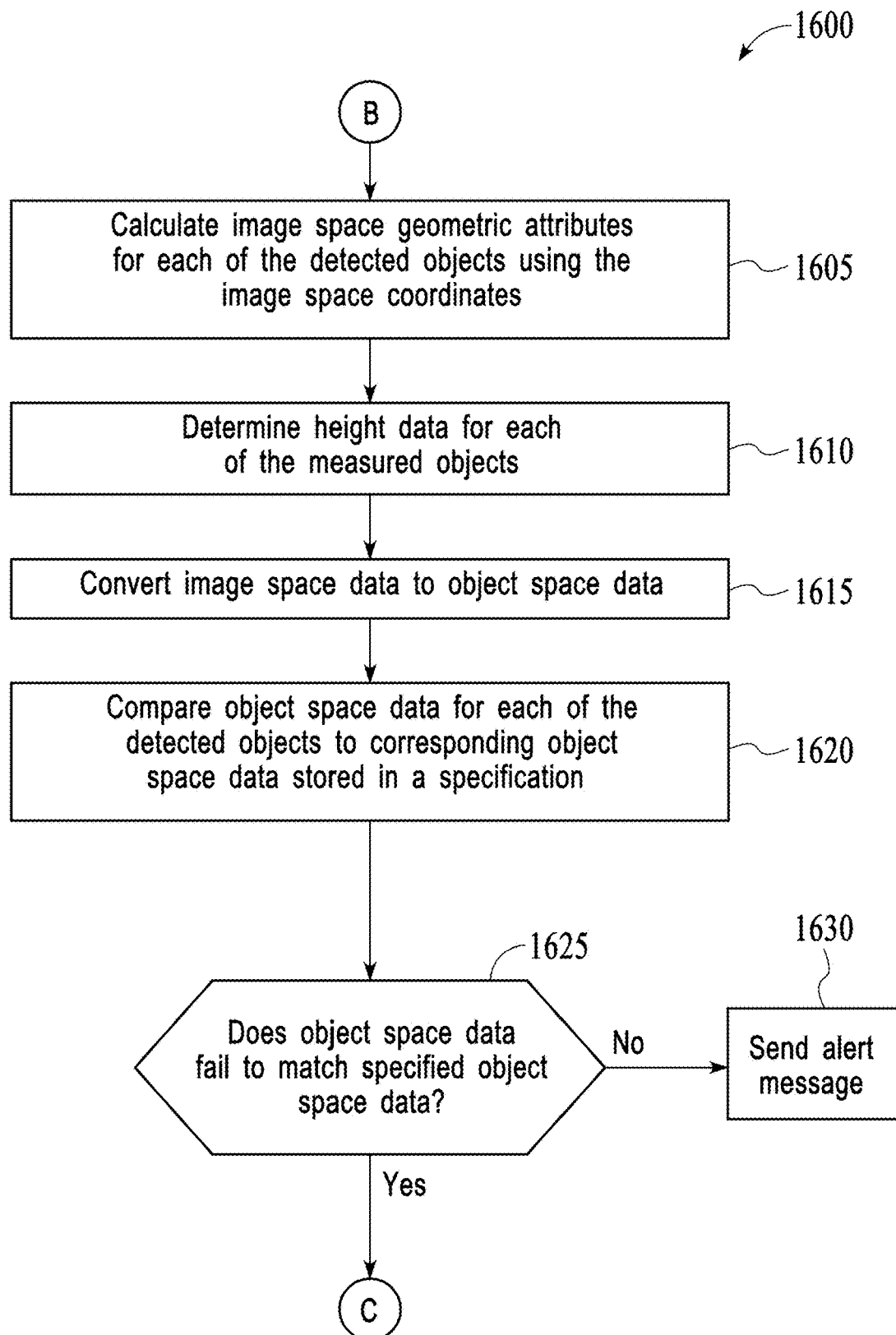
Figure 21C:
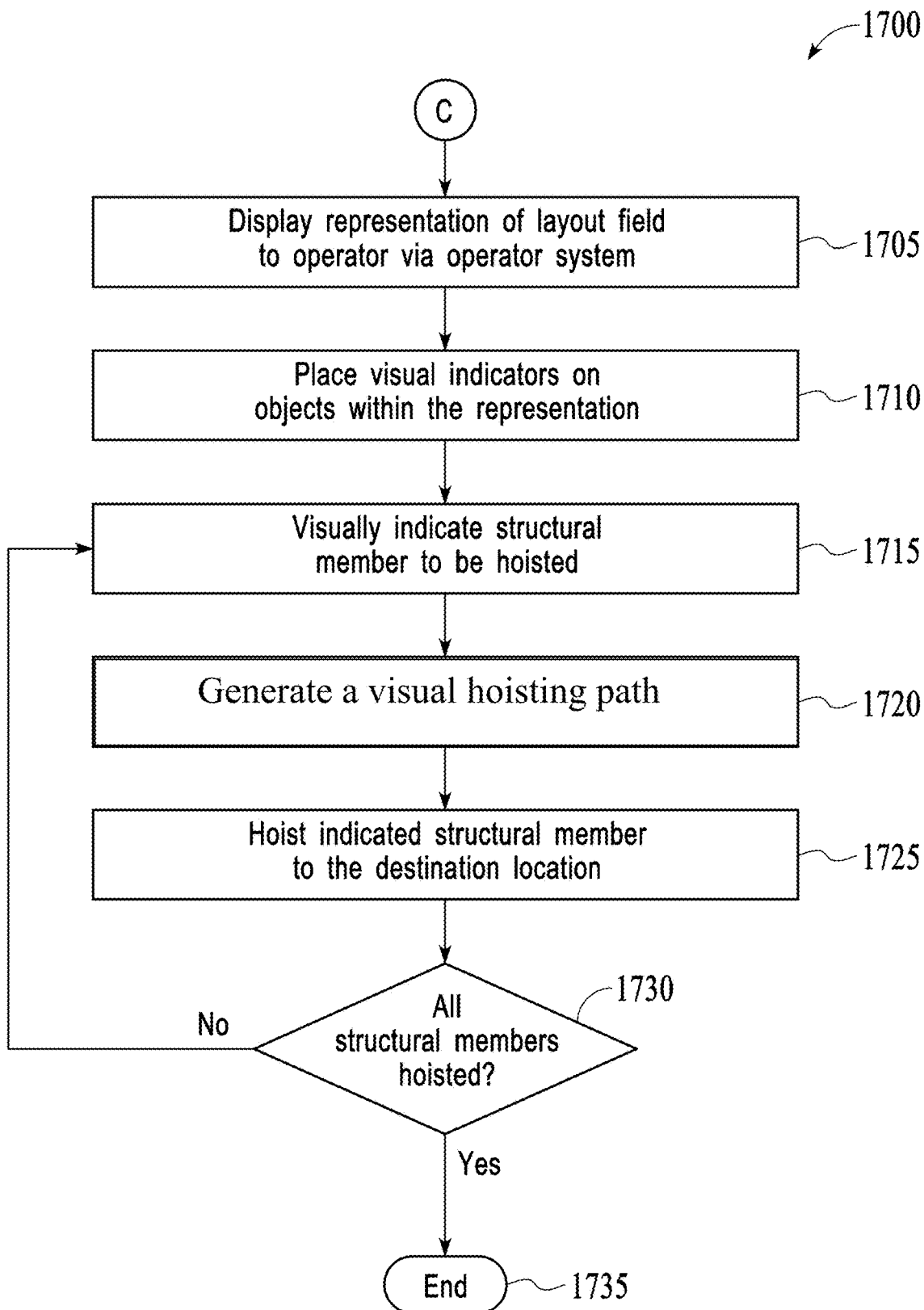

FIGS. 21A-21C are flowcharts of exemplary methods for assisting a crane operator. The following operational discussion assumes that the server 220 and mobile system 215 have been previously powered on and their communication channels 255 and 275 for server system 220 and communication channels 255 and 270 for the mobile system are operational. Additionally, it is further assumed that the construction site database and lifting list data have been previously uploaded into server system 220 or cloud service 225, and that all systems of system 200 including operator system 205, imaging system 210, mobile system 215, server system 220, and cloud service 225 have operational access to the construction site data and lifting list data. It is further assumed that any calibration data necessary to achieve the objects of the invention is available on operator system 205, imaging system 210, mobile system 215, server system 220, and cloud service 225.

Method 1500 of FIG. 21A begins at step 1505, where an imaging system (e.g. and imaging system 210 of FIG. 1) and an operator system (e.g. operator system 205) are initialized. Initializing the imaging system may include, for example, powering on and booting up the imaging system's computer. In embodiments where the imaging system is located on the main hook block of a crane, the operator can lower the main hook block to allow access to imaging system 210. If necessary, the crane operator may then replace a discharged battery 470 with a fully recharged battery. In embodiments where in the imaging system(s) are mounted on one or more drone vehicles, a worker can power on and boot up the imaging system(s). A worker on site can apply power to the imaging system by turning on the power supply (e.g. power supply 480), which then powers on the computer 440, wireless modem(s) 410, INS 420, imager 430 (or imagers 430a and 430b if two imagers are used), and distance sensor 450 via power bus 481. Wireless power switch 471 could also be used to apply power to system 210. Wireless power switch 471 enables the crane operator to turn power on and off to the imaging system without the need to lower the main hook block 136 and manually switch the power.

Imaging system 210 can also perform a diagnostic self-evaluation of its components, including computer 440, wireless modem(s) 410, INS 420, imager 430 distance sensor 450 (or distance sensors 450a and 450b), and battery 470 using system control program 1042. Imaging system 210 also attempts to establish bidirectional communications between mobile system 215, server system 220, and cloud service 225 via communication channels 245, 250 and 265, respectively. If all communication channels are operational, operational flow continues, but if any communication channel is not operational, operational flow may terminate until the issue is resolved.

The crane operator applies power to operator system 205 by turning on power supply 380. Power is then applied to all the components of system 205 including computer 340, wireless modem(s) 310, INS 320, and one or more displays 330, 360 via power bus 381. Computer 340 subsequently boots up and becomes operational. Operator system 205 then executes system control program 950, which performs a diagnostic self-evaluation of the components of operator system 205, including computer 340, wireless modem(s) 310, INS 320, and the one or more displays 330, 360 using the diagnostic program 1040. Operator system 205 then attempts to establish bidirectional communication between imaging system 210, mobile system 215, server system 220, and cloud service 225 via communication channels 230, 235, 240, and 260, respectively. If all communication channels are operational, operational flow continues, but if any communication channel is not operational, operational flow may terminate.

Computer 340 of operator system 205 can send a "Send Diagnostic Report" message (via communication channel 230 and the first modems) to imaging system 210. In response, the imaging system transmits a diagnostic status report back to the operator system via communication channel 230. If either the operator system or the imaging system fails its respective diagnostic self-evaluation, operational flow may terminate, and the operator system can display a message notifying the crane operator of the failed initialization.

At step 1510, the operator system receives lifting list data. In some embodiments, the operator system downloads the lifting list data directly (e.g. from a paper lifting list) while in other embodiments the operator system obtains the lifting list from the construction site database, which may be stored in one or more of server system 220, mobile system 215, or cloud service 225. The received lifting list data is then stored in memory 930 of computer 340 via communication channels 240 or 260, respectively. In other embodiments, the lifting list data could also have been previously loaded into data memory 930 (e.g. from a memory stick or by other means).

In step 1515, the imaging system begins collecting image and distance measurements of the shakeout field. For example, step 1515 may involve the operator system sending a message to the imaging system (e.g. "Begin Transmitting Data") requesting that the imaging system begin transmitting data (e.g. in the form of data packet 1050) via communication channel 230 and/or wireless modem(s) 310. In response, the imaging system begins continuously transmitting data packets to the operator system.

In some embodiments, the operator system instructs the crane operator to move the main hook block 136 to the beginning of the shakeout field 110 (e.g. by displaying a "Position Hook Block at The Beginning of The Shakeout Field Ground" message). The operator then moves the main hook block so that the distance sensor (e.g. distance sensor 450) is positioned over the ground surface 109 and the imaging system can determine the distance from the distance sensor to the ground surface. Movement of the main hook block 136 can be monitored by INS 420. The images acquired by imager 430 during the main hook block 136 movement can be displayed on display 330 to assist the crane operator in placing the main hook block (and therefore imager 430 (or imagers 430a and 430b)) at the beginning of the shakeout field 110. In embodiments in which the imaging system is mounted on a drone, images acquired by imager 430 may also be shown to the drone operator (e.g. using the display of a mobile system).

In some embodiments, the operator system messages the crane operator to depress the "Ready" button on the input device 350 when the main hook block 136 is positioned at the beginning of the shakeout field 110 ground. In response to the "Ready" button being depressed, computer 440 inputs the distance data from the distance sensor 450 and transmits the distance data to computer 340 via communication channel 230. Computer 340 then determines whether the distance data from the distance sensor 450 is within an acceptable range of focus for imager 430. If the distance data is not within an acceptable range, the crane operator is messaged to move the block hook either upwards or downwards in order to move the imaging system within the acceptable range. This calculation may be executed by system control program 950.

Once the imaging system is within the acceptable distance range, the operator system can message the crane operator via the display to depress a "Start Scanning" button on the input device. In response to the "Start Scanning" button depression, computer 340 begins to immediately store the data packets received from the imaging system to memory 930. The crane operator is then instructed to scan the entire shakeout field 110 by moving the main hook block 136 across the shakeout field (e.g. using a back-and-forth motion). The crane operator can use images captured by the imager, dynamically updated on the display, as a guide until the shakeout field 110 has been completely imaged. The crane operator is further messaged to depress the "Stop Scanning Button" on the input device when the scanning operation is completed. In response to the "Stop Scanning" button depression, computer 340 stops storing the data packets 1050 to memory 930. The computer 340 stores the data packets 1050 to memory 930 during the time interval between the "Start Scanning" and "Stop Scanning" keyboard depressions.

In embodiments where the imaging system is mounted on one or more drone vehicles, the scanning procedure detailed above may be carried out by a drone operator rather than the crane operator. For example, a drone operator using remote control means can position a drone vehicle at the beginning of the shakeout field and fly the drone about the shakeout field until the imaging system captures all of the necessary image and distance data. Once the scanning is complete, the drone operator can send a message to the drone causing the imaging system to stop scanning. In other embodiments, the drone vehicle may operate autonomously. For example, the drone operator can set up a geofence that defines the boundaries of the shakeout field. The drone can then be launched, automatically place itself at a suitable starting location and height, calculate the minimum number of images that need to be taken (given the imager's field of view) to cover the entire shakeout field, and automatically traverse the shakeout field until scanning is complete. The drone may then automatically return to a designated location at the construction site (e.g. a drone charging station).

At step 1520, the operator system (or another suitably equipped system, such as a server system, mobile system, or cloud service) corrects noise and distortion in the collected images. The operator system's computer begins processing all the data packets previously stored in memory 930 and executes the unpack-and-go program 934, which can transform serialized single-array formatted image data 1054 into the two-dimensional original image data array 1066. The original image data array derived from each packet 1050 is stored in memory 930 and indexed (e.g. using index number data 1052). The two-dimensional image data array is indexed using the index number, time stamp, or frame ID (provided by the camera 430 if so equipped). The sequence of original data packet 1050 is preferably not destroyed.

Computer 340 can then execute an image correction and noise removal program (e.g. image correction and noise removal program 936) which decompresses each image 1066 of shakeout field 110, corrects each decompressed image for lens and perspective distortion, and filters the corrected image for noise. For example, the single uncompressed, distorted image 951 of the structural member 121 (see FIG. 12A) can be corrected for lens and perspective distortion and noise by image correction and noise removal program 936, as shown in image 959 of FIG. 12B. Computer 340 can then apply one or more segmentation processes to create a new sequence of images 1067. Segmentation algorithms can also be applied to each image 1066 to define the perimeter and corners of the structural member 121 (and any other structural members or building material objects) contained within the individual images 1066. The segmentation algorithms help define registration points in images 1067 for stitching program 939 to then find correspondences automatically among the sequence of images and to match common features of the images.

Thus, for each image 1066 there is a corresponding decompressed, distortion-corrected, noise-filtered, and segmented image 1067. The sequence of individual images 1067 (corresponding to the sequence of individual images 1066) is stored in memory 930 and indexed by index data 1052 or time stamp data 1056. As was previously mentioned, only a single image may be required depending upon the size of the shakeout field 110 and the field of view of the imager 430. The sequence of individual images 1066 are preserved in memory 930. At this point, all images of the shakeout field 110 (having the structural member 121 and any additional structural members) have now been distortion-corrected, noise-filtered, and segmented and are stored in memory 930 as a sequence of individual images 1067 indexed by the index number data 1052 (or the time stamp 1056 or frame ID).

At step 1525, the operator system stiches together the noise and distortion corrected images to form a stitched image. For example, a two-dimensional image stitching program (e.g. two-dimensional image stitching program 938) accesses the sequence of images 1067 and stitches all images together to generate stitched image 1069 (shown in FIG. 22). The stitched image may be similar to image 972, for example, but it would include all structural members within the shakeout field. For example, the sequence of six individual, uncompressed, 1 distortion-corrected, noise-filtered, and segmented images 960, 962, 964, 966, 968, and 970 as shown in FIG. 12A are accessed by the two-dimensional image stitching program, which creates the stitched image 972 of the entire layout field 110 as shown in FIG. 12B.

In step 1530, the operator system (e.g. via image analysis and convolutional neural network (CNN) program 942) receives stitched image 1069 and recognizes objects within the stitched image. For example the image analysis and convolutional neural network (CNN) program operates on the entire stitched image to detect (a) each imaged building material object, (b) imaged feature objects attributed to each building material object (i.e., such as an attached bracket 712), (c) the imaged identifying indicia objects (e.g. identifying indicium 740), (d) the imaged distance sensor target reflections objects, (such as image reflection 976), and (e) other imaged objects in the stitched image.

At step 1535, the operator system analyzes the recognized objects in stitched image 1069 and determines, with respect to an image space coordinate system (e.g. u-v coordinate system 974), the u-v coordinate locations and perimeters of each detected object including (a) the building material objects, (b) feature objects attributed to each building material object and (c) the identifying indicium objects. The image analysis and convolutional neural network program also calculates a boundary box containing the image of the identifying indicium object 740. The perimeter of the identifying indicium is defined as the boundary box perimeter, which defines the location of the image of the alphanumeric characters and/or symbols comprising the identifying indicium 740.

At step 1540, the operator system parses the characters and/or symbols of the detected identifying indicia. In order to parse these characters and symbols, the operator system can separate the characters and/or symbols and pass them through a convolutional neural network application which determines the actual character and/or symbol representation within a certain probability. The original identifying indicium 740, which may have been handwritten, for example, can then be replaced within stitched image 997 by the convolutional neural network representation 979. For example, as shown in FIG. 15, the convolutional neural network representation image 979 of the image of the handwritten indicium 740 as shown in FIG. 12B. The original image of the handwritten identifying indicium 740 has been replaced by the convolutional neural network representation image 979. The CNN processed identifying indicium image 979 is associated with the image 987 of the structural member 121.

At step 1545, the operator system (e.g. via specification and comparison program 948) compares the identifying indicium listed in the lifting list data against a list of the identifying indicium of the imaged structural members contained within the shakeout field 110. This step, therefore, ensures that every structural member listed in the lifting list data is available in the shakeout field 110 for hoisting to the attachment point 122. If there is a discrepancy between the structural members available in the shakeout field and those identified in the listing list, then the operator and/or other workers on site are alerted (e.g. via displays of the operator system and/or mobile system). In this manner, if any structural member identified in the listing list is missing from the shakeout field, the operator is alerted as soon as possible so that steps can be taken to rectify the problem. In some circumstances, method 1500 will terminate until the missing structural member is located or a replacement is delivered to the construction site. In some circumstances, the method can continue until it is time to hoist the missing structural member according to the order set in the lifting list.

In yet further circumstances, one or more workers on site can determine whether one or more of the identified structural members were marked with an incorrect identifying indicium. In this case, method 1500 may be paused until the mistake is rectified (e.g. by re-marking and re-scanning the structural member). In some embodiments, re-marking of a structural member only occurs after method 1600 is executed and it is determined that the mismarked structural member matches the attributes of an unmatched structural member from the lifting list, which can help confirm that the identified discrepancy was due to a mismarked identifying indicium rather than a more drastic problem. Once all the structural members listed on the lifting list data are identified as available for hoisting, then operational control continues to step 1605 of method 1600, illustrated in FIG. 21B.

Method 1600 of FIG. 21B begins at step 1605, in which the operator system (or other suitable system, such as a mobile system, server system, or cloud service) calculates geometric attributes for each of the objects detected within the shakeout field using the determined image space coordinates. For example, the image analysis and convolutional neural network program can calculate various dimensions of each structural member, including their lengths and widths (as viewed from above). The image analysis and convolutional neural network program stores all image space data within memory 930. The program also creates an image 997 of the shakeout field 110, including each of the identified objects.

At step 1610, the operator system (e.g. using beam height program 944) determines the height for each of the identified objects in image 997. For example, the beam height program can use the structural member perimeter data to determine which target reflection points lie within the perimeter of the structural member. The height data is then associated with the respective structural member object in memory 930. Distance data from the distance sensor to the target is also determined and saved along with the corresponding target reflection object. The height and distance data are saved in memory 930. Once the image space geometric attributes and height data are stored in memory, computer 340 creates an image space data structure 1200 (e.g. by executing data fusion program 946). The height data and GNSS location data fields are populated by the values previously stored in memory 930. In some embodiments, the operator system can write the data directly into image space data structure 1200 rather than first storing the data in memory 930.

At step 1615, the operator system converts the image space data to object space data. For example, data fusion program 946 can convert the image space data fields of structure 1200 to the corresponding object space data fields of structure 1400 (e.g. image space to object space transformation program 94). As a concrete example, the width 1215 in pixels and length 1220 in pixels of image space data structure 1200 may be converted to width 1315 in decimal inches and length 1320 in the decimal inches in the object space data structure 1400. The data fusion program can also copy data that was already measured in object space coordinates (e.g. height data captured by the distance sensors) from data structure 1200 to data structure 1400.

At step 1620, the operator system compares object space data for each of the detected objects to corresponding object space data stored in the lifting list, construction site database, a building information management ("BIM") system, or the like, which can include structural member and structural feature data that may be compared against the data listed in the object space data structure 1400. The operator system (e.g. via specification comparison program 948) then compares, for each structural member available for hoisting, the object space data structure 1400 selected data fields against those corresponding data fields listed in the construction site database. For example, the specification comparison program 948 may compare the object space data structure 1400 selected data fields of a particular structural member available for hoisting including the identifying indicium data field 1305, the width data field 1315, the length data field 1320, the height data field 1325, and the first feature 1335 the width data field 1345, and the length data field 1350 against the corresponding data fields within the construction site database.

According to various embodiments, the lifting list data may be separate from or integral with the construction site database and/or BIM. The lifting list data includes an ordered lifting list including the identifying indicium for the structural members and usually the respective attachment location. Other information may be included in the lifting list data. For example, the attachment location of each structural member is preferably given in GNSS coordinates.

At step 1625, the operator system determines whether any data within object space data structure 1400 fails to match the corresponding data fields listed in the construction site database. If there is a discrepancy (e.g. the object space data falls outside of a suitable tolerance range around the specification data) between any data fields computer 340 messages and informs the crane operator of the discrepancy via display device 330 and places a visual indicator on each of those structural members not matching the construction site database specifications. The computer may also reset the Flags 1232 and 1332 (writes a '0') in image space data structure 1200 and object space data structure 1400 to indicate that the structural member does not meet the construction site database specifications. At this point, method 1600 may cease until the problem is rectified. If there is no discrepancy between the data fields of the object space data structure 1400 and the corresponding data fields listed in the construction site database, computer 340 then updates the image 997 of the layout field 110 by placing a visual indicator on each of those structural members meeting the construction site database specifications. For example, the perimeters of all structural members meeting the construction site database specification may be displayed as "green", or a colored symbol, such as a green "X" or a green dot may be placed over the structural member. Other types of symbols may be used. Operational flow continues to step 1725.

Method 1700 of FIG. 21C begins at step 1705, in which the operator system (e.g. via computer 340 and display device 330) displays a representation of the shakeout field (including any structural members located therein) to the operator. For example, the representation can show the operator all of those structural members matching the construction site database specifications. At any time after the scan is complete, the crane operator may use the operator system's input device (e.g. a mouse, touch screen display, or joystick) to select a particular structural member and receive the information (obtained from the construction site database, bill of materials, the BIM or other specification database(s) pertaining to the structural member).

At step 1710, computer 340 can place visual indicators on objects within the representation of the shakeout field. For example, a green dot overlaid onto the image of those structural members in image 997 may be used to identify those structural members that meeting the construction site database specifications. Likewise, a red dot overlaid onto the image of those structural members in image 997 may be used to indicate those structural members that do not meet the construction site database specifications.

At step 1715, computer 340 visually indicates to the crane operator in image 997 the first or subsequent structural member from the lifting list data to be hoisted to the attachment location 122. For example, the computer may cause a green dot associated with the first structural member on the lifting list data to blink. The crane operator is then instructed to move the main hook block to the structural member having the blinking green dot.

For example, and referring to FIG. 22, the stitched image 1069 of the shakeout field 110 is shown having two structural members 120 and 121. For clarity only two structural members are shown when in fact the shakeout field 110 may have many more members. Associated with structural members 120 and 121 are the visual indicators 1001 and 1002 which, for this example, are dots which are colored green to indicate that those respective structural members 120 and 121 match the construction site database specifications and are available for hoisting. The structural features of member 121 are not shown for clarity. Additionally, the computer 340 blinks green dot 1002 giving a visual indication to the crane operator that structural member 121 is the next queued building material object to be hoisted. The crosshatch pattern indicates that the green dot is blinking. Computer 340 then places a center-of-gravity symbol 1003 (along with the associated "CG" indicium 1003*a*) on the image of the surface of structural member 121 indicating the center-of-gravity for structural member 120.

Where the imaging system is located on the main hook block, computer 340 may also use the GNSS location of the imaging system (determined by the INS 422) to overlay a crosshair target symbol on the image 997 to indicate the current position of the main hook block. The operator then uses the crosshair target symbol as visual feedback to move the main hook block 136 over the structural member having the blinking dot. A shakeout field associate then attaches the structural member to the main hook block 136 via rigging or the like. In some embodiments, a visual representation of the structural member's center of mass may be shown to the operator and/or shakeout field associate to ensure that the crane lifts the structural member in the correct location.

The hoisting of the selected structural member may be detected by the LIDAR, visually by the imager and/or the INS (measures acceleration and GNSS position), or using a combination of this data. Having detected the hoisting of the structural member the computer of the operator system then updates the visual shakeout field and eliminates the selected hoisted structural member from the shakeout field image.

At step 1720, computer 340 generates a visual three-dimensional hoisting path from initial location of the structural member within the shakeout field to the attachment location 122. The visual three-dimensional hoisting path can be displayed on one or more operator system displays to assist the crane operator in placing the structural member at the attachment location 122. The computer 340 uses the structural member's shakeout field 110 GNSS location, the GNSS location of the attachment location, and the current steel structure to calculate the hoisting path. Thus, as the crane operator moves the hoisted structural member to the attachment location, the display is continuously and dynamically updated to show the current location of the hoisted structural member with respect to the construction site and the attachment location of the partially completed structure.

Computer 340 may also provide a dynamic three dimensional representation of the partially completed structure 118 specifically illustrating the attachment location 122, which is displayed to the crane operator. The dynamic three dimensional representation may be continuously updated as structural members are attached to, or removed from, the structure. In some embodiments, the three-dimensional representation may be generated based on data stored in the construction site database and update each time a new structural member is attached to the partially completed structure. In other embodiments the imaging system can physically scan the partially completed structure (e.g., using scanning LIDAR technology). In these latter embodiments, the LIDAR scans can be compared to the construction site database to ensure that no attachment errors are made. The database may reside singularly or be distributed among the first computer 340, the second computer 440, the mobile computer 540, the server system 220, and/or the cloud 225.

In some embodiments, the operator system includes augmented reality (AR) software that assists the crane operator. This AR software may display the structural member to be hoisted along with digital images of the surrounding construction site enhanced by computer-generated perceptual information. Thus, computer 340 could display the computed path for placing the building material object at the attachment location along with the geometric measurements and other characteristics of the building material object. In further embodiments, the operator system may be equipped with a virtual reality (VR) system whereby the crane operator and others can be provided with goggles displaying the virtual construction site including the shakeout field, the building material object, the lifting path of the building material object, and the attachment location on the partially completed structure.

At step 1725, the crane operator hoists the structural member to its destination location. Once the structural member is hoisted to the destination location, iron workers on the partially completed structure attach the structural member at the attachment location 122. The database used to generate the visual three-dimensional hoisting guiding path is updated to reflect the newly attached structural member. The operator system's INS determines when the structural member has been attached on the structure (from a comparison of the known GNSS location of the attachment location from the construction site database or from the INS data) and may be used to update the construction site database (or other database(s)). In some embodiments, computer 340 generates a visual three-dimensional guiding return path from the attachment location 122 back to the shakeout field 110, taking into consideration the location of the newly attached structural member. The crane operator returns the main hook block back 136 to the shakeout field 110. The computer 340 uses the GNSS location of the main hook block and the GNSS location of the shakeout field 110 to determine when the main hook block is over the shakeout field 110. In some embodiments, the human crane operator may be eliminated altogether. For example, once the hoisting and return paths calculated, those paths can be used to control the crane without human intervention. Thus, some embodiments of the invention provide a completely autonomous crane system whereby all crane operations are completed without human intervention.

At step 1730, computer 340 determines if there are any additional structural members listed in the lifting list data which need to be hoisted. If there are no additional structural members, operational flow is terminated at step 1735. If there are additional structural members listed in the lifting list data, operational flow returns to step 1715. Method 1700 continues as described above until all the structural members listed in the lifting list data have been attached to the structure.

FIG. 23 illustrates the relationship between the BIM data base 2001, the Industry Foundation Classes (IFC) file 2002 and the GNSS location calculator 2003. Usually, the BIM will define the project base point and the project coordinate system, which define the coordinate system for the construction of the building or other structures and is usually a Cartesian based coordinate system.

Usually, the geometry of the structure as well as the building material objects (such as the structural members) are well defined in the BIM data, including all attachment locations and dimensions of the structural members which may be referenced to the Cartesian based project coordinate system. The GNSS location calculator 2003 inputs the geodetic survey marker data from the IFC file (or from the BIM data or from other data sources) and the project base point and calculates the GNSS location of all attached structural members and other building material objects. This GNSS location information is then used to determine the destination location in GNSS coordinates used by the hoisting path calculation. Additionally, the invention provides for a complete recording of the construction of the building via the hoisting of the building material objects.

It is understood that the preceding a detailed description of one or more embodiments of the invention and that numerous changes to the disclosed embodiment can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A system for assisting a crane operator to move a building material object from a beginning location to a destination location, the system comprising:
   a database comprising a plurality of records and a plurality of data fields, wherein:
      each record of the plurality of records corresponds to a particular building material object, and
      each of the plurality of data field stores information associated with at least one of the plurality of building material objects, wherein the information specifies at least a geometric dimension, and a destination location for each of the plurality of building material objects;
   a mobile system, communicatively coupled to the database, the mobile system comprising:
      an internal navigation system, the internal navigation system including a Real Time Kinematic (RTK) enabled global navigation satellite system (GNSS) receiver, which generates at least a GNSS location data for each of the plurality of building material objects; and
      a computer communicatively coupled to the internal navigation system and a display device, and being configured to:
         provide a visual indicator representing a first building material object of the plurality of building material objects on the display device;
         identify any obstructions between the first building material object's location and respective destination location;
         calculate a path between the first building material object's beginning location and its destination location that avoids all identified obstructions; and
         display the path to an operator on the display device.

2. The system of claim 1, wherein the mobile system is a hand-held computer system.

3. The system of claim 1, wherein the building material object having the current location is an active building material object;
   the operator system is further configured to identify an active building material object of the plurality of building material objects; and
   the mobile system continuously updates location information in the database for the active building material object.

4. The system for assisting a crane operator of claim 3, wherein:
the mobile system is coupled to a main hook block of a crane configured to move the active building material object.

5. The system for assisting a crane operator of claim 4, wherein the operator system is further configured to:
continuously calculate a difference between the active building material object's location and the path; and
suggest a crane operation to the operator to keep the active building material object's location on the path.

6. The system of claim 1, wherein at least one of the plurality of data fields represents an avoidance shroud for the plurality of building material objects, wherein the avoidance shroud for each of the plurality of building material objects comprises at least one dimension that exceeds a corresponding geometric dimension of the geometric dimension for each of the plurality of building material objects.

7. The system of claim 6, wherein the path is calculated to avoid a collision between the active building material object's avoidance shroud and an avoidance shroud of each of the plurality of building material objects.

8. A method for assisting a crane operator to move a building material object from a beginning location to a destination location, the method comprising:
storing a plurality of records and a plurality of data fields in a database, wherein each of the plurality of records corresponds to a particular building material object and each of the plurality of data fields stores information associated with at least one of the building material objects, including one or more of the building material object's geometric dimensions, and/or destination location;
using a mobile system communicatively coupled to the database, and comprising an internal navigation system, a computer, and a display device, the mobile system:
generating, with the internal navigation system including a Real Time Kinematic (RTK) enabled global navigation satellite system (GNSS) receiver, at least a GNSS location data for each of the building material objects; and
using the computer communicatively coupled to the internal navigation system and the display device, the computer:
providing a visual indicator representing one or more of the building material objects;
identifying any obstructions between the building material object's location and its destination location;
calculating a path between the building material object's beginning location and its destination location that avoids an identified obstruction; and
displaying the path to an operator via the display device.

9. The method of claim 8, wherein the mobile system is a hand-held computer system.

10. The method of claim 8, wherein the building material object having a current location is an active building material object and further comprising continuously updating location information in the database for the active building material object.

11. The method of claim 8, wherein the building material object having the current location is an active building material object and wherein the mobile system is coupled to a main hook block of a crane configured to move the active building material object.

12. The method of claim 11, further comprising the operator system:
continuously calculating a difference between the active building material object's location and the path; and
suggest a crane operation to the crane operator to keep the active building material object's location on the path.

13. The method of claim 8, further comprising:
determining an avoidance shroud for each building material object, wherein the avoidance shroud for each building material object comprises at least one dimension that exceeds that building material object's geometric dimensions; and
storing the determined avoidance shroud in the database.

14. The method of claim 13, wherein calculating the path comprises avoiding collisions between the active building material object's avoidance shroud and an avoidance shroud of another building material object.

15. Non-transitory computer readable media, comprising instructions which, when executed:
store a plurality of records and a plurality of data fields in a database, wherein each record corresponds to a particular building material object and each data field stores information associated with at least one of the building material object, including one or more of the building material object's geometric dimensions, and a destination location;
controls a mobile system communicatively coupled to the database, and having an internal navigation system, a computer, and a display device, wherein the mobile system:
generates, with the internal navigation system having a Real Time Kinematic (RTK) enabled global navigation satellite system (GNSS) receiver, at least a GNSS location data for each of the building material objects; and
controls the computer communicatively coupled to the internal navigation system and the display device, wherein the computer:
provides an indicator representing the building material object;
identifies any obstructions between the building material object's location and its destination location;
calculates a path between the building material object's beginning location and its destination location that avoids the identified obstructions; and
displays the path to an operator on the display device.

16. The non-transitory media of claim 15, wherein the building material object having a current location is an active building material and further comprising instructions for continuously updating location information in the database for the active building material object.

17. The non-transitory media of claim 15, wherein the building material object having a current location is an active building material and wherein the internal navigation system is coupled to a main hook block of a crane configured to move the active building material object.

18. The non-transitory media of claim 17, further comprising instructions for controlling the operator system to:
continuously calculate a difference between the active building material object's location and the path; and
suggesting a crane operation to the crane operator to keep the active building material object's location on the path.

19. The non-transitory media of claim 15, further comprising instructions for:
- determining an avoidance shroud for each building material object, wherein the avoidance shroud for each building material object comprises at least one dimension that exceeds geometric dimensions of the building material object; and
- storing the determined avoidance shroud in the database.

20. The non-transitory media of claim 19, wherein calculating the path comprises avoiding collisions between the active building material object's avoidance shroud and an avoidance shroud of another building material object.

* * * * *